US006417963B1

(12) United States Patent
Ohishi et al.

(10) Patent No.: US 6,417,963 B1
(45) Date of Patent: Jul. 9, 2002

(54) OPTICAL FIBER SPLICING STRUCTURE

(75) Inventors: Yasutake Ohishi; Atsushi Mori; Makoto Yamada; Hirotaka Ono; Terutoshi Kanamori; Toshiyuki Shimada, all of Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 10/029,237

(22) Filed: Dec. 28, 2001

Related U.S. Application Data

(62) Division of application No. 09/710,961, filed on Nov. 14, 2000, now Pat. No. 6,356,387, which is a division of application No. 09/023,210, filed on Feb. 13, 1998, now Pat. No. 6,266,181.

(30) Foreign Application Priority Data

| Feb. 14, 1997 | (JP) | ................................... 9-30122 |
| Feb. 14, 1997 | (JP) | ................................... 9-30430 |
| Aug. 22, 1997 | (JP) | ................................. 9-226890 |
| Sep. 25, 1997 | (JP) | ................................. 9-259806 |
| Dec. 19, 1997 | (JP) | ................................. 9-351538 |
| Dec. 19, 1997 | (JP) | ................................. 9-351539 |
| Feb. 13, 1998 | (JP) | ................................. 10-31874 |

(51) Int. Cl.⁷ .......................... H01S 3/00; G02B 6/255
(52) U.S. Cl. ...................................... 359/341.1; 385/96
(58) Field of Search ........................... 385/96, 97, 98; 359/341.5, 333, 341.1

(56) References Cited

U.S. PATENT DOCUMENTS

| 3,661,600 A | 5/1972 | Izumitani et al. ......... 106/47 Q |
| 3,836,868 A | 9/1974 | Cooley ..................... 331/94.5 |
| 3,836,871 A | 9/1974 | Cooley ..................... 331/94.5 |
| 3,883,357 A | 5/1975 | Cooley ..................... 106/47 R |
| 4,621,895 A | * 11/1986 | Motsko ..................... 350/96.21 |
| 4,732,875 A | 3/1988 | Sagara ......................... 501/42 |
| 5,226,995 A | * 7/1993 | White ......................... 156/158 |
| 5,251,062 A | * 10/1993 | Snitzer et al. .............. 359/341 |
| 5,995,278 A | * 11/1999 | Kikuchi et al. ............. 359/341 |
| 6,280,099 B1 | * 8/2001 | Wu .............................. 385/73 |

FOREIGN PATENT DOCUMENTS

| EP | 0 361 498 A | 4/1990 | ............ G02B/6/14 |
| EP | 0 430 206 A1 | 5/1991 | ............. C03C/8/24 |
| EP | 0 848 463 A2 | 6/1998 | ............. H01S/3/06 |

(List continued on next page.)

OTHER PUBLICATIONS

Electronic Letter, vol. 24, No. 18, 1988, "Bevelled–Microlensed Taper Connectors for Laser and Fibre Coupling with Minimal Back–Reflections", pp. 1162–1163.

(List continued on next page.)

*Primary Examiner*—Mark Hellner
(74) *Attorney, Agent, or Firm*—Venable; Robert J. Frank; Ashley J. Wells

(57) ABSTRACT

A tellurite glass as a glass material of optical fiber and optical waveguide has a composition of $0 < Bi_2O_3 \leq 20$ (mole %), $0 \leq Na_2O \leq 35$ (mole %), $0 \leq ZnO \leq 35$ (mole %), and $55 \leq TeO_2 \leq 90$ (mole %). The tellurite glass allows an optical amplifier and a laser device that have broadband and low-noise characteristics. In a splicing structure of non silica-based optical fiber (as a first fiber) and a silica-based optical fiber (as a second fiber), optical axes of the first and second optical fibers are held at different angles $\theta_1$ and $\theta_2$ ($\theta_1 \neq \theta_2$) respectively from a vertical axis of a boundary surface between their spliced ends, and a relationship between the angles $\theta_1$ and $\theta_2$ satisfies Snell's law represented by an equation of $\sin\theta_1/\sin\theta_2 = n_2/n_1$ (where $n_1$ is a refractive index of the first optical fiber and $n_2$ is a refractive index of the second optical fiber) at the time of splicing the first and second optical fibers.

10 Claims, 40 Drawing Sheets

FOREIGN PATENT DOCUMENTS

| FR | 2 479 180 | 10/1981 | ............ C03C/3/30 |
|----|-----------|---------|-------------------------|
| JP | 6-27343 | 2/1994 | ............ G02B/6/24 |
| JP | 7-20342 | 1/1995 | ............ G02B/6/26 |
| JP | 8-110535 | 4/1996 | ............ G02F/1/35 |

OTHER PUBLICATIONS

J.S. Wang et al., "Neodymium–doped tellurite single–mode fiber laser", *Optics Letters*, vol. 19 (1994), pp. 1448–1449.

J.S. Wang et al., "Tellurite glass: a new candidate for fiber devices", *Optical Materials*, vol. 3 (1994), pp. 187–203.

Atsushi Mori et al., *Broadband Amplification Characterics of Tellurite–Based EDFAs*, 1997, pp. 135–138.

Atushi Mori et al., *1.5 μm Broadband Amplification by Tellurite–Based EDFAs*, 1997, pp. 1–4.

Shigeru Shikii et al., "Optical Amplifier Module", *Okidenki Kenkyu Kaihatsu*, No. 1, vol. 64, 1997, pp. 63–66.

Mori et al., "Broadband gain characteristics of $Er^{3+}$–doped tellurite glass fibers", *Proceedings of the 1997 IEICE General Conference*, pp. 267.

Kenneth O. Hill *Photosensitivity and Bragg Gratings in Optical Waveguides*, pp. 1–197.

Desurvive, E. *Erbium–Doped Fiber Amplifiers*, John Wiley & Sons, 1994, pp. 460–469, XP–002094770.

* cited by examiner

■ A:OPTIMUM REGION FOR FIBER
▨ B:ALLOWABLE REGION FOR FIBER
☐ C:LOSS OF CLARITY

■ A: OPTIMUM REGION FOR FIBER
▩ B: ALLOWABLE REGION FOR FIBER
▨ C: LOSS OF CLARITY

■ A: OPTIMUM REGION FOR FIBER
▒ LOSS OF CLARITY

OPTICAL FIBER SPLICING STRUCTURE

CROSS-REFERENCE TO RELATED APPLICATIONS

This is a division of application Ser. No. 09/710,961 now U.S. Pat. No. 6,356,387 filed Nov. 14, 2000, which is a division of application Ser. No. 09/023,210 filed Feb. 13, 1998, how U.S. Pat. No. 6,266,181 B1 issued Jul. 24, 2001.

This application is based on Patent Application No. 030, 430/1997 filed in Feb. 14, 1997, No. 030,122/1997 filed in Feb. 14, 1997, No. 226,890/1997 filed in Aug. 22, 1997, No. 259,806/1997 filed in Sep. 25, 1997, No. 351,538/1997 filed in Dec. 19, 1997, and No. 351,539/1997 filed in Dec. 19, 1997 in Japan, the content of which is incorporated hereinto by reference.

BACKGROUND OF THE INVENTION

1. Field of the Invention

The present invention relates to a tellurite glass as a glass material for an optical fiber and an optical waveguide, and in particular a broadband optical amplification medium using the tellurite glass which is capable of working even at wavelengths of 1.5 μm to 1.7 μm. The present invention also relates to a broadband optical amplifier and a laser device using the broad band optical amplification medium. Furthermore, the present invention relates to a method of splicing a non-silica-based optical fiber and a silica-based optical fiber reliably with the characteristics of low fiber-loss and low reflection.

2. Description of the Related Art

The technology of wavelength division multiplexing (WDM) has been studied and developed for expanding transmission volume of optical communication systems and functionally improving such systems. The WDM is responsible for combining a plurality of optical signals and transmitting a combined signal through a single optical fiber. In addition, the WDM is reversibly responsible for dividing a combined signal passing through a single optical fiber into a plurality of optical signals for every wavelength. This kind of transmitting technology requires a transit amplification just as is the case with the conventional one according to the distance of transmitting a plurality of optical signals of different wavelengths through a single optical fiber. Thus, the need for an optical amplifier having a broad amplification waveband arises from the demands for increasing the optical signal's wavelength and the transmission volume. The wavelengths of 1.61 μm to 1.66 μm have been considered as appropriate for conserving and monitoring an optical system, so that it is desirable to develop an optical source and an optical amplifier for that system.

In recent years, there has been considerable work devoted to research and development on optical fiber amplifiers that comprise optical fibers as optical amplification materials, such as erbium (Er) doped optical fiber amplifiers (EDFAs), with increasing applications to the field of optical communication system. The EDFA works at a wavelength of 1.5 μm where a loss of silica-based optical fiber decreases to a minimum, and also it is known for its excellent characteristics of high gain of 30 dB or more, low noise, broad gain-bandwidth, no dependence on polarized waves, and high saturation power.

As described above, one of the remarkable facts to be required of applying the above EDFA to the WDM transmission is that the amplification waveband is broad. Up to now, a fluoride EDFA using a fluoride glass as a host of an erbium-doped optical fiber amplifier has been developed as a broad amplification band EDFA.

In U.S. Pat. Nos. 3,836,868, 3,836,871, and 3,883,357, Cooley et al. discloses the possibility of laser oscillation to be caused by tellurite glass containing an rare earth element. In this case, however, Cooley et al. have no idea of forming tellurite glass into an optical fiber because there is no description concerned about the adjustment of refractive index and the thermal stability of tellurite glass to be required for that formation.

In U.S. Pat. No. 5,251,062, Snitzer et al. insists that tellurite glass play an important role in extending the EDFA's amplification band and it should be formed into a fiber which is absolutely essential to induction of an optical amplification. Thus, they disclose the allowable percent ranges of ingredients in tellurite-glass composition in a concretive manner. The tellurite-glass composition includes a rare earth element as an optically active element and can be formed into a fiber. More specifically, the tellurite-glass composition of Snitzer et al. is a ternary composition comprising $TeO_2$, $R_2O$, and QO where R denotes a monovalent metal except Li and Q denotes a divalent metal. The reason why Li is excluded as the monovalent metal is that Li depresses thermal stability of the tellurite-glass composition.

In U.S. Pat. No. 5,251,062, furthermore, Snitzer et al. make a comparative study of fluorescence erbium spectra of silica and tellurite glass and find that the tellurite glass shows a broader erbium spectrum compared with that of the silica glass. They conclude that the ternary tellurite glass composition may allow a broadband amplification of EDFA and an optically active material such as praseodymium or neodymium may be added in that composition for inducing an optical amplification. In this patent document, however, there is no concrete description of the properties of gain, pump wavelength, signal wavelength, and the like which is important evidence to show that the optical amplification was actually down. In other words, U.S. Pat. No. 5,251,062 merely indicate the percent ranges of ingredients of ternary tellurite glass composition that can be used in an optical fiber.

Furthermore, Snitzer et al. show that thermal and optical features of various kinds of tellurite glass except of those described in U.S. Pat. No. 5,251,062 in a technical literature (Wang et al., Optical Materials, vol. 3 pages 187–203, 1994; hereinafter simply referred as "Optical Materials"). In this literature, however, there is also no concrete description of optical amplification and laser oscillation.

In another technical literature (J. S. Wang et al., Optics Letters, vol. 19 pages 1448–1449, 1994; hereinafter simply referred as "Optics Letters") published in right after the literature mentioned above, Snitzer et al. show the laser oscillation for the first time caused by using a single mode optical fiber of neodymium-doped tellurite glass. The single mode fiber comprises a core having the composition of 76.9% $TeO_2$—6.0% $Na_2O$—15.5% ZnO—1.5% $Bi_2O_3$—0.1% $Nd_2O_3$ and a clad having the composition of 75% $TeO_2$—5.0% $Na_2O$—20.0% ZnO and allows 1,061 nm laser oscillation by 81 nm pumping. In this literature, there is no description of a fiber loss. In Optical Materials, on the other hand, there is a description of which the loss for an optical fiber having a core composition of $Nd_2O_3$— 77% $TeO_2$—6.0% $Na_2O$—15.5% ZnO—1.5% $Bi_2O_3$ and a clad composition of 75% $TeO_2$—5.0% $Na_2O$—20.0% ZnO (it is deemed to be almost the same composition as that of Optics Letters) is 1500 dB/km at a wavelength of 1.55 μm (see FIG. 1 that illustrates a comparison between $^4I_{13/2}$ to $^4I_{15/2}$ $Er^{3+}$ emission in tellurite glass and $^4I_{13/2}$ to $^4I_{15/2}$ $Er^{3+}$ emission in fluoride glass). The core composition of this optical fiber is different from that of a ternary composition disclosed in U.S. Pat. No. 5,251,062 because the former includes $Bi_2O_3$. It is noted that there is no description or teach of thermal stability of $Bi_2O_3$-contained glass composition in the descriptions of Optics Letters, Optical Materials, and U.S. Pat. No. 5,251, 062 mentioned above.

However, the fluoride based EDFA has an amplification band of about 30 nm which is not enough to extend an amplification band of optical fiber amplifier for the purpose of extending the band of WDM.

As described above, tellurite glass shows a comparatively broader fluorescence spectral band width, so that there is a possibility to extend the amplification band if the EDFA uses the tellurite glass as its host. In addition, the possibility of producing a ternary system optical fiber using the composition of $TeO_2$, $R_2O$, and QO (wherein R is a univalent metal except Li and Q is a divalent atom) has been realized, so that laser oscillation at a wavelength of 1061 nm by a neodymium-doped single mode optical fiber mainly comprising the above composition has been attained. In contrast, EDFA using tellurite glass is not yet realized. Therefore, we will describe the challenge to realize a tellurite-based EDFA in the following.

First, the difference between the objective EDFA and the neodymium-doped fiber laser (i.e., the difference between 1.5 μm band emission of erbium and 1.06 μm band emission of neodymium in glass) should be described in detail.

An optical transition of the objective EDFA is shown in FIG. 2 where three different energy levels are indicated by Level 1, Level 2, and Level 3, respectively. For attaining an objective induced emission from Level 2 to Level 1, a population inversion between Level 1 and Level 2 is done by pumping from Level 1 to Level 3 and then relaxing from Level 3 to Level 2. This kind of the induced emission can be referred as a three-level system.

In the case of the neodymium, as shown in FIG. 3, a four-level system can be defined that a final level of the induced emission is not a ground level but a first level (Level 1) which is higher than the ground level. Comparing the three-level system with the four-level system, the former is hard to attain the population inversion so that an ending level of the induced emission is in a ground state. Accordingly, the three-level system EDFA requires enhanced optically pumping light intensity, and also the fiber itself should be of having the properties of low-loss and high Δn. In this case, the high Δn is for effective optically pumping.

Secondly, we will briefly described that an amplification band cannot be extended even if it is possible to perform an optical amplification when a transmission loss of fiber is large.

Wavelength dependencies of the silica-based EDFA and the tellurite-based EDFA are illustrated in FIG. 4. As shown in the figure, it can be expected that the tellurite-based EDFA will attain a broadband optical amplification broader than that of the silica-based EDFA. Comparing with the silica-based glass and the non-silica-based glass, a transmission loss at a communication wavelength of the latter is substantially larger than that of the former. In the optical fiber amplifier, therefore, the loss leads to a substantial decrease in gain.

As schematically shown in FIG. 5, if the loss is comparatively small, the amplification band of tellurite glass is close to the one shown in FIG. 4. If the loss is comparatively large, on the other hand, the amplification band of tellurite glass is narrowed.

In recent technical investigations on WDM transmission, by the way, it has been made attempts to speed up transmission through one channel for increasing transmission capacity. To solve this problem, it is necessary to optimize the chromatic dispersion characteristics of the Er-doped optical fiber. Up to now, however, no attention have been given to that characteristics.

For the tellurite glass, a wavelength at which a chromatic dispersion value takes zero is in the wavelengths longer than 2 μm. In the case of a high NA (Numerical Aperture) fiber to be used in EDFA, a chromatic dispersion value is generally −100 ps/km/nm or less at 1.55 μm band. Thus, a chromatic dispersion of a short optical fiber of about 10 m in length also takes the large value of −1 ps/nm or less.

For the use of tellurite EDFA in long-distance and high-speed WDM transmission, therefore, it is need to bring the chromatic dispersion close to zero as far as possible. As described above, however, as the material dispersion value of tellurite glass takes the value of zero at wavelengths of 2 μm and over. Therefore, the tellurite-based optical fiber cannot utilize the technique adopted in the silica-based optical fiber that brings the chromatic dispersion value at 1.55 μm band close to zero by optimizing the construction parameters of the fiber.

Furthermore, the tellurite-based optical fiber can be used as a host of praseodymium (Pr) for 1.3 μm band amplification. As described above, however, the tellurite-bade optical fiber has a large chromatic dispersion value as the absolute value. In the case of amplifying a high-speed optical signal by using the tellurite-based optical fiber, a distortion of pulse wavelength can be induced and thus the chromatic dispersion value should be corrected for. If not, the use of tellurite glass in an optical communication system falls into difficulties.

Next, an optical-fiber splicing between a non-silica-based optical fiber and a silica-based optical fiber will be described below.

For using the above non-silica-based topical fiber such as a tellurite optical fiber as an optical amplification or non-linear optical fiber, there is a necessity to connect to a silica-based optical fiber to form the junction between these fibers with low-loss and low reflection. However, these fibers have their own core refractive indexes which are different from each other. If these fibers are connected together as shown in FIGS. 6 and 7, a residual reflection can be observed so that the junction appropriately adaptable to practical use cannot be implemented. In FIGS. 6 and 7, reference numeral 1 denotes a non-silica-based optical fiber, 2 denotes a silica-based optical fiber, 5 denotes an optical binder, and 6 denotes a binder. In FIG. 6, furthermore, there is no optical binder applied on a boundary surface between the fibers. As shown in FIG. 8, therefore, the existence of residual reflection between the silica-based optical fibers 2a, 2b and the non-silica-based optical fiber 1 degrades the quality of signal because of a ghost (which acts as noise) due to a reflected signal on the connected ends of the fibers. Therefore, the connected portion between those fibers require −60 dB or over as a residual reflection factor for an optical amplifier (see Takei et al. "Optical Amplifier Module", Okidenki Kaihatu, vol. 64, No. 1, pp 63–66, 1997). For example, a zirconium-doped fluoride fiber, an indium-doped fluoride fiber, chalcogenide glass fiber (i.e., glass composition: As—S), and a tellurite glass fiber have their own core's refractive indexes of 1.4 to 1.5, 1.45 to 1.65 and 2.4 and 2.1, respectively, depending on the variations in their glass compositions. If one of those fibers is connected to a silica based optical fiber (core's refractive index is about 1.50 or less), a return loss R can be obtained by the formula (2) described below. In this case, the unit of R is dB and the residual reflective index is expressed in a negative form while the return loss is expressed in a positive form as an absolute value of the residual reflective index. The return loss can be obtained by the equation (1) below.

$$R = \left| 10 \log \left\{ \left[ \frac{(n_{NS} - n_S)}{(n_{NS} + n_S)} \right]^2 \right\} \right| \text{ (dB)} \tag{1}$$

where $n_{NS}$ and $n_S$ are core's refractive indexes of silica and non-silica optical fibers, respectively. The return loss between the silica-based optical fiber and the zirconium-doped fluoride optical fiber, indium-doped optical fluoride fiber, chalcogenide glass fiber (i.e., glass composition: As—S), or tellurite glass fiber is 35 dB or more, 26 dB or more, 13 dB, or 16 dB, respectively. In the case of Zr-based and In-based fluoride optical fiber, the return loss can be increased (while the residual reflection coefficient can be decreased) by bringing their refractive indexes to that of the silica-based optical fiber's core by modifying their glass compositions, respectively. However, the modification of glass composition leads to the formation of practical optical fiber under the constraint that the glass composition should be precisely formulated in the process of forming a fiber in a manner which is consistent with an ideal glass composition for the process of forming a low-loss fiber). A coupling between the silica-based optical fiber and the non-silica-based optical fiber has the following problems. That is, conventional fusion splicing procedures cannot be applied because of the difference in softening temperatures of both fibers (i.e., 1,400° C. for the silica-based optical fiber and less than 500° C. for the non-silica-based one); the conventional optical connector coupling technologies cannot be applied because there is no appropriate coupling method for the non-silica-based optical fiber; and so on. Thus, a general coupling method for coupling the Zr-based or In-based optical fiber to the silica-based optical fiber without depending on its glass composition has been demanded. In addition, a general coupling method for reliably coupling the chalcogenide glass optical fiber or the tellurite optical fiber to the silica-based optical fiber with a low-loss and low-reflection.

One of the conventional coupling technologies for solving such problems, Japanese Patent Application Laying-open No. 6-27343, is illustrated in FIGS. 9 and 10. In this technology, a non-silica-based optical fiber 1 and a silica-based optical fiber 2 are held in housings 7a and 7b, respectively. The fibers 1, 2 are positioned in their respective V-shaped grooves on substrates 8a, 8b and fixed on their respective housings 7a, 7b by means of bonding agents 10a, 10b and fiber-fixing plates 9a, 9b. In addition, there is a dielectric film 18 applied on a coupling end of one of the housings for preventing a reflection to be generated by coupling the fibers together. The coupling between the non-silica-based optical fiber 1 and the silica-based optical fiber 2 are carried out by using an optical bonding agent 5 made of ultraviolet-curing region after adjusting the relative positions of the housings 7a, 7b so as to match their optical axes. At this moment, the coupling end of the housing 7a is perpendicular to the optical axis of the non-silica-based optical fiber and also the coupling end of the housing 7b is perpendicular to the optical axis of the silica-based optical fiber, so that if the reflection of light is occurred at a boundary surface of the coupling the reflected light returns in the reverse direction, resulting in a falloff in the return loss. Accordingly, the conventional technology uses the dielectric film 18 to reduce the reflection from the boundary surface of the coupling. However, the conventional coupling requires a precision adjustment to a refractive index of the optical biding agent 5 and a refractive index and thickness of the dielectric film 18. That is, their refractive indexes must satisfy the following equations (2) and (3) if a core's refractive index of the non-silica-based optical fiber 1 is $n_1$ and a core's refractive index of the silica-based optical fiber 2 is $n_2$. A refractive index of the optical binding agent 5 is adjusted to $n_1$, while a refractive index and a thickness of the dielectric film 18 is adjusted to $n_1$ and $t_f$, respectively, so as to satisfy the following equations (2), (3).

$$n_f = \sqrt{n_1 \cdot n_2} \tag{2}$$

$$t_f = \frac{\lambda}{\sqrt[4]{n_1 \cdot n_2}} \tag{3}$$

wherein $\lambda$ is a signal wavelength (i.e., the wavelength to be used).

In the conventional technology, as described above, there is the need for precisely adjusting a refractive index of the optical binder 5 and a refractive index and thickness of the dielectric film 18 for constructing a coupling portion with the properties of low-reflection and low-loss by using the dielectric film 18. It means that the precise adjustments leads to difficulties in implementing a coupling between the fibers favorably with an improvement in yield.

A process of coupling two different optical fibers in accordance with another conventional technology, as shown in FIG. 11, comprises the steps of: holding an optical fiber 9a on a housing 7b and also holding an optical fiber 9a on a housing 7b; positioning these housings 7a, 7b in their right places so that a coupling end of the housing 7a that holds the optical fiber 19a and a coupling end of housing 7b that holds the optical fiber 19b are positioned with a θ-degree slant with respect to a direction perpendicular to the optical axes of the optical fibers 19a, 19b; and connecting the housing 7a and the housing 7b together after the positioning of the housings so as to concentrically adjust the optical axes in a straight line. The process is a so-called slant coupling method for realizing the coupling with low-reflection and low fiber-loss. However, this process is only applied to the fibers when their core refractive indexes are almost the same, so that it cannot be applied to the coupling between the non-silica-based optical fiber and the silica-based optical fiber which have different core refractive indexes with respect to each other.

SUMMARY OF THE INVENTION

A first object of the present invention is to provide a tellurite glass fiber of high Δn and low fiber-loss.

A second object of the present invention is to provide a tellurite glass fiber that includes the capability of realizing a broadband EDFA doped with an optically active rare earth element, which cannot be realized by the conventional glass compositions.

A third object of the present invention is to provide a broadband optical amplification medium that includes the capability of acting at wavelengths, especially from 1.5 μm to 1.7 μm, and also to provide an optical amplifier and a laser device which use such a medium and act at wavelengths in a broad range and have low-noise figures.

A fourth object of the present invention is to provide a general and practical technique of reliably coupling a non-silica-based optical fiber and a silica-based optical fiber or coupling optical fibers having different core refractive indexes with low fiber-loss and low reflection.

In a first aspect of the present invention, there is provided a tellurite glass as a glass material for an optical fiber or an optical waveguide, comprising:
  $0 < Bi_2O_3 \leq 20$ (mole %);
  $0 \leq Na_2O \leq 35$ (mole %);
  $0 \leq ZnO \leq 35$ (mole %); and
  $55 \leq TeO_2 \leq 90$ (mole %).

In a second aspect of the present invention, there is provided a tellurite glass as a glass material for an optical fiber or an optical waveguide, comprising:
  $1.5 < Bi_2O_3 \leq 15$ (mole %);
  $0 \leq Na_2O \leq 35$ (mole %);
  $0 \leq ZnO \leq 35$ (mole %); and
  $55 \leq TeO_2 \leq 90$ (mole %).

In a third aspect of the present invention, there is provided a tellurite glass as a glass material for an optical fiber or an optical waveguide, comprising:
  $0 < Bi_2O_3 < 20$ (mole %);
  $0 \leq Li_2O \leq 25$ (mole %);
  $0 \leq ZnO \leq 25$ (mole %); and
  $55 \leq TeO_2 \leq 90$ (mole %).

In a fourth aspect of the present invention, there is provided a tellurite glass as a glass material for an optical fiber or an optical waveguide, comprising:
  $0 < Bi_2O_3 \leq 20$ (mole %);
  $0 \leq M_2O \leq 35$ (mole %);
  $0 \leq ZnO \leq 35$ (mole %); and
  $55 \leq TeO_2 \leq 90$ (mole %), wherein
    the M is at least two univalent metals selected from a group of Na, Li, K, Rb, and Cs.

In a fifth aspect of the present invention, there is provided a tellurite glass as a glass material for an optical fiber or an optical waveguide, comprising:
  $1.5 < Bi_2O_3 \leq 15$ (mole %);
  $0 \leq M_2O \leq 35$ (mole %);
  $0 \leq ZnO \leq 35$ (mole %); and
  $55 \leq TeO_2 \leq 90$ (mole %), wherein
    the M is at least two univalent metals selected from a group of Na, Li, K, Rb, and Cs.

In a sixth aspect of the present invention, there is provided a tellurite glass as a glass material for an optical fiber or an optical waveguide, comprising:
  $0 < Bi_2O_3 \leq 20$ (mole %);
  $0 \leq Li_2O_3 \leq 25$ (mole %);
  $0 \leq Na_2O \leq 15$ (mole %);
  $0 \leq ZnO \leq 25$ (mole %); and
  $60 \leq TeO_2 \leq 90$ (mole %).

In a seventh aspect of the present invention, there is provided a tellurite glass as a glass material for an optical fiber or an optical waveguide that contains erbium at least in a core, consisting of a glass composition that contains $Al_2O_3$.

In an eighth aspect of the present invention, there is provided a tellurite glass as a glass material for an optical fiber or an optical waveguide, wherein
  the glass material has a composition of:
  $TeO_2$—$ZnO$—$M_2O$—$Bi_2O_3$—$Al_2O_3$.
where M is at least one alkali element.

In a ninth aspect of the present invention, there is provided a tellurite glass as a glass material for an optical fiber or an optical waveguide, comprising:
  $0 < Bi_2O_3 \leq 10$ (mole %);
  $0 \leq Li_2O_3 \leq 30$ (mole %);
  $0 \leq ZnO \leq 4$ (mole %);
  $70 \leq TeO_2 \leq 90$ (mole %); and
  $0 \leq Al_2O_3 \leq 3$ (mole %).

In a tenth aspect of the present invention, there is provided a tellurite glass as a glass material for an optical fiber or an optical waveguide, comprising:
  $0 < Bi_2O_3 \leq 15$ (mole %);
  $0 \leq Na_2O \leq 30$ (mole %);
  $0 \leq ZnO \leq 35$ (mole %);
  $60 \leq TeO_2 \leq 90$ (mole %); and
  $0 \leq Al_2O_3 \leq 4$ (mole %).

Here, a concentration of the $Bi_2O_3$ may be:
  $4 < Bi_2O_3 < 7$.

In an eleventh aspect of the present invention, there is provided an optical amplification medium comprised of an optical amplifier or an optical waveguide having a core glass and a clad glass, wherein
  at least one of the core glass and the clad glass is made of the tellurite glass of one of the novel tellurite glasses described above.

In a twelfth aspect of the present invention, there is provided an optical amplification medium comprised of an optical amplifier or an optical waveguide having a core glass and a clad glass, wherein
  the core glass is made of a tellurite glass having a composition of:
    $0 < Bi_2O_3 \leq 20$ (mole %), preferably $1.5 < Bi_2O_3 \leq 15$ (mole %), or more preferably $4 < Bi_2O_3 \leq 7$;
    $0 \leq Na_2O \leq 35$ (mole %);
    $0 \leq ZnO \leq 35$ (mole %); and
    $55 \leq TeO_2 \leq 90$ (mole %), and
  the clad is made of a tellurite glass having a composition selected from a group of:
    a first composition including
      $5 < Na_2O < 35$ (mole %),
      $0 \leq ZnO < 10$ mole %), and
      $55 < TeO_2 < 85$ (mole %);
    a second composition including
      $5 < Na_2O < 35$ (mole %),
      $10 < ZnO \leq 20$ mole %), and
      $55 < TeO_2 < 85$ (mole %); and
    a third composition including
      $0 \leq Na_2O < 25$ (mole %),
      $20 < ZnO \leq 30$ mole %), and
      $55 < TeO_2 < 75$ (mole %).

Here, at least one of the core glass and the clad glass may contain erbium or erbium and ytterbium.

At least one of the core glass and the clad glass may contain at least one selected from a group consisting of boron (B), phosphorus (P), and hydroxyl group.

At least one of the core glass and the clad glass may include an element selected from a group consisting of Ce, Pr, Nd, Sm, Tb, Gd, Eu, Dy, Ho, Tm, and Yb.

In a thirteenth aspect of the present invention, there is provided an optical amplification medium comprised of an optical amplifier or an optical waveguide having a core and a clad which are made of a glass material and at least the core contains erbium, wherein
  the glass material consists of a tellurite composition that contains $Al_2O_3$.

In a fourteenth aspect of the present invention, there is provided an optical amplification medium comprised of an optical amplifier or an optical waveguide having a core and a clad which are made of a glass material and at least the core contains erbium, wherein the glass material consists of a tellurite composition of:

$$TeO_2\text{—}ZnO\text{—}M_2O\text{—}Bi_2O_3\text{—}Al_2O_3$$

where

M is at least one alkali element.

Here, a cut-off wavelength may be in the range of 0.4 μm to 2.5 μm.

In a fifteenth aspect of the present invention, there is provided a laser device comprising an optical cavity and an excitation light source, wherein at least one of optical amplification media in the optical cavity is one of the novel optical amplification media described above.

In a sixteenth aspect of the present invention, there is provided a laser device having a plurality of optical amplification media comprised of optical fibers that contain erbium in their cores and arranged in series, wherein each of the optical amplification media is one of the novel optical amplification media described above.

In a seventeenth aspect of the present invention, there is provided a laser device having an amplification medium and an excitation light source, wherein the amplification medium is one of the novel optical amplification media described above.

In an eighteenth aspect of the present invention, there is provided an optical amplifier having an optical amplification medium, an input device that inputs an excitation light and a signal light for pumping the optical amplification medium, wherein the optical amplification medium is one of the novel optical amplification media described above.

In a nineteenth aspect of the present invention, there is provided an optical amplifier having a plurality of optical amplification media comprised of optical fibers that contain erbium in their cores and arranged in series, wherein each of the optical amplification media is one of the novel optical amplification media described above.

In a twentieth aspect of the present invention, there is provided an optical amplifier having a tellurite glass as an optical amplification medium, comprising:

a dispersion medium which is placed on at least one position in the front of or at the back of the optical amplification medium, wherein the dispersion medium compensates for dispersion of wavelengths by a value of chromatic dispersion that takes a plus or negative number opposite to a value of chromatic dispersion for the optical amplification medium.

Here, the optical amplification medium may be an optical waveguide made of a tellurite glass that contains a rare-earth element or a transition metal element.

The tellurite glass may consist of a composition selected from:

$$TeO_2\text{—}ZnO\text{—}M_2O\text{—}Bi_2O_3;$$

$$TeO_2\text{—}ZnO\text{—}M_2O\text{—}Bi_2O_3\text{—}Al_2O_3,$$

and $$TeO_2\text{—}WO_3\text{—}La_2O_3\text{—}Bi_2O_3\text{—}Al_2O_3$$

where M is at least one alkali element.

The dispersion medium may be one selected from an optical fiber and a fiber-bragg-grating.

In a twenty-first aspect of the present invention, there is provided an optical amplifier having a plurality of stages of optical amplification portions that include erbium-doped optical fibers as their optical amplification media, wherein a tellurite glass optical fiber is used as a material of the optical fiber in at least one of the optical amplification portions except one at the front thereof, and an optical amplification portion positioned in front of the optical amplification portion using the tellurite glass optical fiber is comprised of an erbium-doped optical fiber, where a product of an erbium-doping concentration and a fiber-length of the erbium-doped optical fiber is smaller than that of the tellurite glass fiber.

Here, the tellurite glass may consist of a composition selected from:

$$TeO_2\text{—}ZnO\text{—}M_2O\text{—}Bi_2O_3;$$

and $$TeO_2\text{—}ZnO\text{—}M_2O\text{—}Bi_2O_3\text{—}Al_2O_3,$$

where M is at least one alkali element.

A material of the optical amplification medium may be one selected from a group of a silica optical fiber, a fluoro-phosphate optical fiber, a phosphate optical fiber, and a calcogenide optical fiber, in addition to the tellurite optical fiber.

An optical fiber material except a tellurite optical fiber may be used as at least one optical amplification portion at any given stage up to the optical amplification portion using the tellurite glass fiber.

A product of an erbium-addition concentration and a fiber-length of at least one optical fiber, which is positioned at any given stage up to the optical amplification portion using the tellurite glass fiber, may be smaller than that of the tellurite optical fiber.

In a twenty-second aspect of the present invention, there is provided an optical amplifier using erbium-doped optical fibers as optical amplification media, comprising at least one arrangement configuration wherein at least two tellurite optical fibers each having a different product of an erbium-doping concentration and a fiber-length are arranged in series so that the tellurite optical fiber having a smaller product of an erbium-addition concentration and a fiber-length is placed at the front stage up to the tellurite optical fiber having a larger product of an erbium-addition concentration and a fiber-length.

Here, the tellurite glass may consist of a composition selected from:

$$TeO_2\text{—}ZnO\text{—}M_2O\text{—}Bi_2O_3;$$

and $$TeO_2\text{—}ZnO\text{—}M_2O\text{—}Bi_2O_3\text{—}Al_2O_3,$$

where M is at least one alkali element.

In a twenty-third aspect of the present invention, there is provided an optical-fiber splicing structure for contacting a splicing end surface of a first housing in which an end of a first optical fiber is held and an splicing end surface of a second housing in which an end of a second optical fiber is held in a state of co-axially centering an optical axis of the first optical fiber and an optical axis of the second optical fiber, where at least one of the first optical fiber and the second optical fiber is a non-silica-based optical fiber, wherein optical axes of the first and second optical fibers are held in the first and second housings respectively at angles $\theta_1$ and $\theta_2$ ($\theta_1 \neq \theta_2$) from a vertical axis of a boundary surface between the splicing end surfaces, and a relationship between the angles $\theta_1$ and $\theta_2$ satisfies Snell's law represented by an equation (4) at the time of splicing the first and second optical fibers:

$$\frac{\sin\theta_1}{\sin\theta_2} = \frac{n_2}{n_1} \quad (4)$$

where $n_1$ is a refractive index of the first optical fiber and $n_2$ is a refractive index of the second optical fiber.

Here, the splicing end surface of the first optical fiber may be connected to the splicing end surface of the second optical fiber through an optical adhesive at the time of splicing the first and second optical fibers.

The splicing end surface of the first optical fiber and the splicing end surface of the second optical fiber may be kept in absolute contact with each other at the time of splicing the first and second optical fibers.

The first and second optical fibers may be non-silica-based optical fibers.

The non-silica-based optical fibers may be selected from Zr- or In-based fluoride optical fibers, chalcogenide optical fibers, and tellurite glass optical fibers.

The non-silica-based optical fibers may be selected from Zr- or In-based fluoride optical fibers, chalcogenide optical fibers, and tellurite glass optical fibers, and furthermore the non-silica-based optical fibers may be doped with a rare-earth element.

The first optical fiber may be a tellurite glass optical fiber, the second optical fiber may be a silica-based optical fiber, and the angle $\theta_1$ may be of 8 or more degrees.

The first optical fiber may be a Zr-based fluoride optical glass fiber, the second optical fiber may be a silica-based optical fiber, and the angle $\theta_1$ may be of 3 or more degrees.

The first optical fiber may be a In-based fluoride optical glass fiber, the second optical fiber may be a silica-based optical fiber, and the angle $\theta_1$ may be of 4 or more degrees.

The first optical fiber may be a chalcogenide optical glass fiber, the second optical fiber may be a silica-based optical fiber, and the angle $\theta_1$ may be of 8 or more degrees.

In a twenty-fourth aspect of the present invention, there is provided a light source comprising:

an optical amplification medium which is one selected from a group of an erbium-doped tellurite optical fiber and an optical waveguide; and an optical coupler arranged on an end of the optical amplification medium, wherein at least one terminal of the optical coupler is equipped with a reflector.

Here, the erbium-doped tellurite optical fiber or the optical waveguide may consist of the novel tellurite glasses described above.

The reflector may be comprised of one selected from a group of a dielectric-multiple-film filter and a fiber-bragg-grating.

In a twenty-fourth aspect of the present invention, there is provided an optical amplifier using an erbium-doped tellurite optical fiber or an optical waveguide as an optical amplification medium, comprising an optical coupler arranged on an end of the optical amplification medium, wherein at least one terminal of the optical coupler is equipped with a reflector.

Here, the erbium-doped tellurite optical fiber or the optical waveguide may consist of the novel tellurite glasses described above.

The reflector may be comprised of one selected from a group of a dielectric-multiple-film filter and a fiber-bragg-grating.

The above and other objects, effects, features and advantages of the present invention will become more apparent from the following description of embodiments thereof taken in conjunction with the accompanying drawings.

DETAILED DESCRIPTION OF THE PREFERRED EMBODIMENTS

First of all, we will describe tellurite glass compositions of $Bi_2O_3$—$Na_2O$—ZnO—$TeO_2$ and $Bi_2O_3$—$Li_2O$—ZnO—$TeO_2$.

The tellurite glass composition can be provided as one of the following compositions A, B, and C.

The first composition A consists of: $0<Bi_2O_3 \leq 20$ (mole %); $0 \leq ZnO \leq 35$ (mole %); and $55 \leq TeO_2 \leq 90$ (mole %).

The second composition B consists of: $1.5 < Bi_2O_3 \leq 15$ (mole %); $0 \leq Na_2O \leq 35$ (mole %); and $55 \leq TeO_2 \leq 90$ (mole %).

The third composition C consists of: $0 < Bi_2O_3 \leq 20$ (mole %); $0 \leq Li_2O \leq 25$ (mole %); $0 \leq ZnO \leq 25$ (mole %); and $55 \leq TeO_2 \leq 90$ (mole %).

Figure 12:
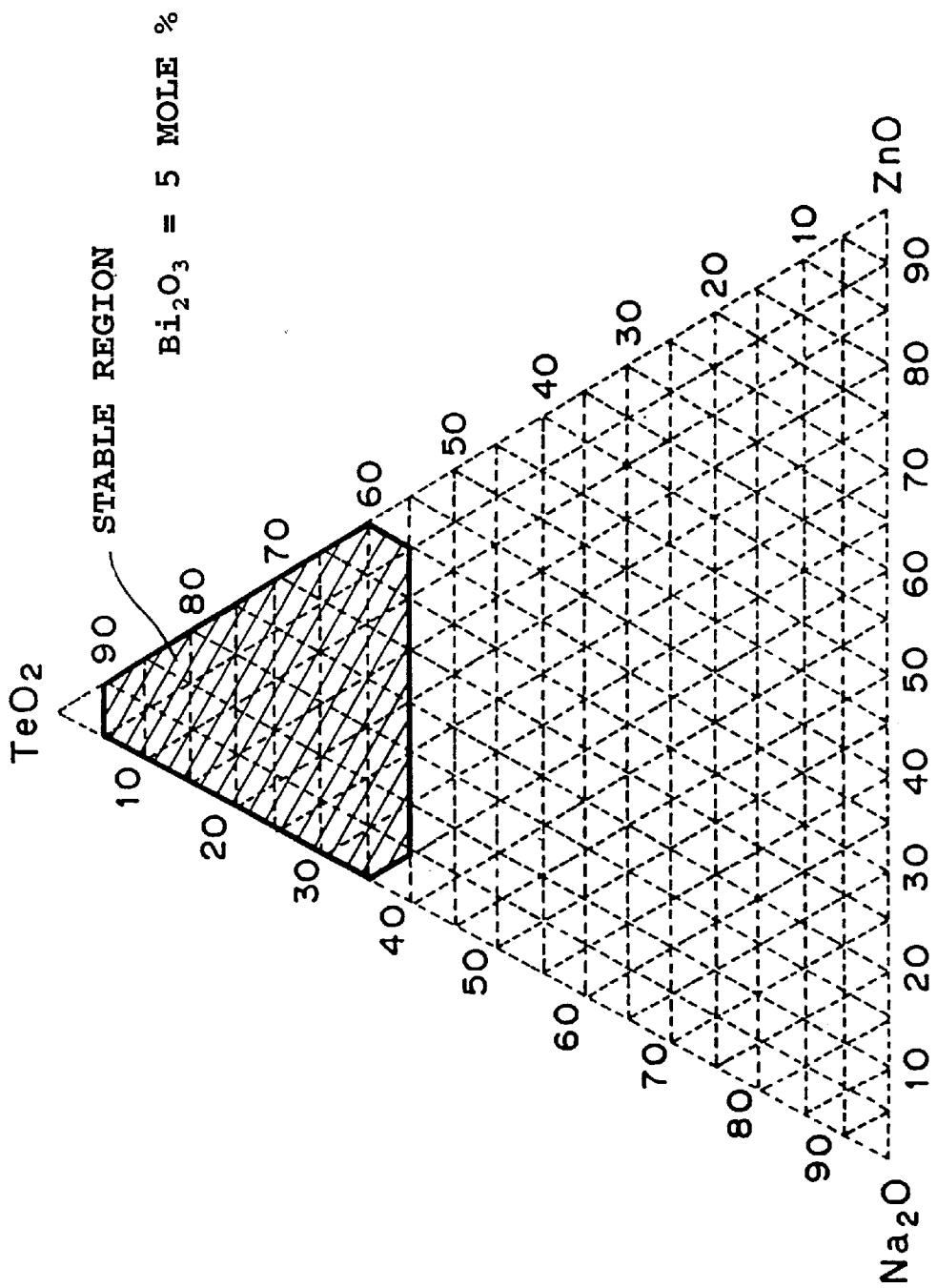
FIG. 12 is a schematic representation of the stable glass formation range for $TeO_2$—$Na_2O$—$ZnO$ glass.
Figure 13:
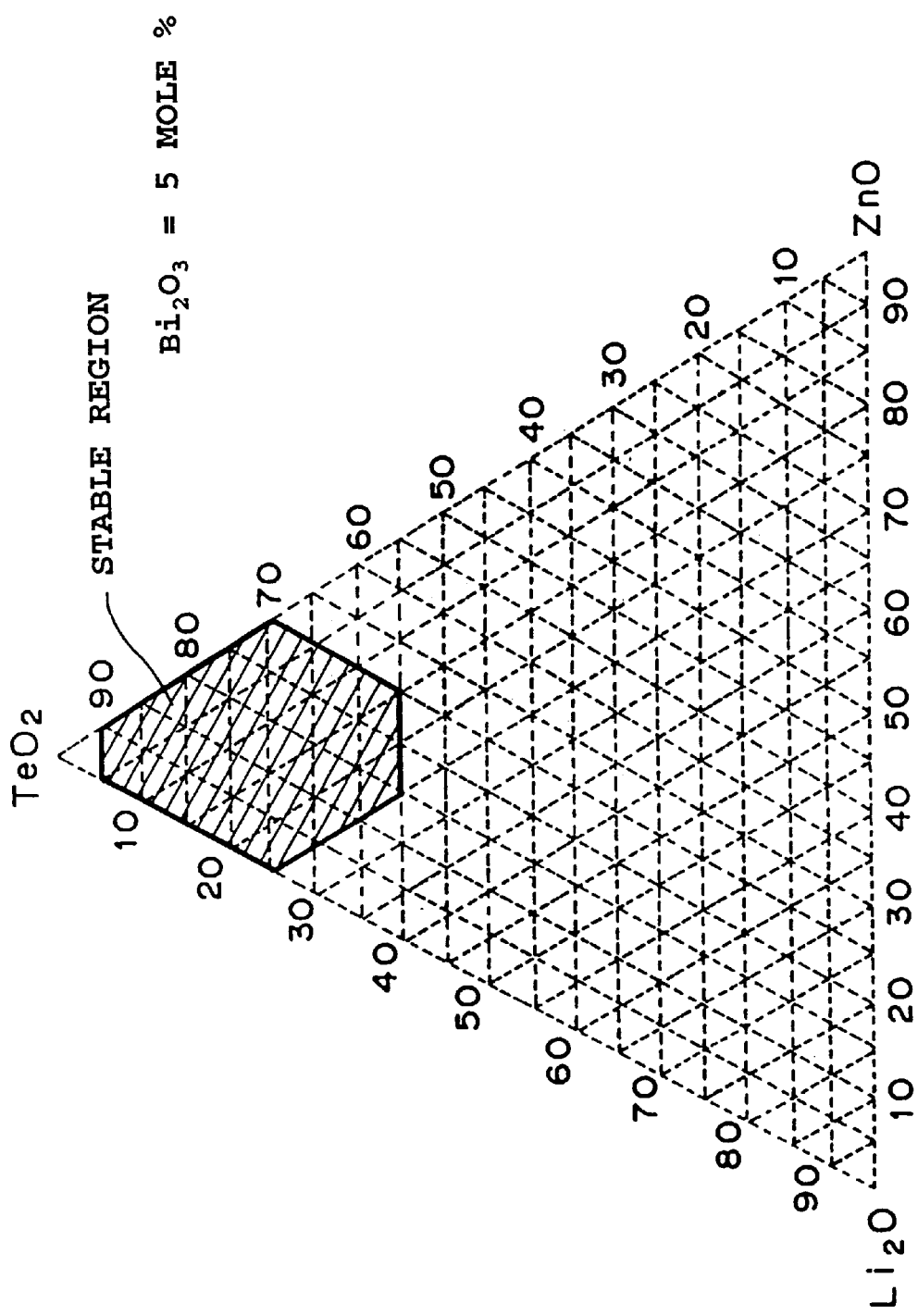
FIG. 13 is a schematic representation of the stable glass formation range for $TeO_2$—$Li_2O$—$ZnO$ glass when $Bi_2O_3 = 5$ mole %.

Each of FIG. 12 and FIG. 13 illustrates a composition range that shows interrelationship among ingredients of the glass composition. A stable region (region A) indicates an allowable range of each ingredient in the composition (i.e., FIG. 12 for the composition A or B in which $Bi_2O_3=5$ mole %, and FIG. 13 for the composition C in which $Bi_2O_3=5$ mole %). That is, the stabilization of glass can be attained when a content of each ingredient is in that range.

A thermal stability of the glass composition for preparing a fiber can be estimated by a technique of differential scanning calorimetry (DSC) generally used to indicate phase changes, so that a glass composition that has a larger value of Tx-Tg (Tx: crystallization temperature, and Tg: glass transition temperature) is a more stable glass composition. The process for preparing a single-mode optical fiber includes the steps of elongating and drawing a glass preform through the addition of heat, so that the glass preform is subjected to elevated temperatures twice. If a crystallization temperature (Tx) of the glass preform is almost the same order of a glass transition temperature (Tg), crystalline nuclei grow one after another resulting in an increase in scattering loss of the optical fiber. If a value of Tx–Tg is large, on the other hand, a low-loss optical fiber can be formed. In the case of a glass composition defined in that region shown in FIG. 12, a value of Tx–Tg is 120° C. or more and thus the glass composition can be used in the process for preparing the low-loss optical fiber. However, the low-loss optical fiber cannot be formed when a glass composition out of that region is used in the steps of preparing both of core and clad. Among the ingredients of the composition, the addition of $Bi_2O_3$ has the large effect of stabilizing the glass.

Figure 14:
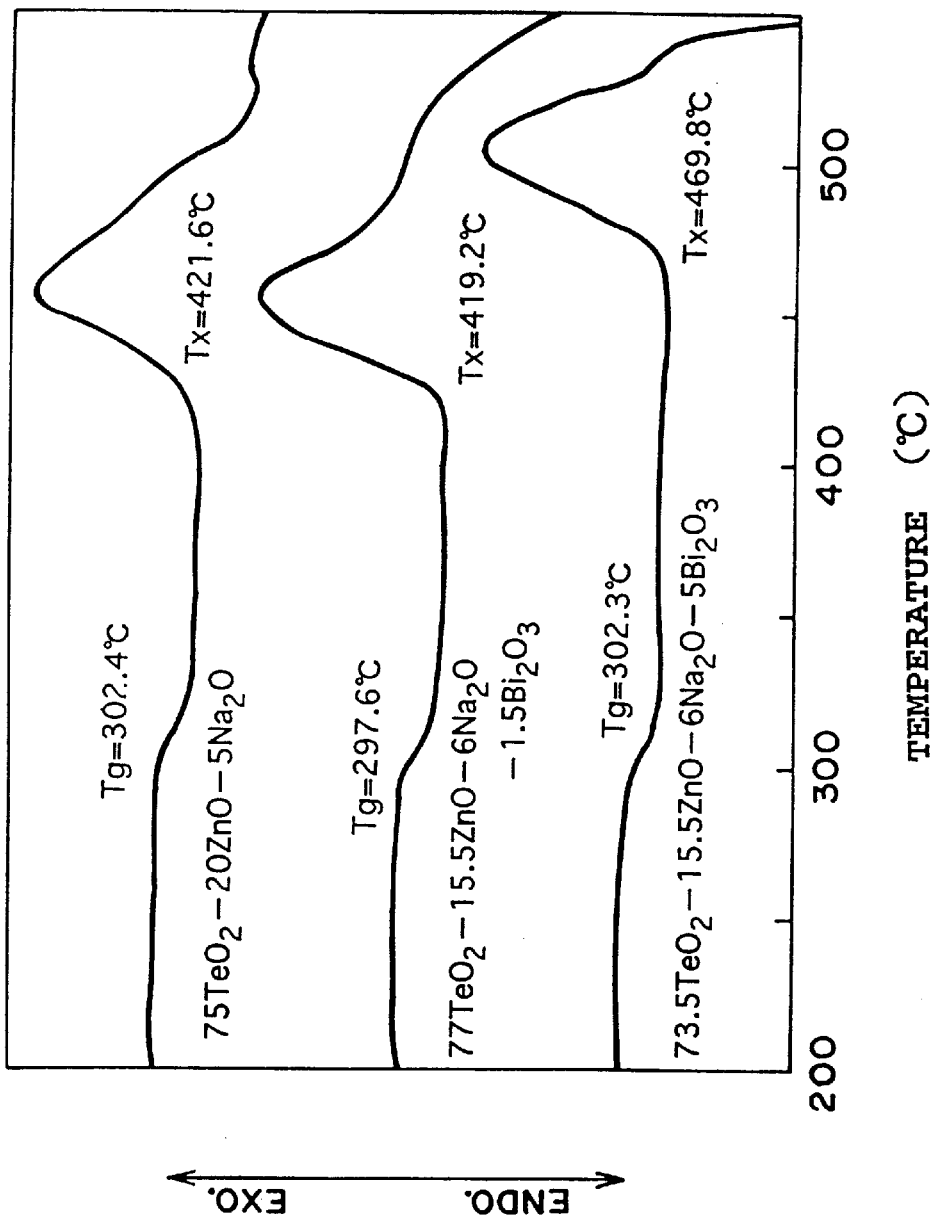
FIG. 14 is a graphical representation of the results of DSC measurement, where the upper line is for $75TeO_2$—$20ZnO$—$5Na_2O$ glass in the absence of $Bi_2O_3$, the middle line is for $77TeO_2$—$15.5ZnO$—$6Na_2O$—$1.5Bi_2O_3$ glass, and the lower line is for $73.5TeO_2$—$15.5ZnO$—$6Na_2O$—$5Bi_2O_3$ glass.

Referring now to FIG. 14, there is shown the results of DSC measurements on three different compositions:

75TeO$_2$—20ZnO—5Na$_2$O, 77TeO$_2$—15.5ZnO—6Na$_2$O—1.5Bi$_2$O$_3$, and 73.5TeO$_2$—15.5ZnO—6Na$_2$O—5Bi$_2$O$_3$, which are characterized by their respective contents of Bi$_2$O$_3$ (i.e., Bi$_2$O$_3$=0, 1.5, and 5 mole %, respectively). Each measurement is performed by breaking a glass sample, packing the bulk of broken glass (a piece of glass is 30 mg in weight) in a sealed container made of silver, and subjecting the glass in the container to the DSC measurement in an argon atmosphere at a heat-up rate of 10° C./minute. As is evident from FIG. 14, a value of Tx–Tg is varied among the glass compositions. That is, the value for Bi$_2$O$_3$=0 takes on 119.2° C., the value for Bi$_2$O$_3$=1.5 mole % takes on 121.6° C., and the value for Bi$_2$O$_3$=5 mole % takes on 167.5° C. Among them, the glass composition of 73.5TeO$_2$—15.5ZnO—6Na$_2$O—5Bi$_2$O$_3$, which corresponds to the composition B mentioned above, shows the most excellent thermal stability compared with other compositions because a peak of the curve for that composition (Bi$_2$O$_3$=5 mole %) shifts from peaks of others about 40° C. or more to the side of higher temperatures.

Figure 15:
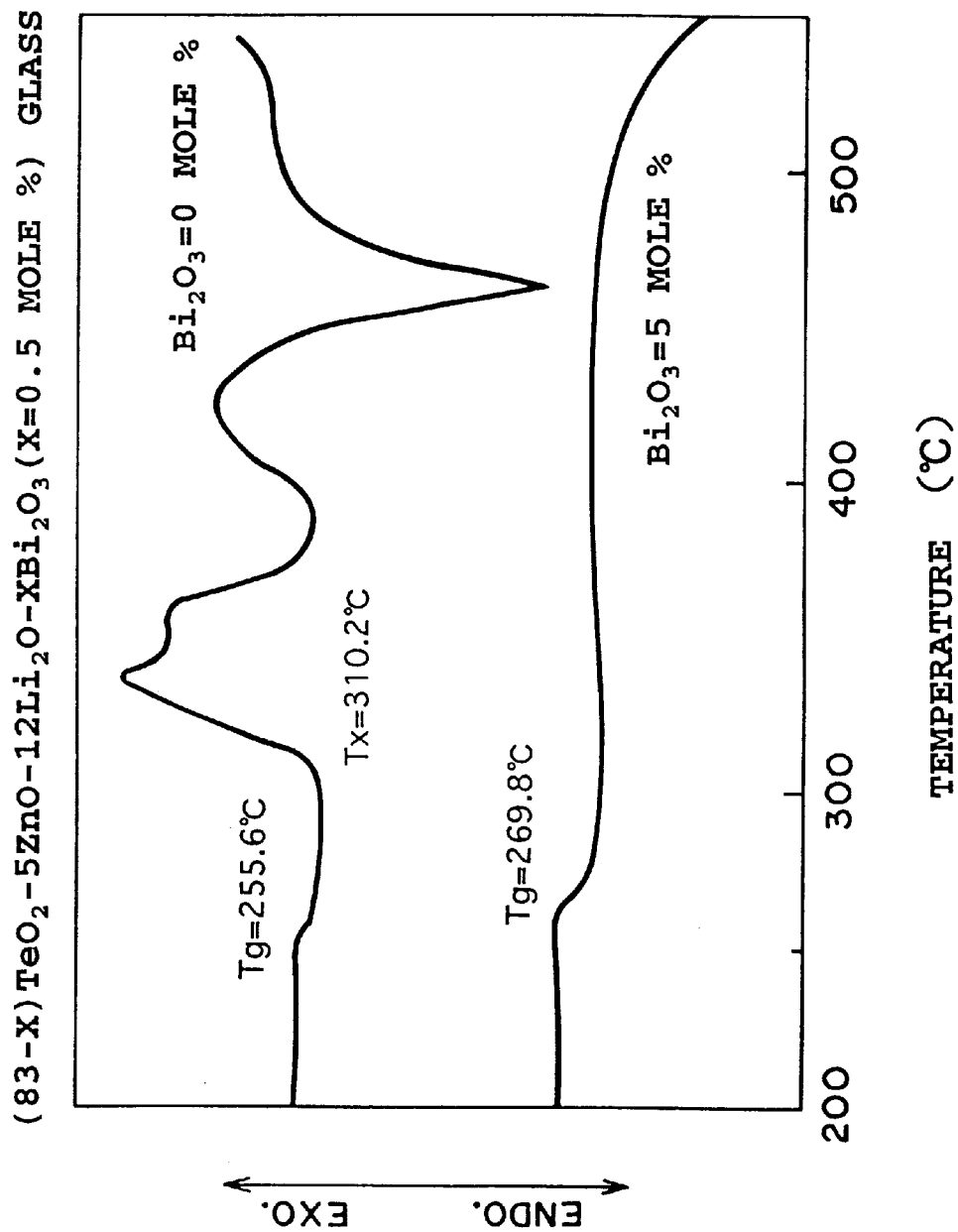
FIG. 15 is a graphical representation of the results of DSC measurement, where the upper line is for $83TeO_2$—$5ZnO$—$12Li_2O$ glass and the lower line is for $78TeO_2$—$5ZnO$—$12Li_2O$—$5Bi_2O_3$ glass.

FIG. 15 shows the results of DSC measurements on two different compositions that contain Li: Bi$_2$O$_3$=0 mole % and Bi$_2$O$_3$=5 mole %, where the latter corresponds to the composition C mentioned above. As shown in the figure, a value of Tx–Tg for Bi$_2$O$_3$=0 mole % takes on 54.6° C. On the other hand, there is no heating peak of crystallization for the composition of Bi$_2$O$_3$=5 mole %, so that a value of Tx–Tg for Bi$_2$O$_3$=5 mole % is infinity and thus a thermal stability of the glass can be dramatically increased. This kind of effect can be also observed when a trivalent metal oxide (Al$_2$O$_3$, La$_2$O$_3$, Er$_2$O$_3$, Nd$_2$O$_3$, or the like) is added instead of Bi$_2$O$_3$.

Figure 16:
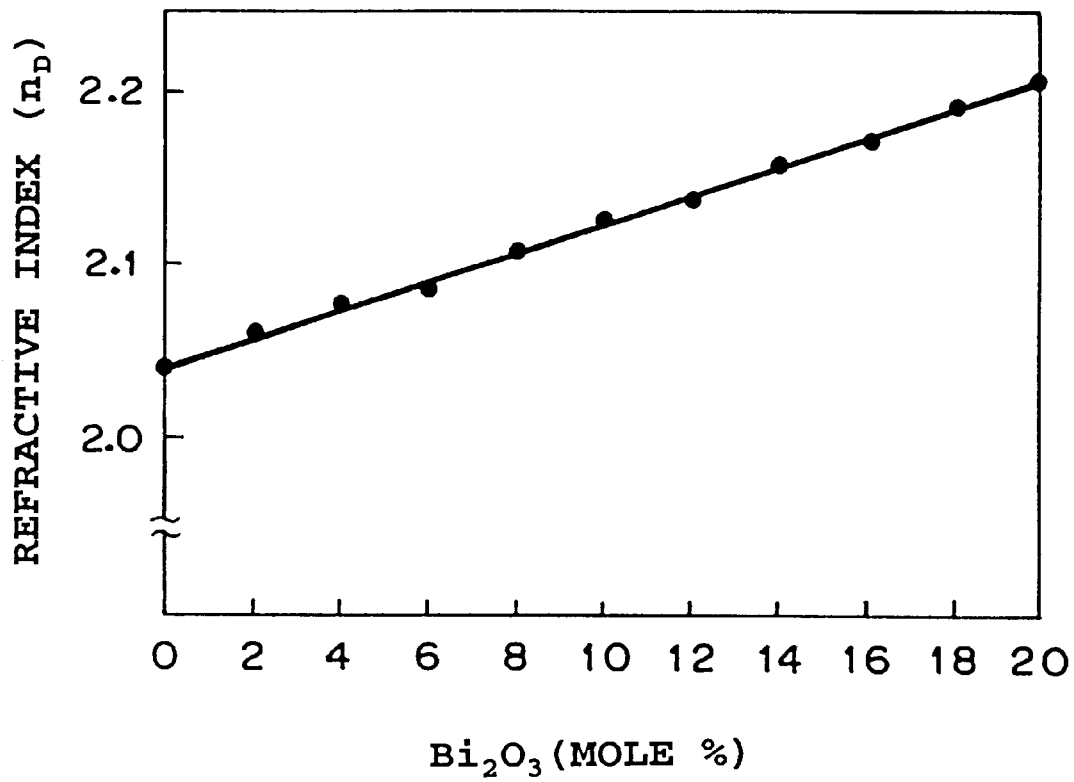
FIG. 16 is a graphical representation of the dependency of a refractive index ($n_D$) of $TeO_2$—$Na_2O$—$ZnO$—$Bi_2O_3$ glass on $Bi_2O_3$ content.

The addition of Bi$_2$O$_3$ also crucially effects on an adjustment in refractive indexes. FIG. 16 shows that the dependence of a refractive index ($n_D$) of TeO$_2$-glass on an added amount of Bi$_2$O$_3$. As shown in the figure, there is the direct proportionality between the refractive index ($n_D$) of TeO$_2$-glass and the added amount of Bi$_2$O$_3$. The $n_D$ value varies from 2.04 to 2.2 if the added amount of Bi$_2$O$_3$ varies from 0 to 20 mole %.

Through the use of such a property, therefore, optical fibers that have large and small values (from about 0.2% to about 6%) of relative refractive-index difference can be easily designed by changing the added amount of Bi$_2$O$_3$.

Next, we will describe an optical amplification medium as one of the preferred embodiments of the present invention.

The optical amplification medium comprises a core and a clad.

The core is provided as an optical fiber made of a tellurite composition A that consists of: 0<Bi$_2$O$_3$<20 (mole %); 0<Na$_2$O<15 (mole %); 5≦ZnO≦35 (mole %); and 60≦TeO$_2$≦90 (mole %).

The clad comprises one of tellurite glass compositions (B1, C1, or D1) in the form of an optical fiber or an optical waveguide as a host of rare-earth element, where the composition (B1) consists of: 5<Na$_2$O<35 (mole %); 0≦ZnO<10 (mole %); and 55<TeO$_2$<85 (mole %), the composition (C$_1$) consists of: 5<Na$_2$O<35 (mole %); 10<ZnO≦20 (mole %); and 55<TeO$_2$<85 (mole %), and the composition (D1) consists of: 0≦Na$_2$O<25 (mole %); 20<ZnO≦30 (mole %); 55<TeO$_2$<75 (mole %). The composition rages of those compositions B1, C1, and D1 that stabilize glass are illustrated in FIG. 17.

Figure 17:
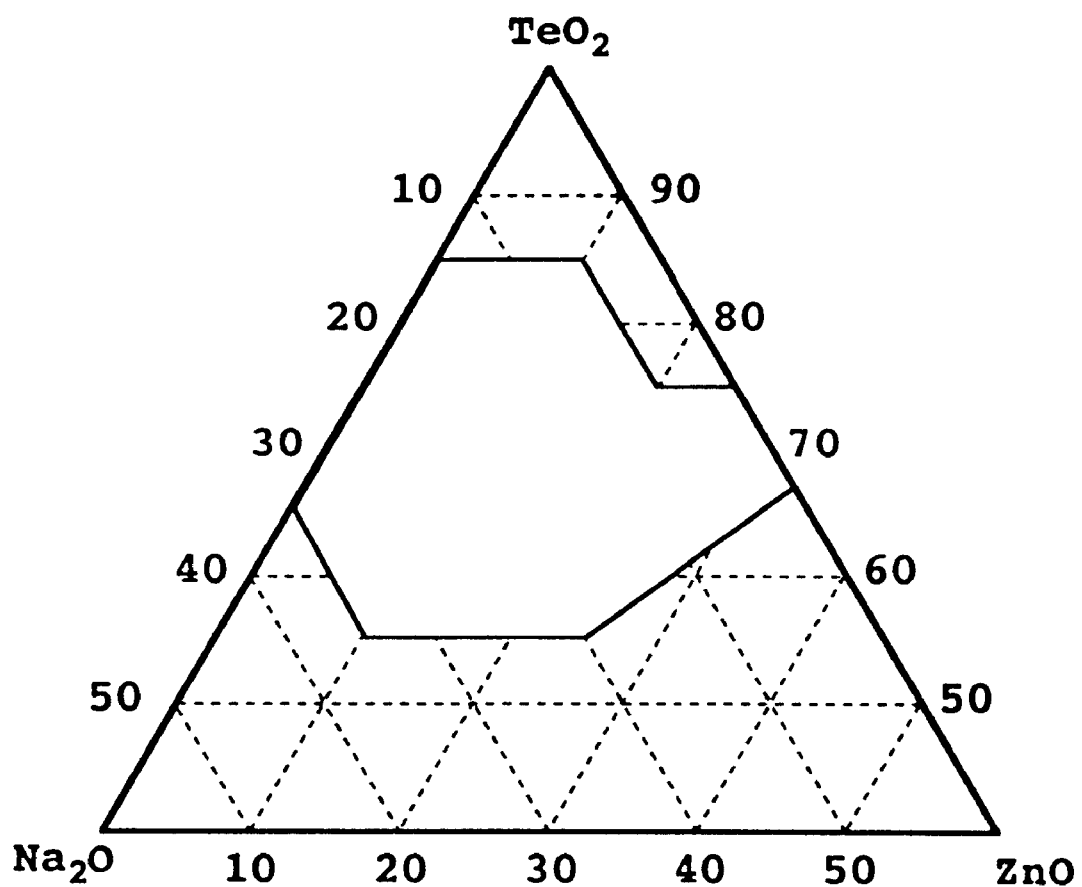
FIG. 17 is a schematic representation of the stable glass formation range for $TeO_2$—$Na_2O$—$ZnO$ glass.

Glass prepared from the composition defined in the region shown in FIG. 17 shows that a value of Tx–Tg is 100° C. Therefore, the glass is not crystallized during the fiber-forming process including a drawing step, so that it can be used in the process of forming a low-loss optical fiber.

By the way, at least one of the tellurite glass compositions to be used in core and clad formations may be doped with erbium or erbium and ytterbium.

A laser device according to the present invention comprises an optical amplification medium and an excitation light source, and is mainly characterized by the effective use of induced emission transition of Er from $^4I_{13/2}$ level to $^4I_{15/2}$ level.

Figure 18:
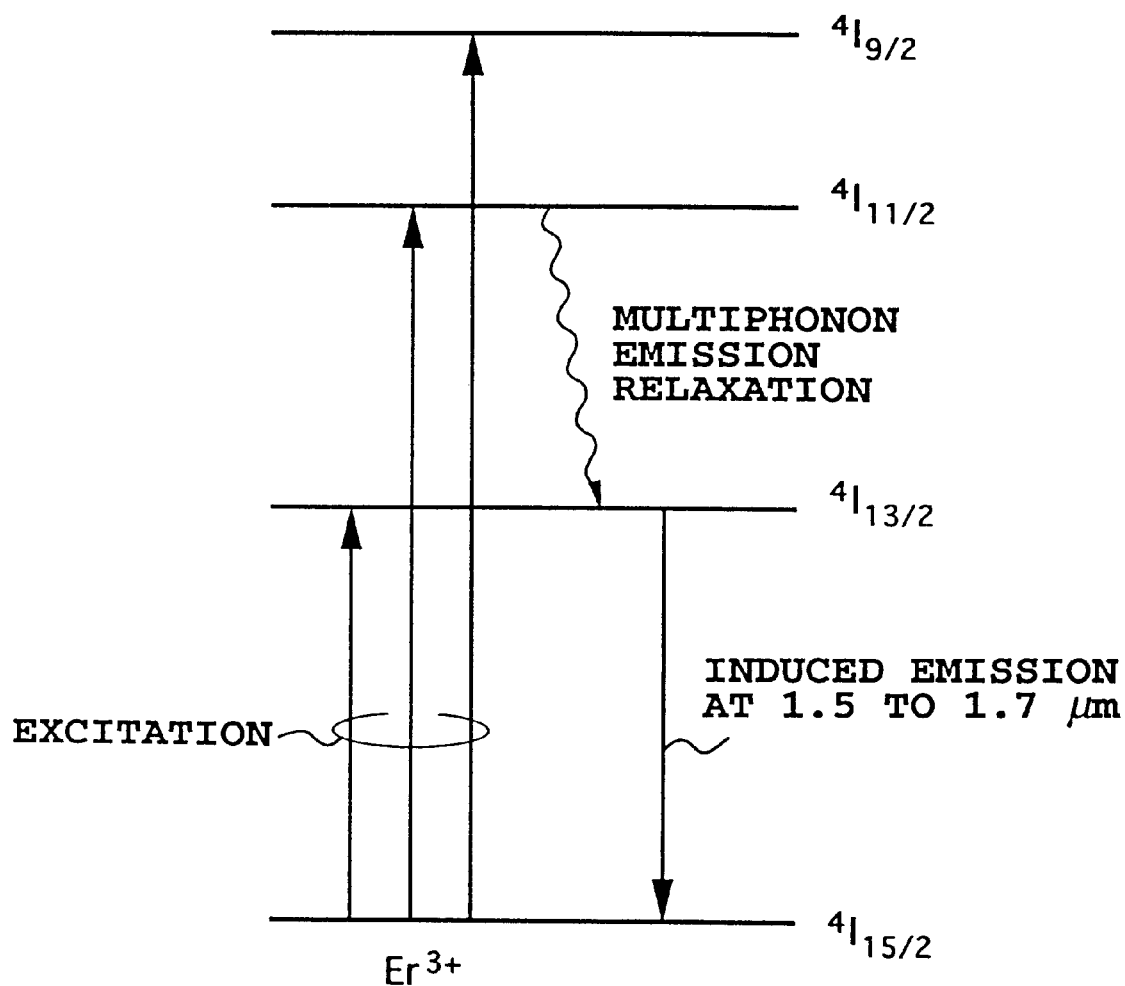
FIG. 18 is an energy-level diagram of $Er^{3+}$.

FIG. 18 is an energy level diagram of Er$^{3+}$, which illustrates an induced emission from the upper level of $^4I_{13/2}$ to the ground level of $^4I_{15/2}$ (hereinafter, referred as $^4I_{13/2}$→$^4I_{15/2}$ emission).

Figure 1:
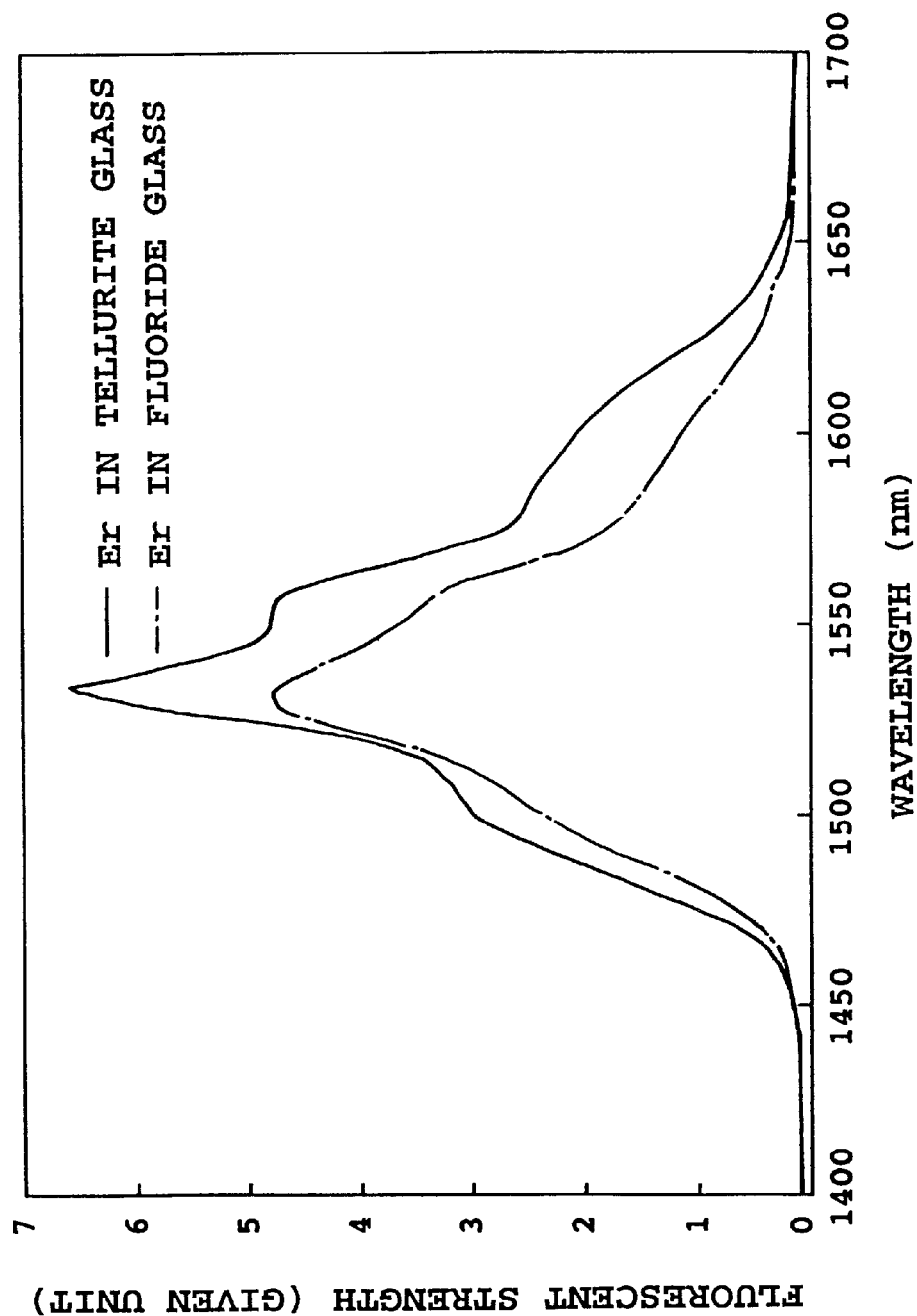
FIG. 1 is a spectrum diagram that illustrates the $^4I_{13/2}$–$^4I_{15/2}$ emission of Er in the tellurite glass.
Figure 2:
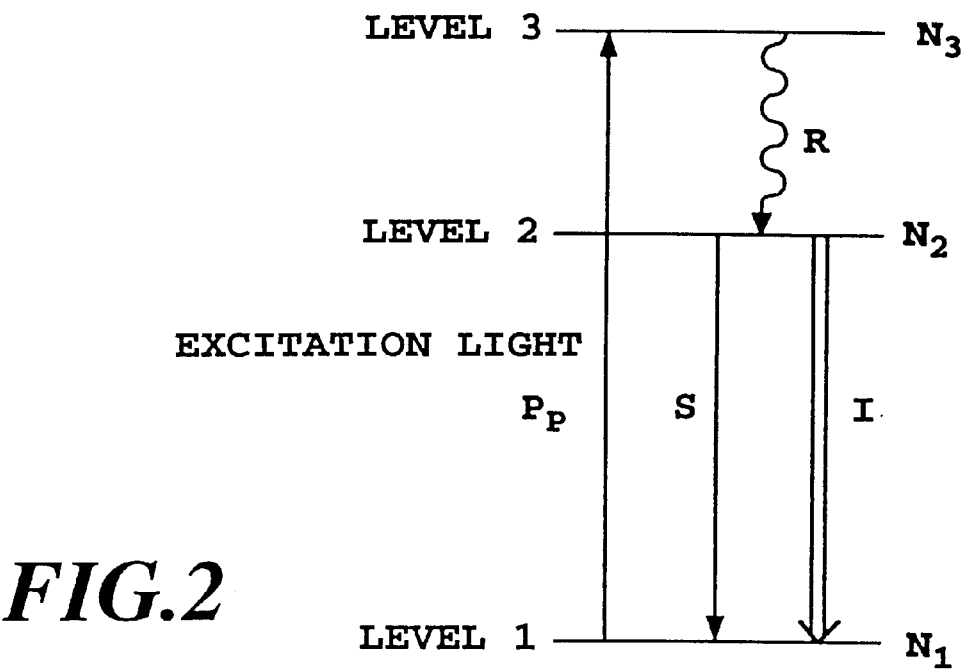
FIG. 2 is an energy-level diagram of 3-level system for $Er^{3+}$ at around 1.54 $\mu$m ($N_1 \neq 0$)
Figure 3:
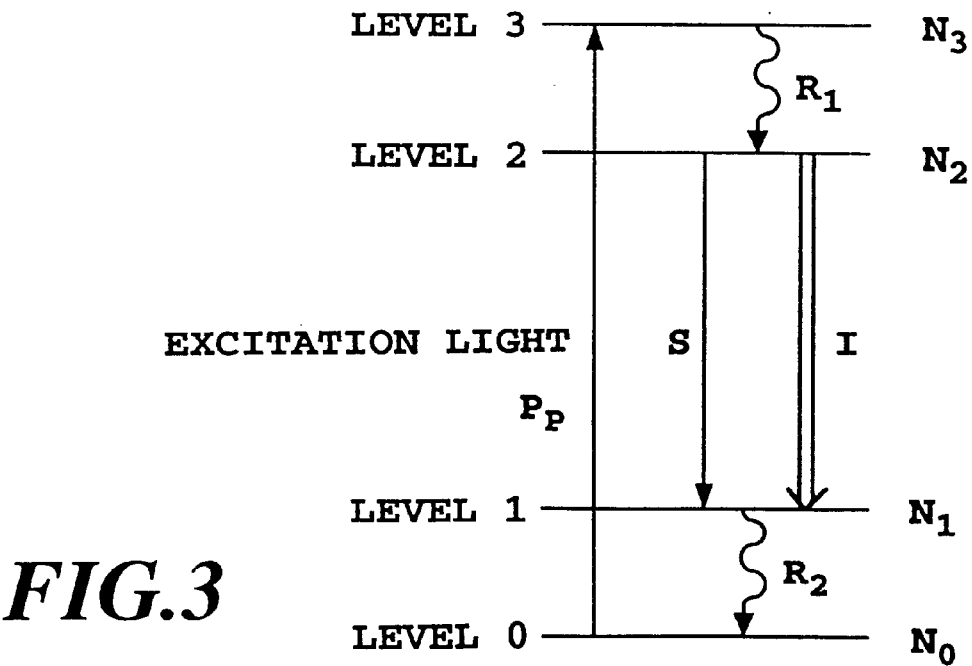
FIG. 3 is an energy-level diagram of 4-level system for $Nd^{3+}$ at around 1.06 $\mu$m ($N_1 = 0$)
Figure 4:
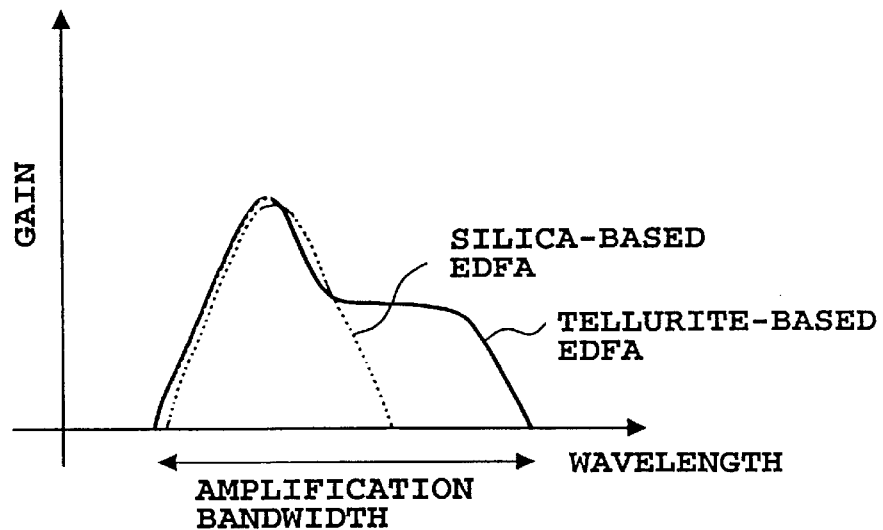
FIG. 4 is a graphical representation of wavelength dependencies of the silica-based EDFA (a broken line) and the tellurite-based EDFA (a solid line)
Figure 5:
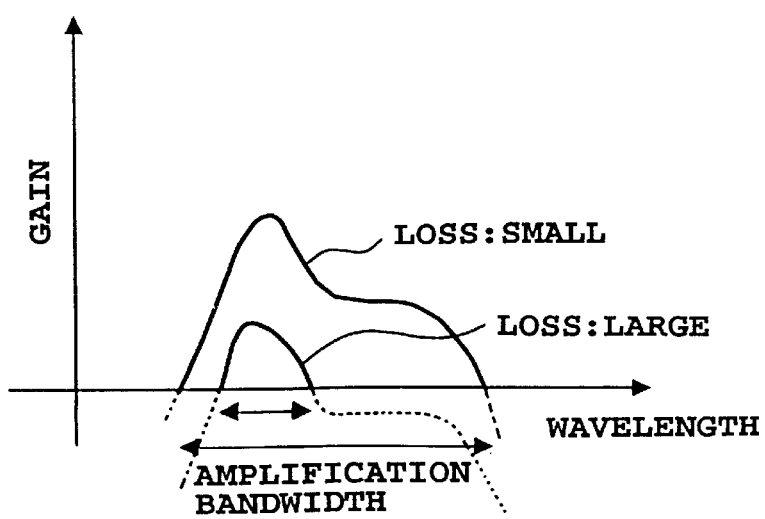
FIG. 5 is a graphical representation of the difference in amplification bands of the tellurite EDFA with respect of large and small fiber-losses.
Figure 6:
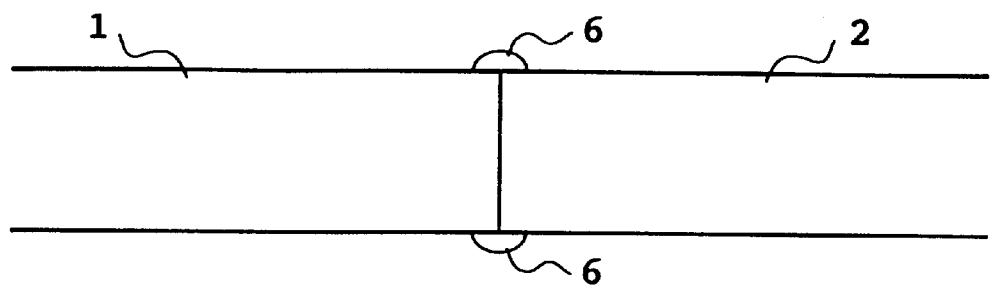
FIG. 6 is a schematic representation of the conventional splicing between the non-silica-based optical fiber and the silica-based optical fiber.
Figure 7:
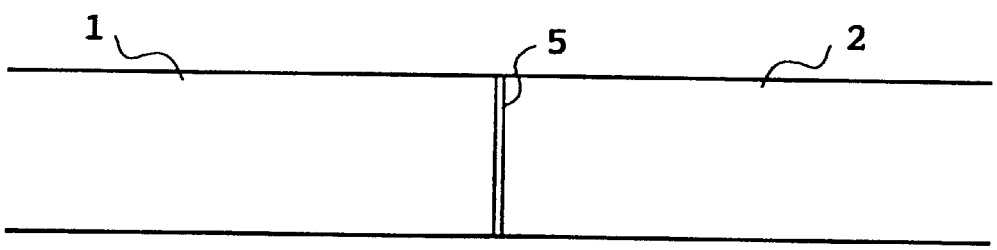
FIG. 7 is a schematic representation of the conventional splicing between the non-silica-based optical fiber and the silica-based optical fiber.
Figure 8:
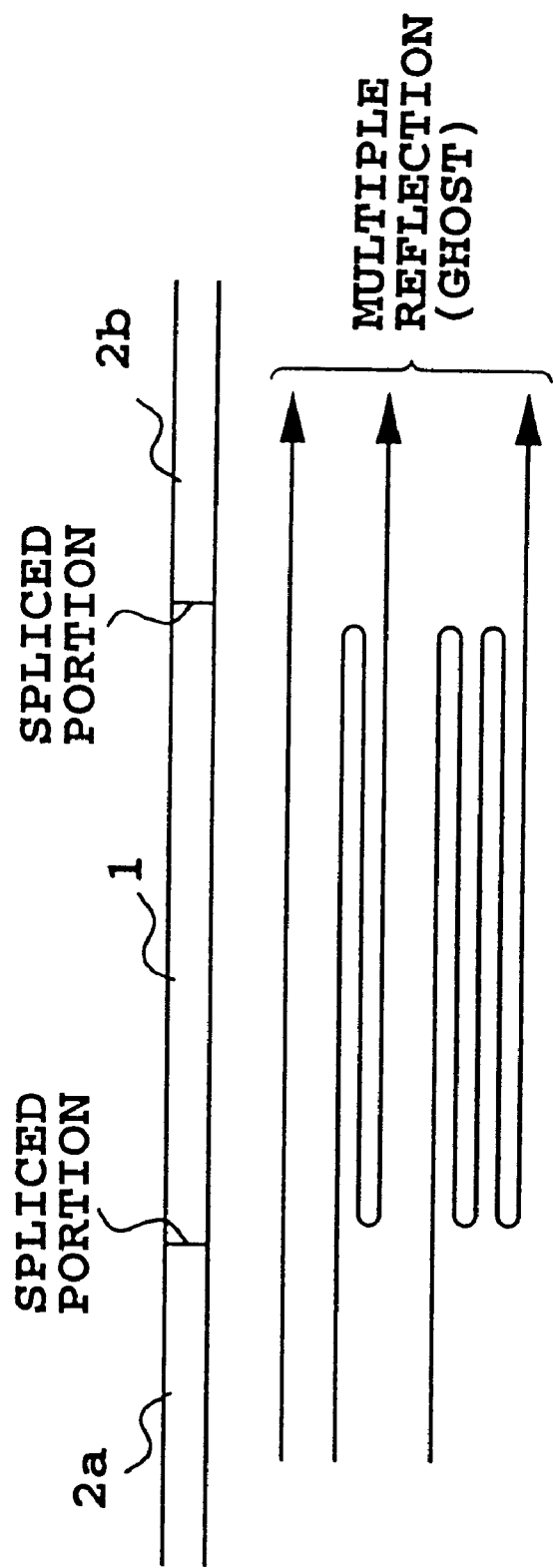
FIG. 8 is a schematic representation for illustrating the mechanism of ghost generation by the reflection on the spliced portions.
Figure 9:
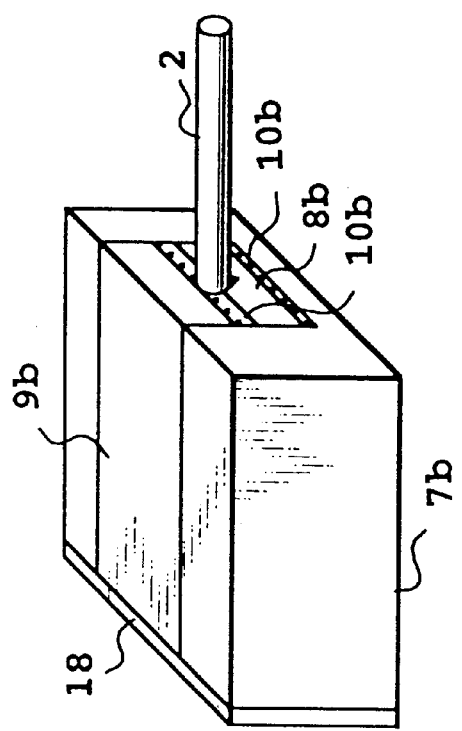
FIG. 9 is a schematic representation of the conventional splicing between the non-silica-based optical fiber and the silica-based optical fiber.
Figure 9:
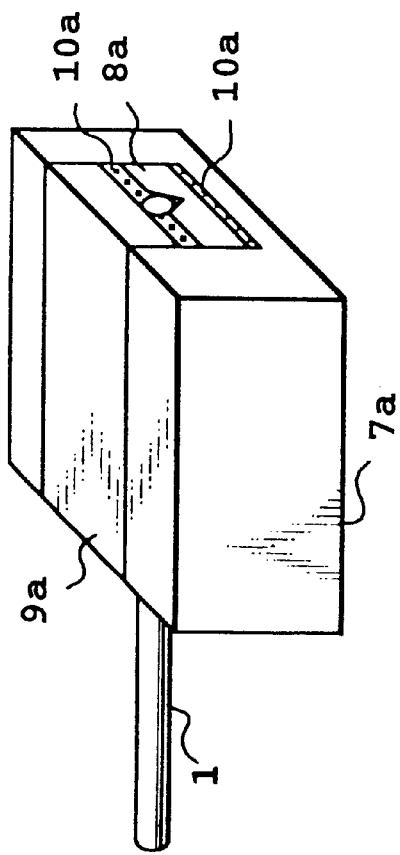
Figure 10:
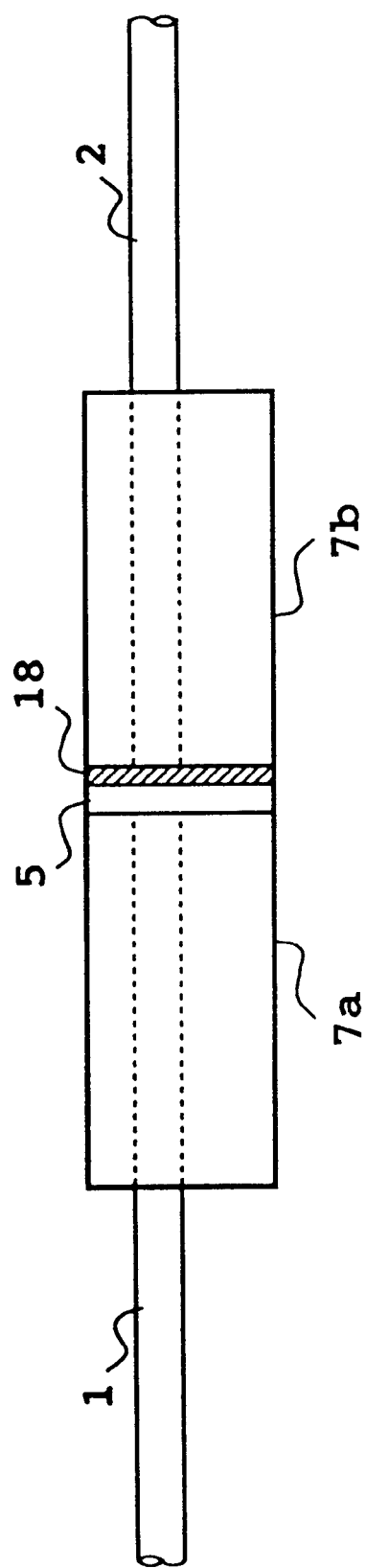
FIG. 10 is a schematic representation of the conventional splicing between the non-silica-based optical fiber and the silica-based optical fiber.
Figure 11:
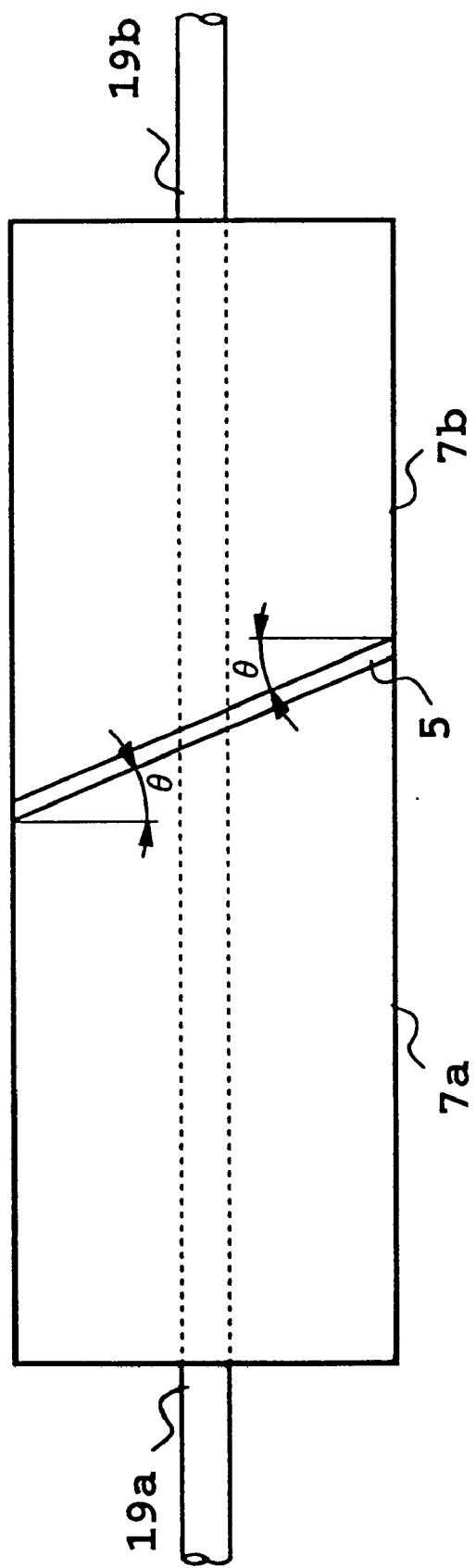
FIG. 11 is a schematic representation of the conventional splicing between the non-silica-based optical fiber and the silica-based optical fiber.

In addition, as shown in FIG. 1, it is known that a bandwidth that allows $^4I_{13/2}$→$^4I_{15/2}$ emission of Er$^{3+}$ in the fluoride glass is broader than that of Er$^{3+}$ in other glass such as a silica glass. At a wavelength of over 1.6 μm, however, an emission intensity becomes low and also the occurrence of optical amplification and laser oscillation becomes difficult.

In a case where a predetermined amount of Er is added in Tellurite glass, Er receives more strong electric field than the conventional one. As a result, an acceptable level of fluorescent intensity can be observed at a wavelength over 1.6 μm because of the increasing range of levels caused by Stokes' effects on the levels such as $^4I_{13/2}$ and $^4I_{15/2}$.

Consequently, an optical amplifier or a laser device operating at wavelengths from 1.5 μm to 1.7 μm can be realized if its optical amplification medium is a tellurite glass fiber where erbium is added in at least a core portion.

If the tellurite glass contains at least one of boron, phosphorus, and hydroxyl group, improvements in the properties of gain coefficient and noise figure can be also attained at the time of pumping $^4I_{11/2}$ level by 0.98 μm light. That is, vibrational energies of B—O, P—O, and O—H which are approximately 1,400 cm$^{-1}$, 1,200 cm$^{-1}$, and 3,700 cm$^{-1}$, respectively, while phonon energy of the tellurite glass free of the above additive is 600 to 700 cm$^{-1}$, so that the tellurite glass containing at least one of boron, phosphorus, and hydroxyl group generates more than double the energy of the tellurite glass free of the additive. As a result, if an optical amplification at 1.5 μm band is caused by a transition of $^4I_{13/2}$→$^4I_{15/2}$ by pumping $^4I_{11/2}$ level of Er by light at a wavelength of near 0.98 μm, a relaxation from $^4I_{11/2}$ level to $^4I_{13/2}$ level is more likely to be occurred and a reduction in quantum efficiency is relatively little. Thus, the reduction in pumping efficiency of $^4I_{13/2}$ level is hardly occurred (FIG. 18). If a relaxation from $^4I_{11/2}$ level to $^4I_{13/2}$ level is more likely to be occurred, it is preferable to pump $^4I_{13/2}$ level after pumping $^4I_{11/2}$ level better than the direct pumping of $^4I_{13/2}$ level by light at a wavelength of near 1.48 μm because the former is convenient to obtain a population inversion between $^4I_{13/2}$ level and $^4I_{15/2}$ level. Therefore, there is an advantage of having excellent noise characteristics.

Hereinafter, we will describe preferred embodiments of an optical amplification medium, a broadband optical amplifier using such a medium, and a laser device in accordance with the present invention.

(Embodiment 1)

Raw materials of TeO$_2$, ZnO, Na$_2$No$_3$, and Bi$_2$O$_3$ were formulated so as to be prepared as compositions of TeO$_2$ (75 mole %) —ZnO (20 mole %) —Na$_2$O (5 mole %), TeO$_2$ (77 mole %) —ZnO (15.5 mole %) —Na$_2$O (6 mole %), and TeO$_2$ (73.5 mole %) —ZnO (15.5 mole %) —Na$_2$O (6 mole %) —Bi$_2$O$_3$ (5 mole %) after melting. Then, 20 g of a mixture of the formulated raw materials were filled in a crucible and melted in an electric furnace at 800° C. for 2 hours in an oxygen atmosphere. After that, a molten mixture was casted on a pre-heated plate (200° C.) to obtain glass. The glass was annealed at 250° C. for 4 hours and then a part of harden glass was broken. Two samples, a 30 mg bulk of glass and 30 mg glass fine powder grained in an agate mortar, were filled in a sealed container made of silver with gold-plating and subjected to a differential scanning calorimetry (DSC) at a heat-up rate of 10° C./minute in an argon gas atmosphere. In the case of the bulk glass sample, obtained values of Tx–Tg were 119.2° C. when $Bi_2O_3=0$, 121.6° C. when $Bi_2O_3=1.5$ mole %, and 167.5° C. when $Bi_2O_3$. Especially, a heat-stability of the composition within the confines of: $1.5<Bi_2O_3\leq15$ (mole %); $0\leq Na_2O\leq35$ (mole %); and $55\leq TeO_2\leq90$ (mole %) as defined as the composition B described above was improved over 40° C. In the case of the powdered glass sample, obtained values of Tx–Tg were 80.2° C. when $Bi_2O_3=0$, 76.3° C. when $Bi_2O_3=1.5$ mole %, and 110.2° C. when $Bi_2O_3=5$ mole %, which are smaller than those of the bulk glass sample but thermal stability of the glass could be estimated more precisely. In both cases, however, we found that their thermal stabilities were extremely improved by the addition of 5 mole % of $Bi_2O_3$.

In the present specification, the value of Tx–Tg related to the thermal stability of glass is based on the measurement carried out on the bulk glass unless otherwise specified.

As mentioned above, it is possible to make a low-loss optical fiber using the glass that shows a value of Tx–Tg$\geq$120° C. with reference to the DSC measurement value of bulk glass. A fiber-loss of this kind of glass is almost 1 dB/km or less. For performing a high-efficiency optical amplification using an optical transition of three-level system, more stable glass will be required for making an optical fiber with a fiber-loss of lower than that of the above glass by an order of magnitude. In this case, the DSC measurement value for the powdered glass is effective as an evaluation standard. Thus, an optical fiber with a fiber-loss of 0.1 dB/km or less can be obtained if the glass to be measured as Tx–Tg$\geq$100° C. is used.

(Embodiment 2)

Tellurite optical fibers were prepared by the following procedure. For raw materials of core glass and clad glass, the compositions A or B described above was used. That is, the composition A consists of: $0<Bi_2O_3\leq20$ (mole %); $0\leq ZnO\leq35$ (mole %); and $55\leq TeO_2\leq90$ (mole %), and the composition B consists of: $1.5<Bi_2O_3\leq15$ (mole %); $0\leq Na_2O\leq35$ (mole %); and $55\leq TeO_2\leq90$ (mole %).

The glass composition was melted in a crucible made of platinum or gold in an oxygen atmosphere and then formed into a preform by a well-known technique of suction-casting. In addition, a jacket tube was prepared from the same glass composition by a well-known technique of rotational-casting (cf. Kanamori et al., Proceeding of 9th International Symposium on Nonoxide Glasses, page 74, 1994).

Each tellurite glass optical fiber was obtained as a result of drawing both the preform and the jacket tube. The obtained fiber had a minimum fiber-loss of 0.1 dB/m or less, a cut-off wavelength of 0.5 μm to 2.5 μm, and a relative refractive index difference between the core and the clad of 0.2% to 6%. In addition, we could add one of rare-earth elements (such as Er, Pr, Yb, Nd, Ce, Sm, Tm, Eu, Tb, Ho, and Dy) in the glass composition to be formed into core or clad glass.

(Embodiment 3)

Tellurite optical fibers were prepared as the same way as that of Embodiment 2 except the glass compositions for core and clad glasses. In this embodiment, the glass composition A1 described above was used as a core glass and the glass composition B1, C1, or D1 described above was used as a clad glass. Each of the obtained tellurite optical fibers was characterized by having a minimum fiber-loss of 0.1 dB/m or less, a cut-off wavelength of 0.5 to 2.5 μm, and a relative refractive index difference between the core and the clad of 0.2% to 6%. In addition, we could add rare-earth elements (such as Er, Pr, Yb, Nd, Ce, Sm, Tm, Eu, Tb, Ho, and Dy) for 10 weight % or less in the core or clad glass.

(Embodiment 4)

An optical amplification medium was prepared as an optical fiber. A core of the optical fiber was made of a glass composition of $TeO_2$ (68.6 mole %) —$Na_2O$ (7.6 mole %) —$ZnO$(19.0 mole %) —$Bi_2O_3$ (4.8 mole %) as a core material and doped with 1,000 ppm of erbium. Also, a clad of the optical fiber was made of a glass composition of $TeO_2$ (71 mole %) —$Na_2O$ (8 mole %) —$ZnO$(21 mole %). Therefore, the optical fiber was characterized by having a cut-off wavelength of 1.3 μm and a relative refractive index difference between the core and the clad of 2%.

Then, an optical amplifier for 1.5 to 1.7 μm band was assembled using that optical amplification medium. The optical amplifier was subjected to an amplification at a pump wavelength is 0.98 μm. In this test, a DFB laser was used as a light source for generating a signal light at 1.5 to 1.7 μm band.

Figure 19:
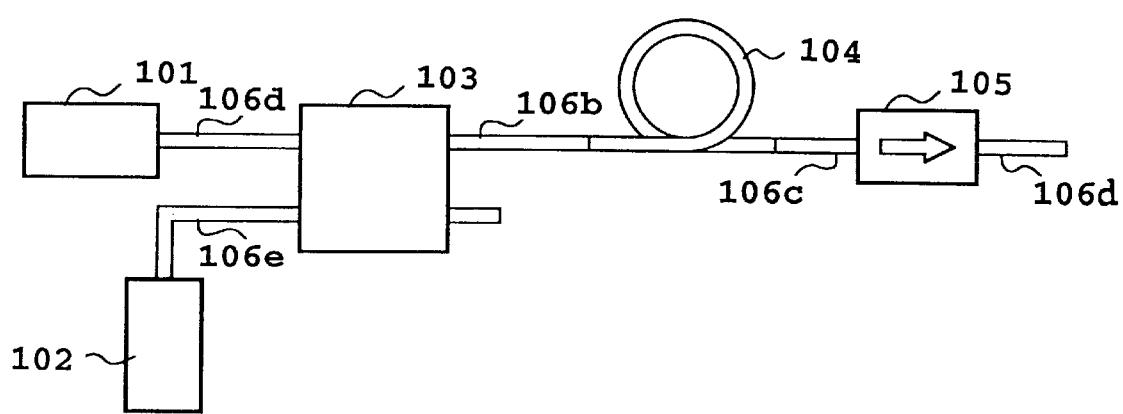
FIG. 19 is a schematic block diagram of an optical amplifier as one of the preferred embodiment of the present invention.

FIG. 19 is a schematic block diagram that illustrates a configuration of an optical amplifier as one of preferred embodiments of the present invention. As shown in the figure, a signal light source 101 and an excitation light source 102 are connected to one end of an amplification optical fiber 104 through an optical coupler 103. In addition, an optical isolator 105 is connected to the other end of the amplification optical fiber 105. Any of the connections between the components is implemented through an optical fiber 106a, 106b, 106c, 106d, or 106e.

The optical amplifier is subjected to an amplification test, resulting in amplification gains at wavelengths of 1.5 to 1.7 μm.

Figure 20:
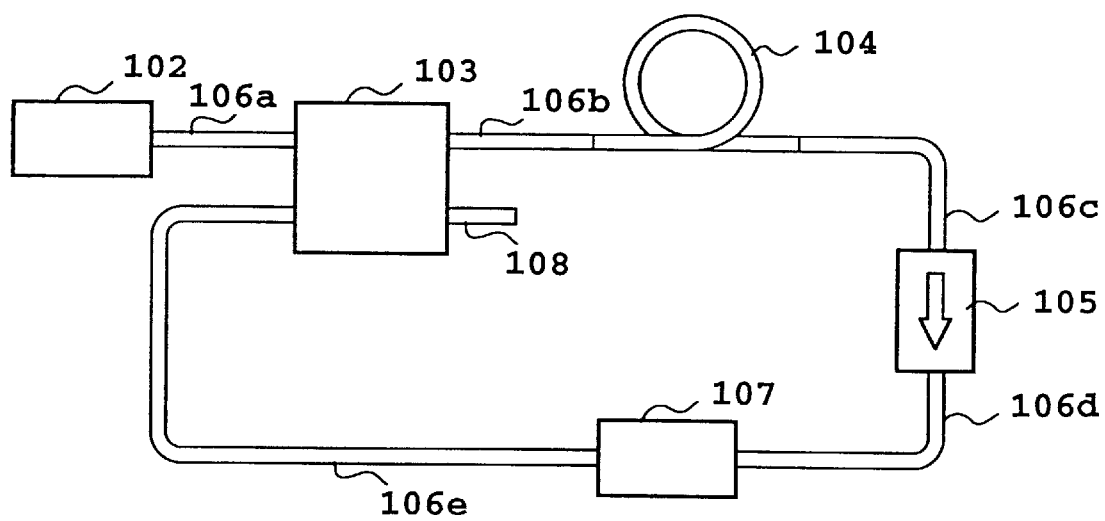
FIG. 20 is a schematic block diagram of a laser as one of the preferred embodiment of the present invention.

As shown in FIG. 20, a ring laser having a tunable band-pass filter 107 for a narrow bandwidth is constructed using the same optical amplifier as that of being subjected to the amplification test. The ring laser is constructed by forming an optical resonator shaped like a ring by connecting an output side end of the optical isolator 105 with an optical coupler 103 instead of connecting with the signal light source 101 and then inserting the band-pass filter 107 into an appropriate position in the ring. In the figure, that is, it is placed between the optical isolator 105 and the optical coupler 103 through the optical fibers 106e, 106d.

Then, a laser-oscillation test is performed using the ring laser. During the test, the ring laser receives light from the excitation light source 102 while a transmission region of the band-pass filter 107 is varied in the range of 1.5 μm to 1.7 μm. Consequently, a laser-oscillation at 1.5 to 1.7 μm band is observed.

In this embodiment, a pump wavelength of 0.98 μm is used to indirectly pump the $^4I_{13/2}$ level through the $^4I_{11/2}$ level. However, it is not limited to such a wavelength. It is also possible to use 1.48 μm for directly pumping the $^4I_{13/2}$ level. In addition, an energy level higher than the $^4I_{13/2}$ level may be pumped by light at a wavelength of less than 0.98 μm.

(Embodiment 5)

Using the optical amplifier shown in FIG. 19, an optical amplification test is performed at 1.5 μm band on condition that a pump wavelength is of 0.98 μm. As a result, an optical amplification is observed at a wavelength of 1.52 μm or more with a noise figure of 7 dB or less.

(Embodiment 6)

An optical amplifier is prepared using the same optical fiber as that of Embodiment 3 except that the glass is co-doped with Er and Yb instead of doping Er alone.

An optical amplification test and a laser oscillation test are performed by the same ways as those of Embodiments 4 and 5 on condition that a pump wavelength of 1.029 μm (Yb-doped YAG laser), 1047 μm (Nd-doped YLF laser), 1.053 μm (Nd-doped YAG laser), 1.064 μm (Nd-doped YAG laser), or the like. In a case where Yb is co-doped with Er in the medium, a laser oscillation at wavelengths of 1.5 to 1.7 μm and a broadband optical amplification at 1.5 μm band are observed whether the above pump wavelength is used if an energy shift from Yb to Er is gained.

Any of the glass compositions in Embodiments 1 to 6 is only represented as an example of the allowable compositions. It is also possible to use a glass composition that includes at least one selected from the group of, for example $Cs_2O$, $Rb_2O$, $K_2O$, $Li_2O$, BaO, SrO, CaO, MgO, BeO, $La_2O_3$, $Y_2O_3$, $Sc_2O_3$, $Al_2O_3$, $ThO_2$, $HfO_2$, $ZrO_2$, $TiO_2$, $Ta_2O_5$, $Nb_2O_5$, $Wo_3$, $Tl_2O$, CdO, PbO, $In_2O_3$, and $Ga_2O_3$, in addition to $TeO_2$.

Furthermore, Er or Er and Yb may be contained not only in the core but also in the clad.

A configuration of the optical amplifier is not limited to the one described above. Any of the optical amplifiers having the optical amplification medium, an excitation light source for exciting the medium, and input and output means for signal light can be allowable.

(Embodiment 7)

An amplification optical fiber is prepared as a an optical fiber (4 m in length) doped with 1,000 ppm of erbium in its core and subjected to a measurement for determining the amplification characteristics of the fiber at 1.5 μm band. In this case, a core glass composition is of $TeO_2$ (68.6 mole %) —ZnO (19 mole %) —$Na_2O$ (7.6 mole %) —$Bi_2O_3$ (4.8 mole %) and doped with 5 weight % of $P_2O_5$, and a clad composition is of $TeO_2$ (71 mole %) —$Na_2O$ (8 mole %) —ZnO (21 mole %). The optical fiber has a core/clad refractive index difference of 2.5% and a cut-off wavelength of 0.96 μm.

A small signal gain at 1.5 μm band of the amplification optical fiber is measured using 0.98 μm light as an excitation light from a light source (a semiconductor laser), resulting in an increase in a gain efficiency of the optical fiber. That is, the gain efficiency of the optical fiber reaches a value of 2 dB/mW which is approximately five times as large as that of an optical fiber without containing $P_2O_5$.

A gain spectrum at a saturated region when an input signal level is −10 dBm is measured, resulting in a flat gain at a bandwidth of 90 nm from 1,530 nm to 1,620 nm (an excitation intensity is 200 mW). A noise figure of 7 dB is observed when the optical fiber does not contain $P_2O_3$, while a noise of 4 dB is observed when the optical fiber contains $P_2O_3$.

It is noted that improvements in the characteristics of gain and noise figure of the optical fiber is also observed when it contains $B_2O_3$ instead of $P_2O_5$.

(Embodiment 8)

Amplification optical fibers are prepared using a core glass composition of $TeO_2$ (68.6 mole %) —ZnO (19 mole %) —$Na_2O$ (7.6 mole %) —$Bi_2O_3$ (4.8 mole %) and doped with or without 5,000 ppm of hydroxyl (OH) radical and 1,000 ppm of Er. The optical fiber containing the OH-radical shows a gain factor three-times as large as that of the optical fiber without containing the OH-radical. The reason is that the OH-radical has a comparatively large signal energy of 3,700 cm$^{-1}$ that causes a slight relaxation of the $^4I_{13/2}$ level which is a starting level of the amplification by a multiple-phonon emission.

Figure 21:
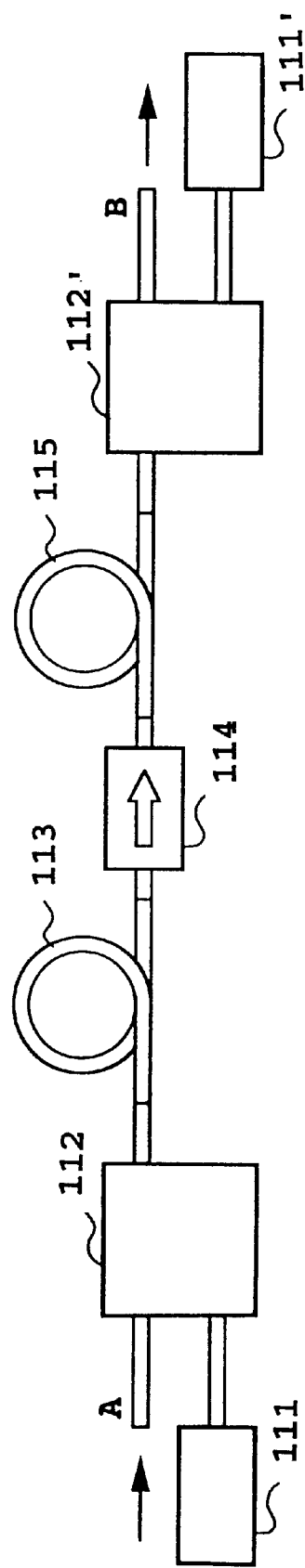
FIG. 21 is a schematic block diagram of a laser as one of the preferred embodiment of the present invention.

Referring now to FIG. 21, a laser device according to one of the preferred embodiments of the present invention is illustrated. In the figure, reference numerals 111 and 111' denote pumping semiconductor lasers (wavelength: 1,480 nm), 112 and 112' denote optical couplers that couple a signal light and an excitation light together, 113 denotes a first amplification optical fiber, 114 denotes an optical isolator, and 115 denotes a second amplification optical fiber. In this configuration of the laser device, an input signal light enters the laser device from a port A and exits from a port B after passing through the components in the device.

In this embodiment, the first amplification optical fiber 113 is a $ZrF_4$-contained fluoride optical fiber doped with 1,000 ppm of erbium (cf. Kanamori et al., Proceeding of 9th International Symposium on Non-Oxide Glasses, page 74, 1994). The second amplification optical fiber 115 is a oxidized tellurite optical fiber having a glass composition of $TeO_2$—$Na_2O$—$Bi_2O_3$—ZnO doped with 1,000 ppm of erbium.

Each of the amplification fibers has a core/clad refractive index difference of each fiber is 2.5%, a cut-off wavelength of 1.35 μm, and a fiber length of 10 m or 7 m.

Figure 22:
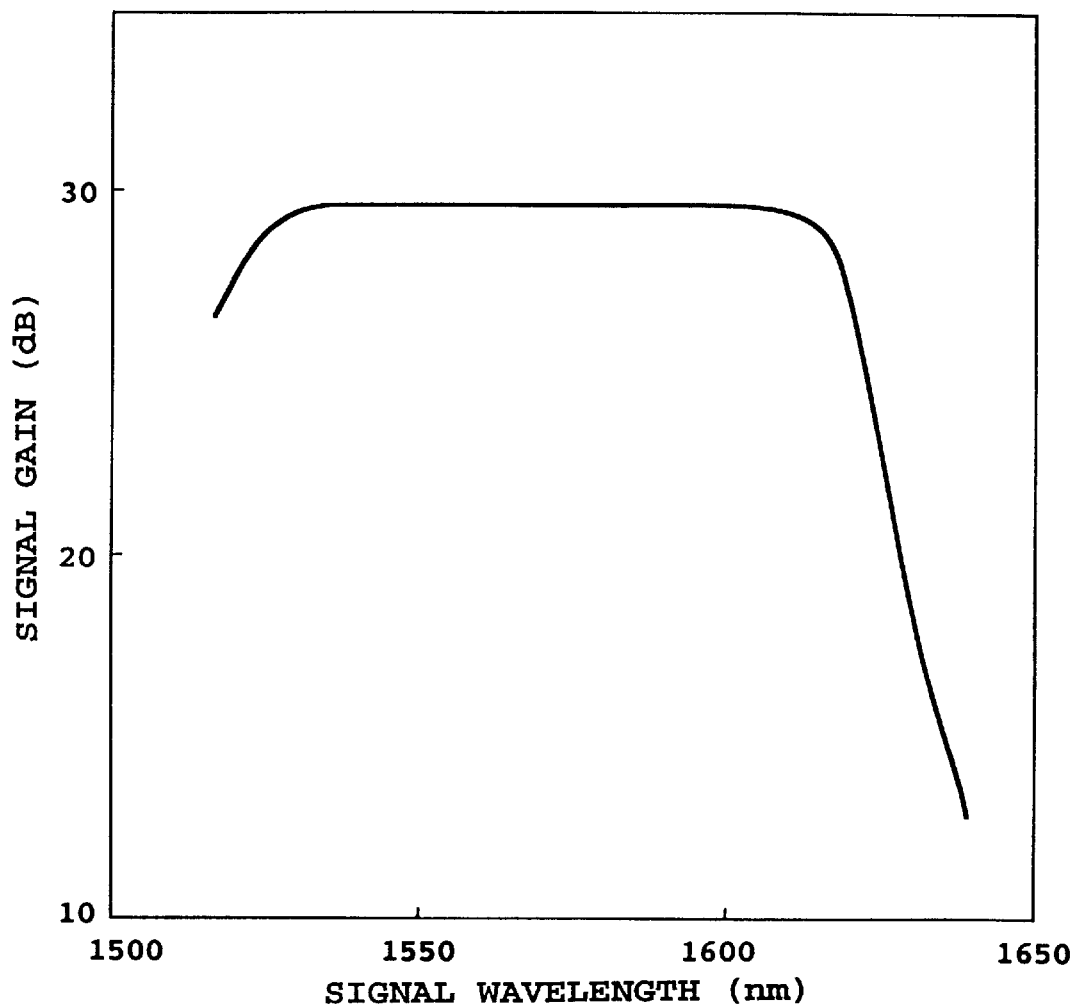
FIG. 22 is a gain-spectrum diagram that illustrates the gains obtained in Embodiment 8.

A measurement of gain spectrum at 1.5 μm band is performed on condition that an output optical intensity of each of the pumping semiconductor lasers 111, 111' is 150 mW. The resulting gain spectrum is shown in FIG. 22.

According to the gain spectrum in the figure, a curve that indicates variations in signal gain is flattened over 80 nm bandwidth that corresponds to signal-light wavelengths from 1,530 nm to 1,610 nm. At that wavelengths, that is, the signal gain is held at approximately 30 dB and the gain tilt is minimized. In the case of Er-doped fluoride optical fiber, a curve that indicates variations in signal gain is flatted over 30 nm bandwidth that corresponds to signal-light wavelengths from 1,530 nm to 1,560 nm. Therefore, the present embodiment allows that a bandwidth where the gain is flatted is doubled or more compared with the conventional Er-doped fluoride optical fiber. In the case of Er-doped silica optical fiber, furthermore, a bandwidth where the gain is flatted is only 10 nm. Thus, the present embodiment allows that a bandwidth where the gain is flatted is eight times as large as that of the conventional Er-doped silica optical fiber.

In this embodiment, as shown in the figure, the Er-doped $ZrF_4$ fluoride optical fiber is arranged in the downstream of the device, while the Er-doped tellurite optical fiber is arranged in the upstream. However, there is no restraint on the arrangement of these fibers, so that it is possible to arrange them in a retrograde order. In addition, an $InF_3$ fluoride optical fiber may be also used, or an optical fiber of Er-doped oxide multi-component glass may be included in the amplification optical fibers. In other words, a matter of great import is that at least one of the amplification optical fiber must be the Er-doped optical fiber.

Furthermore, a composition of the tellurite optical fiber is not restraint on the composition of the present embodiment.

It is needless to say that a method for pumping an amplification optical fiber may be of forward-pumping, backward-pumping, or bidirectional-pumping.

(Embodiment 9)

Figure 23:
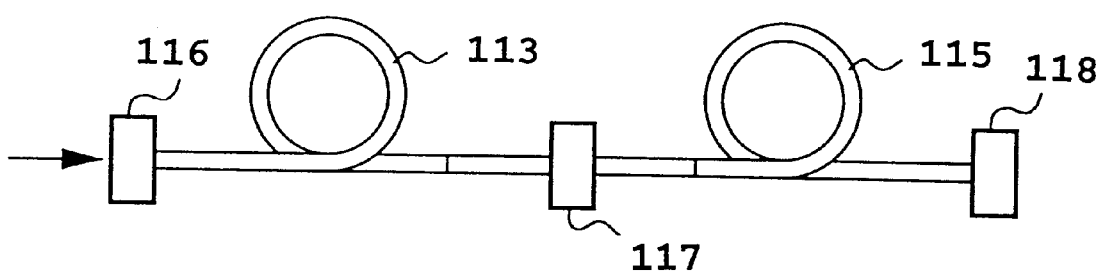
FIG. 23 is a schematic block diagram of another laser as one of the preferred embodiment of the present invention.

FIG. 23 is a schematic block diagram that illustrates a configuration of another laser device as one of preferred embodiments of the present invention.

The amplification optical fibers 113, 115 used in Embodiment 8 are connected in series through a wavelength-tunable band-pass filter 117 (a bandwidth of 3 nm). Also, a mirror 116 is placed on a free end of the first amplification optical fiber 113 and a mirror 118 is placed on a free end of the second amplification optical fiber 115 to perform a laser oscillation. The mirror 116 has a transmission of 99% at 1,480 nm and a reflectivity of 100% at 1,500 nm to 1,630 nm. The mirror 118 has a transmission of 20% at 1,500 nm to 1,630 nm. As a result of the laser oscillation, we find that the laser device of the present embodiment is able to act as a broadband-tunable laser to be used at 1.5 μm band.

As described above, the optical amplification media of the present invention permit configurations of optical amplifiers and laser devices to be operated at wavelengths of 1.5 μm to 1.7 μm. On the other hand, the conventional optical fiber amplifier is not capable of operating at these wavelengths. According to the present invention, therefore, sophisticated maintenance and monitoring mechanisms used in an optical communication system at 1.5 μm band can be accomplished. Thus, it becomes possible to provide the stable management of the optical communication system.

Through the use of the characteristics of broad amplification band, it becomes possible to amplify a short optical pulse such as in the order of femto-second, useful as an optical amplifier to be used in a transmission system of wavelength division multiplexing (WDM).

(Embodiment 10)

In this embodiment, we effect the operation of a super-luminescence laser using the tellurite optical fiber prepared in Embodiment 4. An excitation light source is a laser diode of 1.48 μm to introduce light into an end of the optical fiber. The other end of the optical fiber is beveled at an angle 10° to prevent Fresnel reflection on the fiber's end surface. Then, an output spectrum of light passing through the optical fiber is measured. As a result, a broad emission spectrum of 1.46 μm to 1.64 μm is observed, so that we found that the optical fiber can be used as a broad band super-luminescent laser.

(Embodiment 11)

A filter responsible for equalizing gains is arranged at the back of the optical isolator 105 of an optical amplifier shown in FIG. 19, and then the characteristics of optical amplification is measured. The filter may be a chirped fiber bragg grating, a programmable filter, a Fabry-Perot etalon type filter, and a Mach-Zehnder type filter, or the like.

A peak of gains at 1530 to 1580 nm is observed when a optical pulse with a signal intensity of −30 dBm is launched into the optical amplifier which is not equipped with the filer receives and subjected to 200 mW pumping at 1.48 μm. However, this kind of gain peak can be canceled by inserting the filter into the optical amplifier and adjusting its loss. For WDM signals at wavelengths of 1,530 nm to 1,610 nm, the optical amplifier is able to operate with a gain deviation of 0.2 dB or less.

(Embodiment 12)

An optical waveguide laser and an optical waveguide type optical amplifier are prepared using the glass composition A described above for a core glass and the glass composition A with an addition of Ce, Pr, Gd, Nd, Eu, Sm, Tb, Tm, Dy, Ho, Yb, or Er for a clad glass. We effect the operation of the laser and the optical amplifier independently. As a result, a broadband laser oscillation and a broadband optical amplification can be attained by the one doped with Ce, Pr, Gd, Nd, Eu, Sm, Tb, Tm, Dy, Ho, Yb, or Er at 0.3 μm, 1.3 μm, 0.31 μm, 1.07 μm, 0.61 μm, 0.59 μm, 0.54 μm, 1.48 μm, 3.0 μm, 1.49 μm, 1 μm, or 1.55 μm band, respectively.

(Embodiment 13)

An amplification optical fiber is prepared using a glass composition of $TeO_2$ (70 mole %) —ZnO (18 mole %) —$Na_2O$ (6 mole %) —$Bi_2O_3$ (6 mole %) as a core material and doped with 2,000 ppm of erbium and a glass composition of $TeO_2$ (68 mole %) —ZnO (22 mole %) —$Na_2O$ (7 mole %) —$Bi_2O_3$ (3 mole %) as a clad material. The optical fiber has a cut-off wavelength of 1.1 μm, and a core/clad relative refractive index difference of 1.8%, and also it shows a fiber-loss at 1.3 μm of 40 dB/km.

Then, an optical amplifier is constructed using the optical fiber of 4 m in length as an optical amplification medium and subjected to an optical amplification test. In this case, a bidirectional pumping of a forward pump wavelength of 0.98 μm and a backward pump wavelength of 1.48 μm is used. As a result, a small signal gain of 5 dB or more is observed at 110 nm bandwidth of 1,500 nm to 1,630 nm. At this time, in addition, a noise figure of 5 dB or less is observed at a wavelength of 1,530 nm or more.

(Embodiment 14)

An optical amplifier is constructed using the same optical fiber as that of Embodiment 13 except that the fiber length of this embodiment is 15 m.

An optical amplification test is performed using the optical amplifier on condition that a bidirectional pump wavelength is 1.48 μm with a coincidence of the front and backward pump wavelengths.

As a result, especially at 50 nm bandwidth of 1,580 nm to 1,630 nm, a small signal gain of 35 dB or more is observed. At this time, a noise figure of 5 dB is observed.

(Embodiment 15)

A laser is constructed using the same optical fiber as that of Embodiment 13 except that the fiber length of this embodiment is 15 m. In addition, a cavity is also constructed using a total reflection mirror and a fiber-bragg-grating having a reflectivity of 3%. A bidirectional pump wavelength is 1.48 μm with a coincidence of the front and backward pump wavelengths. As a result, an optical-power output of 150 mW at a wavelength of 1,625 nm is attained when an incident pump intensity is 300 mW. This kind of the high power cannot be generated by the conventional silica- and fluoride-based optical fibers.

(Embodiment 16)

An amplification optical fiber is prepared using a glass composition of $TeO_2$ (68 mole %) —ZnO (13 mole %) —$Na_2O$ (4 mole %) —$Bi_2O_3$ (15 mole %) as a core material and doped with 3 weight % of erbium and a glass composition of $TeO_2$ (69 mole %) —ZnO (21 mole %) —$Na_2O$ (8 mole %) —$Bi_2O_3$ (2 mole %) as a clad material. The optical fiber has a cut-off wavelength of 1.1 μm, and a core/clad relative refractive index difference of 5%.

Then, a small-sized optical amplifier is constructed using a 3-cm piece of the optical fiber as an optical amplification medium and subjected to an optical amplification test. In this case, a forward pump wavelength of 1.48 μm is used. In addition, a wavelength tunable laser operating at 1.5 μm to 1.7 μm bands is used as a signal light source. As a result, a small signal gain of 20 dB or more is observed at 180 nm bandwidth of 1,530 nm to 1,610 nm. At this time, in addition, a noise figure of 7 dB or less is observed at a wavelength of 1,530 nm or more.

(Embodiment 17)

50 glass samples are prepared using different formulations of a glass composition of quadric system: $TeO_2$—ZnO—$Li_2O$—$Bi_2O_3$ is formulated so that all of them contain $Bi_2O_3$ with a fixed concentration (5 mole %) and other ingredients with varied concentrations.

Figure 24:
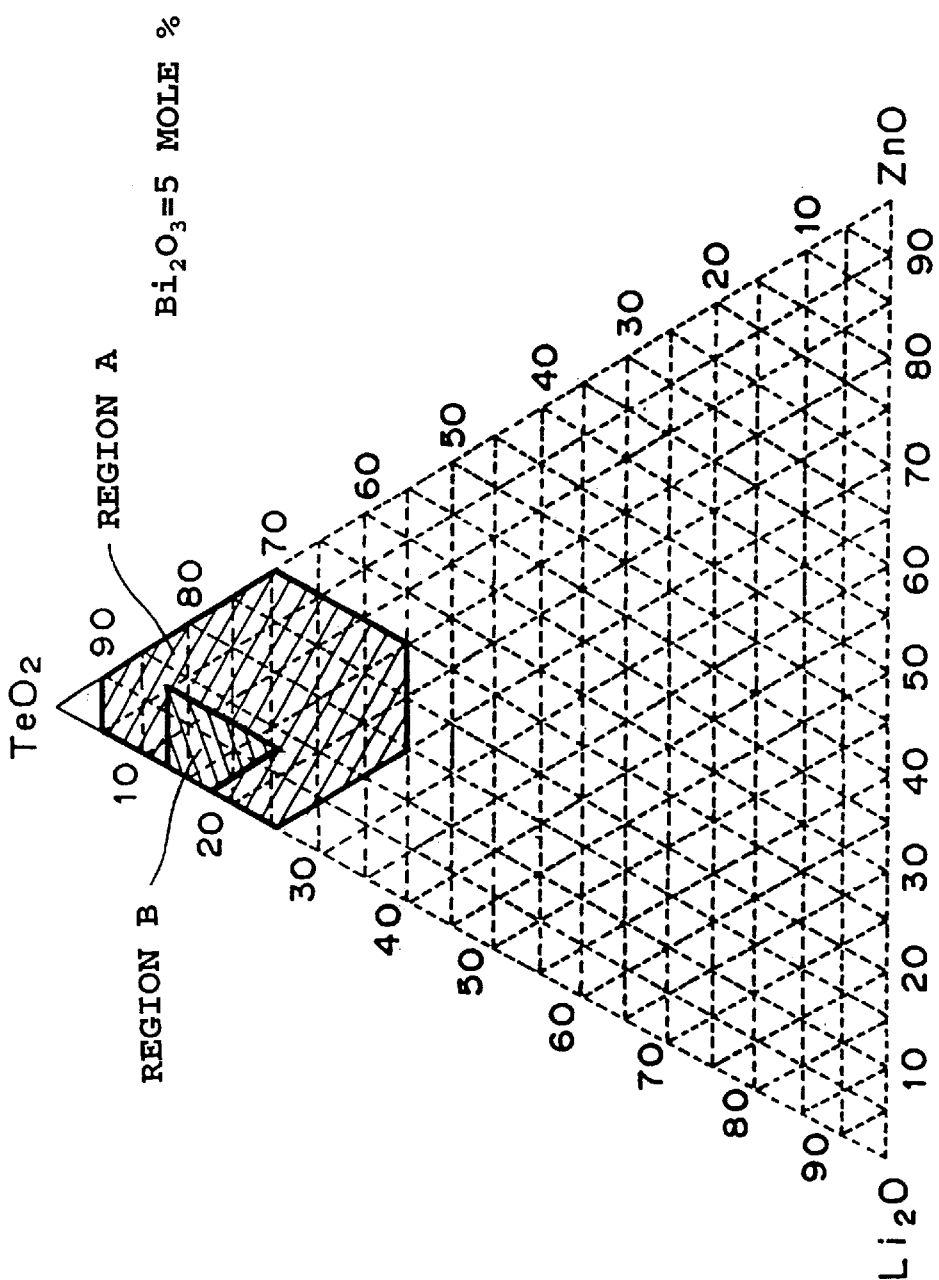
FIG. 24 is a schematic representation of the stable glass formation range for $TeO_2$—$Li_2O$—$ZnO$ glass when $Bi_2O_3=5$ mole % (region A: Tx-Tg>120° C., region B: no crystallization peak)

Each of the glass samples is subjected to a technique of differential scanning calorimetry (DSC) as the same way as that of Embodiment 1 to estimate its thermal stability. The results are shown in FIG. 24. As shown in the figure, thermally stable glasses are obtained if the respective glass compositions are included in the region A in the figure. In each of the thermally stable glasses, the difference between crystallization temperature (Tx) and glass transition temperature (Tg), i.e., Tx−Tg, is 120° C. or more. In the case of the glass compositions corresponding to the region B in the figure, extremely stable glasses without causing a heating peak of crystallization. Therefore, the thermally stable optical glasses allow optical fibers having the properties of low fiber-loss and also allow the mass production of the optical fiber with enhanced yields. Thus, low-priced optical fibers become feasible.

Among the compositions allowable in the region B, a glass composition of $TeO_2$ (80 mole %) —ZnO (5 mole %) —$Li_2O$ (10 mole %) —$Bi_2O_3$ (5 mole %) is selected and used as a core material. The core material is doped with 2,000 ppm of erbium. Also, a glass composition of $TeO_2$ (75 mole %) —ZnO (5 mole %) —$Li_2O$ (15 mole %) —$Bi_2O_3$ (5 mole %) is selected and used as a clad material. Then, an optical fiber having a cut-off wavelength of 1.1 μm and a core/clad relative refractive index difference of 2.5% is formed using these materials. In this embodiment, the resulting optical fiber is used as an amplification medium with a fiber-loss at 1.2 μm of 20 dB/km.

An optical amplifier is constructed using the amplification medium of 3 m in length and subjected to an amplification test on condition that a bi-directional pumping with a forward pump wavelength of 0.98 μm and a backward pump wavelength of 1.48 μm is used and a wavelength tunable laser operating at 1.5 μm to 1.7 μm bands is used as a signal light source. As a result, a small signal gain of 20 dB or more is observed at 80 nm bandwidth of 1,530 nm to 1,610 nm. At this time, in addition, a noise figure of 5 dB or less is observed.

Among the compositions allowable in the region A, a glass composition of $TeO_2$ (70 mole %) —ZnO (10 mole %) —$Li_2O$ (15 mole %) —$Bi_2O_3$ (5 mole %) is selected and used as a core material. The core material is doped with 2,000 rpm of erbium. Also, a glass composition of $TeO_2$ (70 mole %) —ZnO (7 mole %) —$Li_2O$ (18 mole %) —$Bi_2O_3$ (5 mole %) is selected and used as a clad material. Then, an optical fiber having a cut-off wavelength of 1.1 μm and a core/clad relative refractive index difference of 1.5% is formed using these materials. In this embodiment, the resulting optical fiber is used as an amplification medium with a fiber-loss at 1.2 μm of 60 dB/km.

An optical amplifier is constructed using the amplification medium of 3 m in length and subjected to an amplification test as the same way as that of the aforementioned optical amplifier having the composition of the region B. As a result, a small signal gain of 20 dB or more is observed at 80 nm bandwidth of 1,530 nm to 1,610 nm. At this time, in addition, a noise figure of 5 dB or less is observed. Accordingly, the result indicates that the glass composition in the region A can be also used in the process of making a practical broadband EDFA.

(Embodiment 18)

An optical amplifier is constructed using a 15-meter piece of the optical fiber of Embodiment 17 and subjected to an amplification test on condition that a bi-directional pumping with forward and backward pump wavelengths of 1.48 μm is used and a wavelength tunable laser operating at 1.5 μm to 1.7 μm bands is used as a signal light source. As a result, a small signal gain of 20 dB or more is observed at 50 nm bandwidth of 1,580 nm to 1,630 nm. The noise figure is 5 dB or less.

(Embodiment 19)

A laser is constructed using a 15-meter piece of the optical fiber of Embodiment 17. In addition, a cavity is also constructed using a total reflection mirror and a fiber-bragg-grating having a reflectivity of 3%. A bidirectional pump wavelength is 1.48 μm with a coincidence of the forward and backward pump wavelengths. An optical-power output of 150 mW at a wavelength of 1,625 nm is attained when an incident pump intensity is 300 mW. This kind of the high power cannot be generated by the conventional silica- and fluoride-based optical fibers.

(Embodiment 20)

An amplification optical fiber is prepared using a glass composition of $TeO_2$ (68 mole %) —ZnO (13 mole %) —$Na_2O$ (4 mole %) —$Bi_2O_3$ (15 mole %) as a core material and doped with 3 weight % of erbium and a glass composition of $TeO_2$ (69 mole %) —ZnO (21 mole %) —$Na_2O$ (8 mole %) —$Bi_2O_3$ (2 mole %) as a clad material. The optical fiber has a cut-off wavelength of 1.4 μm, and a core/clad relative refractive index difference of 5%.

Then, a small-sized optical amplifier is constructed using a 3-cm piece of the optical fiber as an optical amplification medium and subjected to an optical amplification test. In this case, a forward pump wavelength of 1.48 μm is used. In addition, a wavelength tunable laser operating at 1.5 μm to 1.7 μm bands is used as a signal light source. As a result, a small signal gain of 20 dB or more is observed at 80 nm bandwidth of 1,530 nm to 1,610 nm. At this time, in addition, a noise figure of 5 dB or less is observed.

(Embodiment 21)

A tellurite glass is prepared by the process including the following steps. That is, at the start, raw materials of $TeO_2$, ZnO, $Na_2CO_3$, and $Bi_2O_3$ are formulated so as to become a formulation of $TeO_2$ (73.5 mole %) —ZnO (20 mole %) —$Na_2O$ (5 mole %) —$Bi_2O_3$ (1.5 mole %) and a formulation of $TeO_2$ (73 mole %) —ZnO (20 mole %) —$Na_2O$ (5 mole %) —$Bi_2O_3$ (2 mole %) after melting. Two different formulations are filled in respective 90 g volume crucibles and heated by an electric furnace at 800° C. for 2 hours in an oxygen atmosphere to melt those formulations, resulting in molten materials. Subsequently, each of the molten materials is casted in a cylindrical hollow-mold and an opening of the mold is capped with a cap without delay. The capped mold is laid in a horizontal position and left for 2 minutes and then allowed to reach room temperature, resulting a tellurite glass of 15 mm in outer diameter, 5 mm in inner diameter, and 130 mm in length in the form of a cylindrical tube having a bottom surface. In this manner, two glass tubes are obtained.

The glass tubes are examined under a microscope. As a result, they can be distinguished microscopically. That is, the glass tube containing 1.5 mole % of $Bi_2O_3$ has many crystallized portions in the proximity of its outside wall, while the glass tube containing 2.0 mole % of $Bi_2O_3$ does not have any crystallized portion.

Then, a part of each glass sample is broken into pieces and powdered in an agate mortar. 30 mg of the obtained powder is filled into a sealed container made of silver and then subjected into the DSC measurement in an argon atmosphere at a heat-up rate of 10° C./minute. The results are shown in FIG. 25.

Figure 25:
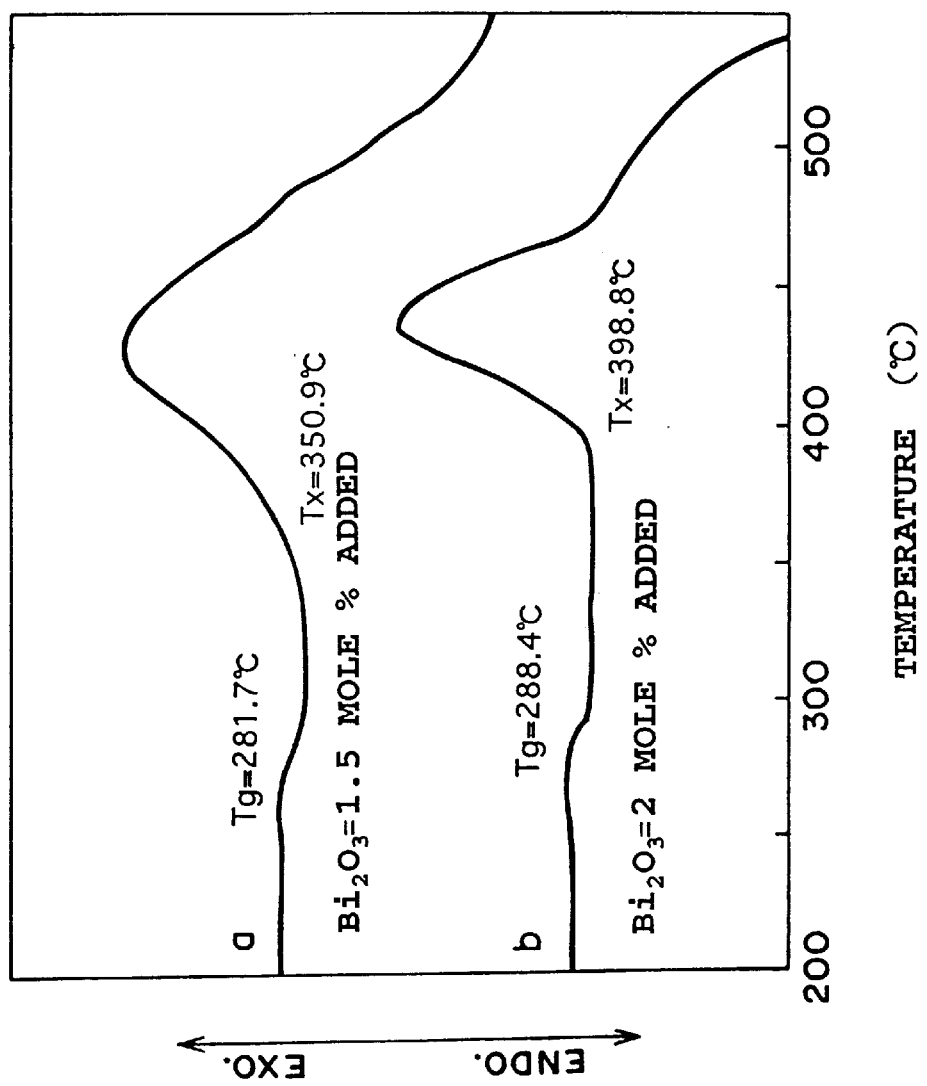
FIG. 25 is a graphical representation of the results of DSC measurement, where the upper line (line a) is for 73.5$TeO_2$—20ZnO—5$Na_2O$—1.5$Bi_2O_3$ glass and the lower line (line b) is for 73$TeO_2$—23ZnO—5$Na_2O$—2$Bi_2O_3$ glass.

FIG. 25 is a graphical representation of the results of the DSC measurement. In the figure, a line (a) is for the glass having a composition of 73.5$TeO_2$—20ZnO—5$Na_2O$—

1.5Bi$_2$O$_3$ and a line (b) is for the glass having a composition of 73TeO$_2$—20ZnO—5Na$_2$O—2Bi$_2$O$_3$. In the case of the glass containing 1.5 mole % of Bi$_2$O$_3$, a peak of crystallization is started at a temperature of about 350° C. and a value of Tx–Tg is 69.2° C. In the case of the glass containing 2.0 mole % of Bi$_2$O$_3$, on the other hand, a peak of crystallization is started at a temperature of about 390° C. and a value of Tx–Tg is 110.4° C. It means that a thermal stability of glass can be dramatically increased by an addition of 2.0 mole % Bi$_2$O$_3$ compared with that of 1.5 mole % Bi$_2$O$_3$.

The most striking characteristics of the tellurite glasses of Embodiments 1 to 21 is that each of them is formulated as a quadric system composition that consists four different ingredients including Bi$_2$O$_3$. This kind of the tellurite glass shows an excellent thermal stability, so that a fiber-loss can be minimized at the time of forming a fiber. Furthermore, the tellurite glass allows easily control of the refractive index, so that a fiber with a high Δn can be formed. Therefore, the tellurite glass allows the scale-up of amplification bandwidth of the EDFA having the ternary-system composition which leads to a low degree of efficiency.

As described above, the ternary-system composition disclosed in U.S. Pat. No. 5,251,062 is less stable than the quadric system tellurite glass of the present invention, so that a minimum of the fiber-loss at 1.5 μm is 1,500 dB/km. In the present invention, we studies various compositions for the purpose of the reduction in fiber-loss and finally find that the quadric system tellurite composition containing Bi$_2$O$_3$ allows a dramatic decrease in the fiber-loss. Also, we find that the tellurite glass allows easily control of the refractive index and a fiber with a high Δn can be formed. Therefore, the present invention realizes the tellurite EDFA with a low fiber-loss at first. we can easily understand that the tellurite glass having the ternary system composition of U.S. Pat. No. 5,251,062 cannot realize the three-level system EDFA because there is no concrete description not only in the specification of U.S. Pat. No. 5,241,062 but also in subsequent reports in technical journals such as Optics Letters and Optical Materials.

In U.S. Pat. No. 5,251,062, for more details, Sniitzer et al. indicate that a composition range of ternary-system tellurite glass which can be formed into a fiber with a description that a laser device can be realized by using a bulk glass while an optical amplifier requires a fiber structure having core and clad structures. Accordingly, it is clear that the reference discloses the tellurite glass for the purpose of realizing an optical amplification. However, Snitzer et al. cannot disclose the way of solving the problems except the description of a fiber laser using neodymium in Optics Letters cited above. It is a well-known fact that neodymium cannot be applied in an optical amplification at 1.3 μm band because of excitation state absorption as described in Optics Letters cited above in spite that it holds great promise to be applied in 1.3 μm band amplification in past.

In Optics Letters cited above, the tellurite glass that contains Bi$_2$O$_3$ has the composition of 78% TeO$_2$—18% Bi$_2$O$_3$ and 80% TeO$_2$—10% Bi$_2$O$_3$—10% TiO$_2$. However, this composition is much different from the quadric system composition of the present invention. Furthermore, it is noted that there is no description or teach of thermal stability of glass and fiber-loss even though these properties are very important.

Furthermore, the quadric system tellurite glass having a core composition of 77% TeO$_2$—6.0% Na$_2$O—15.5% ZnO —1.5% Bi$_2$O$_3$ is described in Optical Materials and Optic Letters cited above, especially in Optical Materials which is also disclose a fiber-loss at 1.55 μm band of 1,500 dB/km. However, this fiber-loss is too high, and also there is no description or teach that indicates or recalls the improvements in thermal stability by an addition of Bi$_2$O$_3$. In the field of optical fiber, it is well-known fact that a refractive index of glass is adjusted by an appropriate adjusting agent. The addition of Bi$_2$O$_3$ is exactly what the optical fiber needs for that adjustment.

In the present invention, as will be described afterward, we find that tellurite glasses having Bi$_2$O$_3$-contained quadric system compositions are effective on a reduction in fiber-loss. A thermal stability of the tellurite glass is dramatically improved by the addition of Bi$_2$O$_3$ in concentration of over 1.5%, and thus the tellurite glass optical fiber can be provided as the one having the properties of low fiber-loss. Secondary, a high Δn fiber can be formed as a result of controlling Bi$_2$O$_3$ content in the core and clad glasses without restraint. Consequently, the scale-up of amplification band region of low-efficient three-level system EDFA by a synergistic effect of these improvements.

We are now considering a glass composition that levels a gain spectrum of tellurite EDFA. In the following embodiments, one of the most striking characteristics of the following embodiments is that the tellurite glass or the tellurite optical fiber contains aluminum (Al) as a host. It is also known that if SiO$_2$-based glass contains Al a dented portion between 1.53 μm and 1.56 μm of a cross-section of stimulated emission of Er in the glass is despaired and also the gain spectrum is flatten at wavelengths of 1.54 μm to 1.56 μm (Emmanue Desurvire, "Erbium-Doped Fiber Amplifiers", John Wiley & Sons, 1994). However, this is an effect of Al on the silica-based optical fiber, so that the effect on the tellurite glass is still unknown.

In the present invention, as described in the following embodiments, the present inventors are finally found the following facts. That is, the addition of Al in tellurite glass leads to the effects of disappearing a dented portion between 1.53 μm and 1.56 μm of a cross-section of stimulated emission of Er in the glass and increasing variations in the cross-section, resulting in reduction of a gain difference between 1.55 μm band and 1.6 μm band.

(Embodiment 22)

Figure 26:
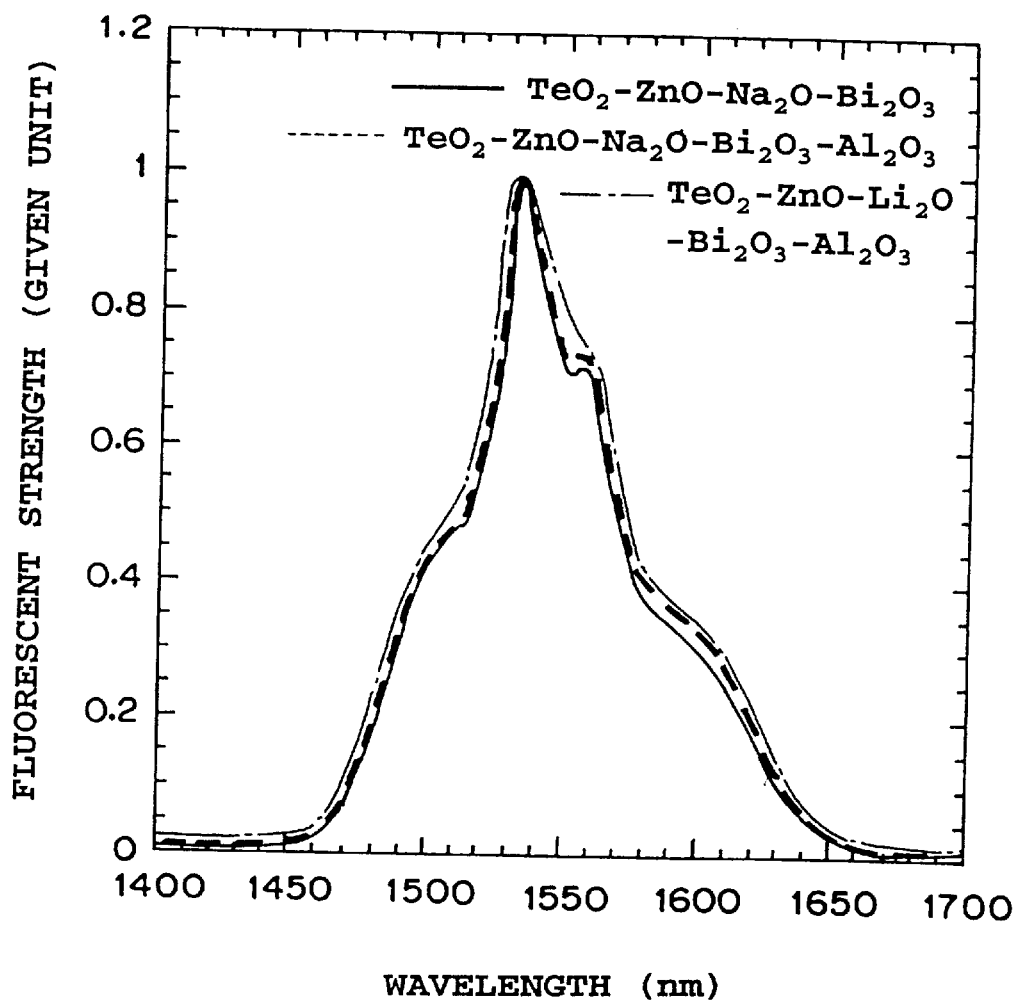
FIG. 26 is a graphical representation of 1.5 µm-band emission spectrum of each of $TeO_2$—ZnO—$Na_2O$—$Bi_2O_3$ glass, $TeO_2$—ZnO—$Na_2O$—$Bi_2O_3$—$Al_2O_3$ glass, and $TeO_2$—ZnO—$Li_2O$—$Bi_2O_3$—$Al_2O_3$ glass.

FIG. 26 is a spectrum diagram that illustrates each 1.5 μm emission spectrum of Er in glasses having their respective compositions of:

TeO$_2$ (74 mole %) —ZnO (16 mole %) —Na$_2$O (6 mole %) —Bi$_2$O$_3$ (4 mole %);

TeO$_2$ (73 mole %) —ZnO (15 mole %) —Na$_2$O (6 mole %) —Bi$_2$O$_3$ (3 mole %) —Al$_2$O$_3$ (3 mole %); and TeO$_2$ (79 mole %) —ZnO (3 mole %) —Li$_2$O (12 mole %) —Bi$_2$O$_3$ (3 mole %) —Al$_2$O$_3$ (3 mole %).

As shown in the figure, an intensity of emission spectrum of the glass containing Al$_2$O$_3$ at a wavelength of around 1.6 μm is stronger than that of the glass without Al$_2$O$_3$, and also a depth of the dent between 1.53 μm and 1.56 μm of the former is disappeared or shallower than that of the latter.

An erbium-doped tellurite optical fiber is prepared using the Al$_2$O$_3$-contained glass (TeO$_2$—ZnO—Na$_2$O—Bi$_2$O$_3$ system glass). The obtained fiber has a cut-off wavelength of 1.3 μm, Er-content of 4,000 ppm, and length of 0.9 m. Then, the fiber is optically pumped at 1.48 μm with the power of 200 mW, resulting in a 10 dB or less gain difference between 1.56 μm and 1.60 μm.

Next, EDFA is constructed using the above erbium-doped optical fiber as an optical amplifier and a fiber-bragg-grating as a gain-equalizing device. The obtained EDFA showed 1 dB or less gain difference between 1.53 μm and 1.60 μm.

On the other hand, an EDFA using the Al$_2$O$_3$-absent fiber showed 15 dB or more gain difference between 1.56 μm and 1.60 μm. In this case, furthermore, the gain deviation at wavelengths from 1.56 μm to 1.60 μm could not be reduced to 1 dB or less across a width of 70 nm in spite of using the gain-equalizing device.

The addition effects of $Al_2O_3$ to the gain characteristics of optical fiber is confirmed for the composition of $TeO_2$—ZnO—$Li_2O$—$Bi_2O_3$ ($55 \leq TeO_2 \leq 90$, $0 \leq ZnO \leq 35$, $0 \leq Na_2O \leq 35$, $0 < Bi_2O_3 \leq 20$, unit: mole %).

(Embodiment 23)

In this Embodiment, we confirm an influence of adding $Al_2O_3$ to $TeO_2$—ZnO—$Li_2O$—$Bi_2O_3$ on the gain characteristics.

A comparative study of 1.5 μm band emission spectra of Er in an $Al_2O_3$-absent glass having the composition of $(80)TeO_2$—$(3)ZnO$—$(12)Li_2O$—$(5)Bi_2O_3$ and an $Al_2O$-contained glass having the composition of $(79)TeO_2$—$(3)ZnO$—$(3)Li_2O$—$(12)Bi_2O_3$—$(3)Bi_2O_3$ is performed. As a consequence, we find that the $Al_2O$—contained glass has a large emission strength at 1.6 μm and there is no dent portion between 1.53 μm and 1.56 μm in the spectrum compared with those of the $Al_2O$-absent glass. The $Al_2O$-contained glass is formed into a core of erbium-doped tellurite optical fiber (a cut-off wavelength of 1.3 μm, an erbium-content of 4,000 ppm, and a length of 0.9 m) and optically pumped at 1.48 μm with the power of 200 mW, resulting in a 10 dB or less gain deviation at wavelengths from 1.56 μm and 1.60 μm.

Next, an EDFA is constructed using the above erbium-doped optical fiber as an optical amplifier and a Mach-Zehnder type filter (a medium for loss of light) as a gain-equalizing device. The obtained EDFA showed 1 dB or less gain deviation at wavelengths from 1.53 μm to 1.60 μm.

On the other hand, an EDFA using the $Al_2O_3$-absent fiber showed 15 dB or more gain deviation at wavelengths from 1.56 μm to 1.60 μm. In this case, furthermore, the gain deviation at wavelengths from 1.56 μm to 1.60 μm could not reduced to 1 dB or less across a width of 70 nm in spite of using a gain-equalizing device.

In addition, variations in the gain between 1.53 μm and 1.56 μm are disappeared at the time of measuring the amplification spectrum when the fiber of 2 m in length doped with 1,000 ppm of Er is used, resulting in uniformity of gain at 1.53 μm to 1.56 μm. Therefore, this fiber could be useful in the amplification of WDM transmission at 1.53 μm to 1.56 μm. This phenomenon is also observed when the fiber having the composition of $TeO_2$—ZnO—$Na_2O$—$Bi_2O_3$—$Al_2O_3$ is used.

The addition effects of $Al_2O_3$ to the gain characteristics of optical fiber is confirmed for the composition of $TeO_2$—ZnO—$Li_2O$—$Bi_2O_3$ ($70 \leq TeO_2 \leq 90$, $0 \leq ZnO \leq 4$, $0 \leq Li_2O \leq 30$, $0 < Bi_2O_3 \leq 10$, unit: mole %) to be used in the fiber formation with stability.

In Embodiments 22 and 23, 3 mole % of $Al_2O_3$ is used. However, it is not limited to such a concentration. We also attained the $Al_2O_3$ addition effect at concentrations of more than zero mole %. It is not preferable to include $Al_2O_3$ in the fiber more than necessary because an excessive concentration thereof leads to ignore the above-mentioned composition that allows the stable fiber formation.

(Embodiment 24)

In this Embodiment, we confirmed an influence of adding $Al_2O_3$ to $TeO_2$—ZnO—$M_2O$—$Bi_2O_3$ (M is one of alkali elements except Li and Na) on the gain characteristics. As in the case of Embodiments 22 to 23, a 10 dB or less gain deviation at wavelengths from 1.56 μm and 1.60 μm is attained by using K, Cs, or Rb as M in the above composition. In addition, an EDFA is constructed using the gain-equalizing device. As a result, the EDFA showed 1 dB or less gain at wavelengths from 1.53 μm to 1.60 μm (i.e., over a bandwidth of 70 nm), and also provided the uniform gain at that wavelengths.

(Embodiment 25)

In this Embodiment, we confirmed an influence of adding $Al_2O_3$ to $TeO_2$—ZnO—$M_2O$—$Bi_2O_3$ (M is at least two of alkali elements except Li and Na) on the gain characteristics. As in the case of Embodiments 23 and 24, a 10 dB or less gain deviation at wavelengths from 1.56 μm and 1.60 μm is attained in spite of including two elements in the composition. In addition, an EDFA is constructed using the gain-equalizing device. As a result, the EDFA showed 1 dB or less gain at wavelengths from 1.53 μm to 1.60 μm (i.e., over a bandwidth of 70 nm), and also provided the uniform gain at that wavelengths.

(Embodiment 26)

We described above that an influence of adding $Al_2O_3$ to $TeO_2$—ZnO—$R_2O$—$Bi_2O_3$ (R is an alkali element) on the gain characteristics. In this Embodiment, we also confirmed that an addition of $Al_2O_3$ effected on the gain deviation on another type of tellurite glass (not depended on the composition except $TeO_2$ and $Al_2O_3$, such as $TeO_2$—$WO_2$ and $TeO_2$—ZnO—$La_2O$—$Bi_2O_3$—$Al_2O_3$ (R is at least one of alkali elements) glass) for realizing EDFA in the type of a broadband and gain-flattening.

(Embodiment 27)

Figure 27:
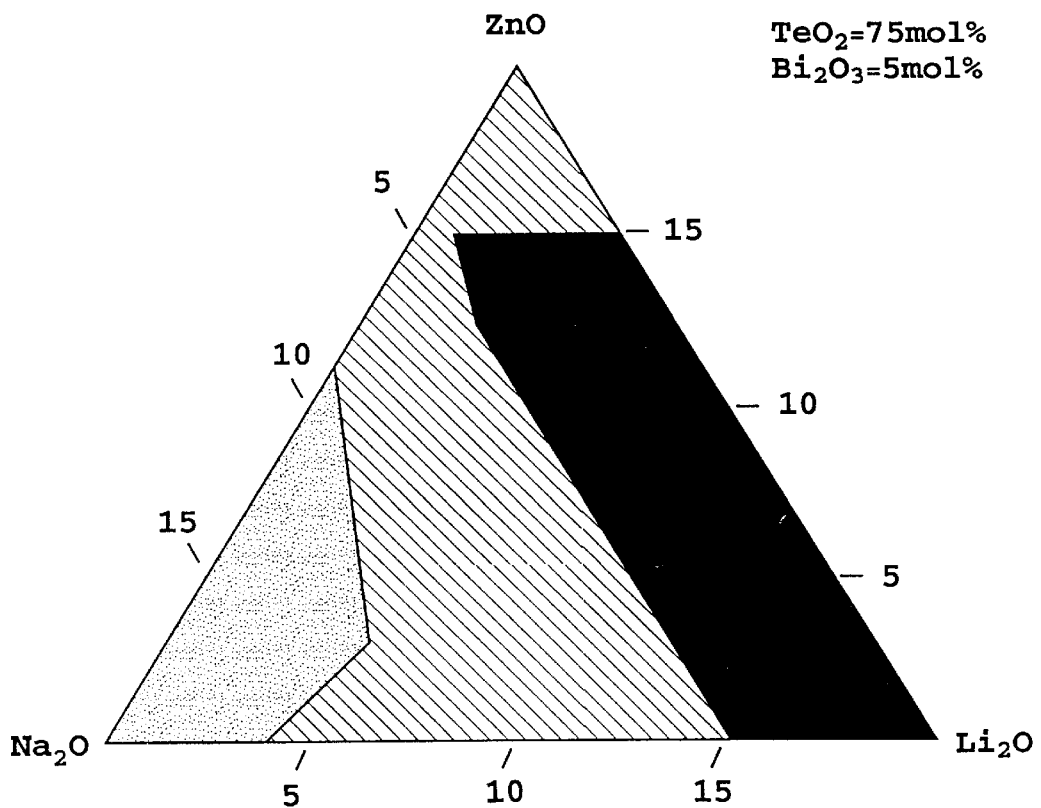
FIG. 27 is a schematic representation of the stable glass formation range for glass comprising five ingredients as a composition of $TeO_2$—ZnO—$Li_2O$—$Na_2O$—$Bi_2O_3$ glass when $TeO_2=75$ mole % and $Bi_2O_3=5$ mole %.

In this Embodiment, 100 glass samples are prepared from a glass composition of $TeO_2$—ZnO—$Li_2O$—$Na_2O$—$Bi_2O_3$. That is, the glass samples are made of materials containing 75 mole % $TeO_2$ and 5 mole % $Bi_2O_3$ or materials containing 80 mole % $TeO_2$ and 5 mole % $Bi_2O_3$. In each of the materials, furthermore, the contents of other ingredients are varied. Then, each of the glass samples is broken into pieces and powdered in an agate mortar. 30 mg of the obtained powder is filled into a sealed container made of silver and then subjected into the DSC measurement in an argon atmosphere at a heat-up rate of 10° C./minute, resulting in a heat-stable glass having 120° C. or more of Tx–Tg in the region B shown in FIGS. 27 and 28. The heat-stable glass allows the mass production of optical fibers and the lower prices that result therefrom.

Then, an optical amplification medium is prepared as a fiber having a cut-off wavelength of 1.1 μm and a core/clad relative refractive index difference of 1.6%. That is, a core of the fiber is formed from a glass composition the glass composition of $TeO_2$ (75 mole %) —ZnO (5 mole %) —$Li_2O$ (12 mole %) —$Na_2O$ (3 mole %) —$Bi_2O_3$ (5 mole %) doped with 2,000 ppm of erbium, and also a clad of the fiber is formed from a glass composition of $TeO_2$ (75 mole %) —ZnO (2 mole %) —$Li_2O$ (15 mole %) —$Na_2O$ (3 mole %) —$Bi_2O_3$ (5 mole %).

The obtained medium is cut to a fiber of 3 m in length to construct an optical amplifier. The optical amplifier is subjected to an amplification test.

In the amplification test, a bidirectional pumping procedure with a forward-pump wavelength of 0.98 μm and a backward-pump wavelength of 1.48 μm is used. In addition, a wavelength tunable laser that covers from 1.5 μm to 1.7 μm band is used as an optical signal source. As a result, a small signal gain of 20 dB or more is obtained at a bandwidth of 80 nm ranging from 1,530 to 1,610 μm. At this time, a noise figure (NF) is 5 dB or less.

Figure 28:
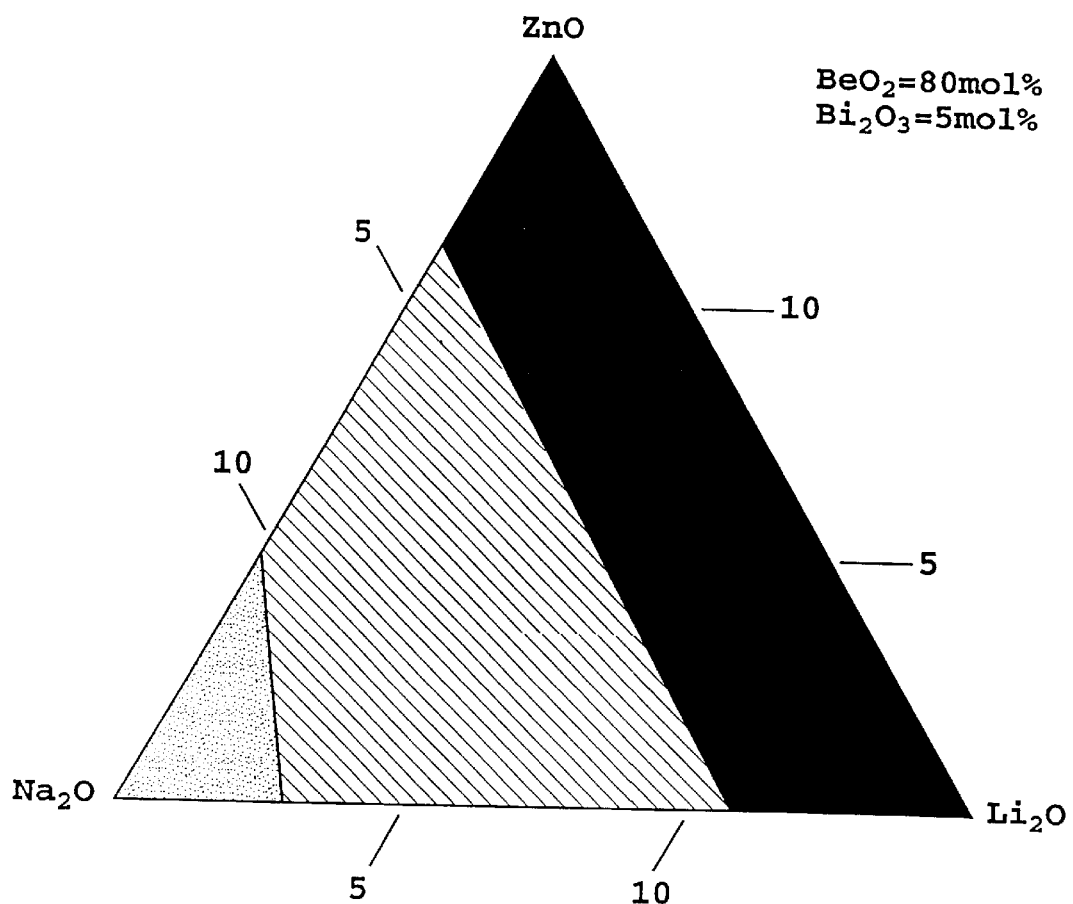
FIG. 28 is a schematic representation of the stable glass formation range for glass comprising five ingredients as a composition of $TeO_2$—ZnO—$Li_2O$—$Na_2O$—$Bi_2O_3$ glass when $TeO_2=80$ mole % and $Bi_2O_3=5$ mole %.

From a region (that indicates the compositions capable of being used in the fiber formation) shown in FIG. 28, a glass composition of $TeO_2$ (80 mole %) —ZnO (6 mole %) —$Li_2O$ (4 mole %) —$Na_2O$ (5 mole %) —$Bi_2O_3$ (5 mole %)

is selected from among allowable compositions in the region so as to be provided as a core material. Among the compositions in the region, furthermore, a glass composition of TeO$_2$ (80 mole %) —ZnO (2 mole %) —Li$_2$O (6 mole %) —Na$_2$O (7 mole %) —Bi$_2$O$_3$ (5 mole %) is selected so as to be provided as a clad material. The core material is doped with 2,000 ppm of erbium. Then, an optical fiber having a cut-off wavelength of 1.1 μm and a core/clad relative refractive index difference of 1.5%. The obtained fiber is provided as an optical amplification medium. A fiber-loss of the medium is 0.07 dB/m at 1.2 μm.

The medium is cut to a fiber of 3 m in length to construct an optical amplifier. The optical amplifier is also subjected to an amplification test. As a result, a small signal gain of 20 dB or more over is obtained at a bandwidth of 80 nm ranging from of 1,510 to 1,630 nm. At this time, a noise figure (NF) is 5 dB or less. The results indicated that a practical broadband EDFA could be prepared from any glass composition of the B region without any trouble.

(Embodiment 28)

An optical amplifier is constructed by the same way as that of Embodiment 27 except of using a fiber of 15 m length in this Embodiment and subjected to an amplification test. For pump wavelengths to be applied from both side, a bidirectional pumping procedure in which the front and the backward wavelengths are identical with each other is used. In addition, a wavelength tunable laser that covers from 1.5 μm to 1.7 μm band is used as an optical light source. As a result, a small signal gain of 20 dB or more is obtained at a bandwidth of 70 nm ranging from 1,560 to 1,630 nm. At this time, noise figure is 5 dB or less.

(Embodiment 29)

A laser is constructed using a fiber (15 m in length) which is prepared as the same way as that of Embodiment 27. A cavity is constructed using a fiber-bragg-grating that has a refractive index of 3% at a wavelength of 1,625 nm with respect to a total reflection mirror. For pump wavelengths to be applied from both side, a bidirectional pumping procedure in which the forward and the backward wavelengths are of 1.48 μm. The laser generated a high-power of 150 mW at 1,625 nm wavelength, which could not be attained by silica-based and fluoride-based optical fibers.

(Embodiment 30)

Figure 29:
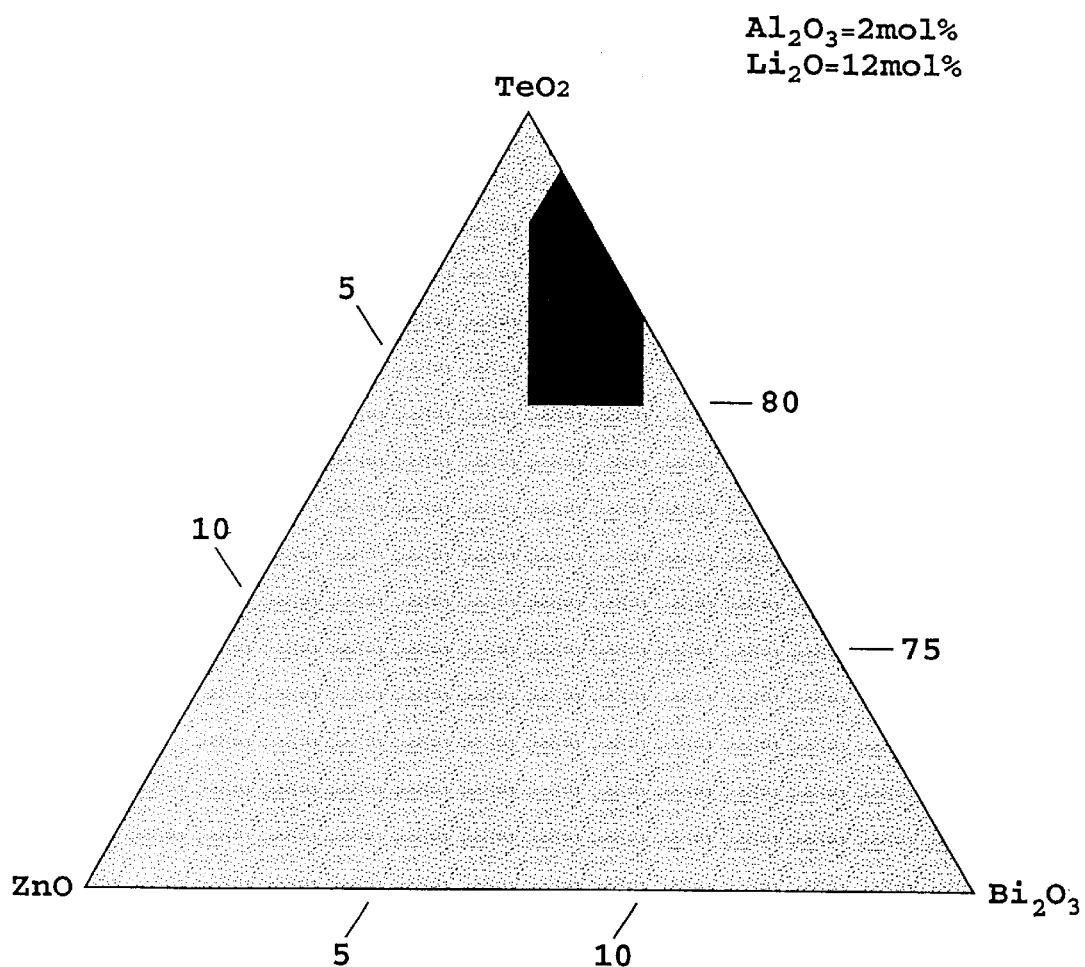
FIG. 29 is a schematic representation of the stable glass formation range for glass comprising five ingredients as a composition of $TeO_2$—ZnO—$Li_2O$—$Al_2O$—$Bi_2O_3$ glass when $Al_2O_3=2$ mole % and $Li_2O_3=12$ mole %.

In this Embodiment, 50 glass samples are prepared from a glass composition of TeO$_2$—ZnO—Li$_2$O—Al$_2$O$_3$—Bi$_2$O$_3$. The samples have 2 mole of Al$_2$O$_3$ and 12 mole % of Li$_2$O except that every sample have its own ratios of other ingredients. Then, each of the glass samples is broken into pieces and powdered in an agate mortar. 30 mg of the obtained powder is filled into a sealed container made of silver and then subjected into the DSC measurement in an argon atmosphere at a heat-up rate of 10° C./minute, resulting in a heat-stable glass having 120° C. or more of Tx–Tg in a region defined as A in FIG. 29. The heat-stable glass allows a fiber having a lower loss of 0.1 dB/m or less. In addition, the effects of adding Al$_2$O$_3$ into the glass composition allows a broader area of induced-emission cross section, so that an amplification bandwidth of EDFA can be broadened.

Next, an optical amplification medium is prepared as a fiber having a cut-off wavelength of 1.1 μm and a core/clad relative refractive index difference of 1.6%. A core of the fiber is formed from a glass composition the glass composition selected from the region in FIG. 29, that is, TeO$_2$ (82 mole %) —ZnO (1 mole %) —Li$_2$O (12 mole %) —Al$_2$O$_3$ (2 mole %) —Bi$_2$O$_3$ (3 mole %) doped with 2,000 ppm of erbium. Also, a clad of the fiber is formed from a glass composition of TeO$_2$ (75 mole %) —ZnO (3 mole %) —Li$_2$O (18 mole %) —Bi$_2$O$_3$ (4 mole %). A fiber-loss at 1.2 μm is 0.07 dB/m.

The obtained medium is cut to a fiber of 3 m in length to construct an optical amplifier. The optical amplifier is subjected to an amplification test.

In the amplification test, a bidirectional pumping procedure with a forward-pump wavelength of 0.98 μm and a backward-pump wavelength of 1.48 μm is used. In addition, a wavelength tunable laser that covers from 1.5 μm to 1.7 μm band is used as an optical signal source. As a result, a small signal gain of 20 dB or more is obtained at a bandwidth of 80 nm ranging from 1,530 to 1,610 μm. At this time, a noise figure (NF) is 5 dB or less.

(Embodiment 31)

A wavelength tunable ring laser is constructed using the same fiber (4 m in length) as that of Embodiment 30, and also a wave tunable filter for wavelengths from 1.5 μm to 1.7 μm is used as a filter. In addition, a bidirectional pumping procedure in which the front and the backward wavelengths are identical with each other is used. At an incident pump strength of 300 mW, the laser showed its broadband laser characteristic of 5 mW or more at a bandwidth of 135 nm ranging from 1,500 to 1,635 nm, which could not be attained by the silica-based and fluoride-based optical fiber.

(Embodiment 32)

Five optical fibers of 800 m in length as a fiber having a cut-off wavelength of 1.1 μm and a core/clad relative refractive index difference of 1.3 to 2.2%. In this Embodiment, a core of the fiber is formed from a glass composition the glass composition of TeO$_2$ (79.5-x mole %) —ZnO (14.5 mole %) —Na$_2$O (6 mole %) —Bi$_2$O$_3$ (x mole %) doped with 500 ppm of erbium, and five fibers took their values of x=4, 4.2, 5.4, 6.8, and 7, respectively. Also, a clad of the fiber is formed from a glass composition of TeO$_2$ (75 mole %) —ZnO (17.5 mole %) —Na$_2$O (5 mole %) —Bi$_2$O$_3$ (2.5 mole %) glass. In the case of fibers of x=4 and x=7 mole %, the spacing between adjacent scattering points (i.e., a point where a fiber-loss is remarkably increased by a scattering of light from particles such as crystals) is 15 m or less, and also a fiber-loss in the area without the scattering centers is 0.07 dB/m at a wavelength of 1.2 μm. In the case of fibers of x=4.2, 5.4, and 6.8 mole %, on the other hand, the spacing between adjacent scattering centers is 100 m or more, and also a fiber-loss in the area without the scattering centers is 0.02 dB/m or less.

In general, by the way, a required fiber length for constructing EDFA is about 10 m. When the fibers of x=4 or 7 mole % are used; only 20 or less 10-meter-long fibers are obtained from an 800-meter-long fiber. On the other hand, 70 or more 10-meter-long fibers are obtained from an 800-meter-long fiber when the fibers of x=4.2, 5.4, and 6.8 mole % are used, resulting in a dramatic improvement in yield.

In the following Embodiments 33 to 39, tellurite EDFAs that has improved characteristics of chromatic dispersion will be described in view of the fact that the improved characteristics of tellurite optical fibers described above.

An optical amplifier using a tellurite glass composition as an amplification medium is mainly characterized by having a configuration where a dispersion medium is placed in the front of or at the back of the tellurite EDFA. The dispersion medium compensates for the dispersion of wavelengths by a value of chromatic dispersion that takes a plus or negative number opposite to a value of chromatic dispersion for the tellurite EDFA. The medium that compensates the chromatic dispersion may be an optical fiber, an fiber black grating, or the like.

The conventional tellurite EDFAs do not have any medium that compensates the chromatic dispersion, so that the degree of dispersion tends to increase. Conventionally, therefore, there is a problem of that an error rate is increased as a result of performing a first signal amplification. To solve this problem, the following Embodiments will provide novel configurations of tellurite EDFA that retains the qualities of communications by allowing an decrease in a value of chromatic dispersion in the optical amplifier to avoid an increase in error rate whether the high speed signal amplification is performed or not.

(Embodiment 33)

Figure 30:
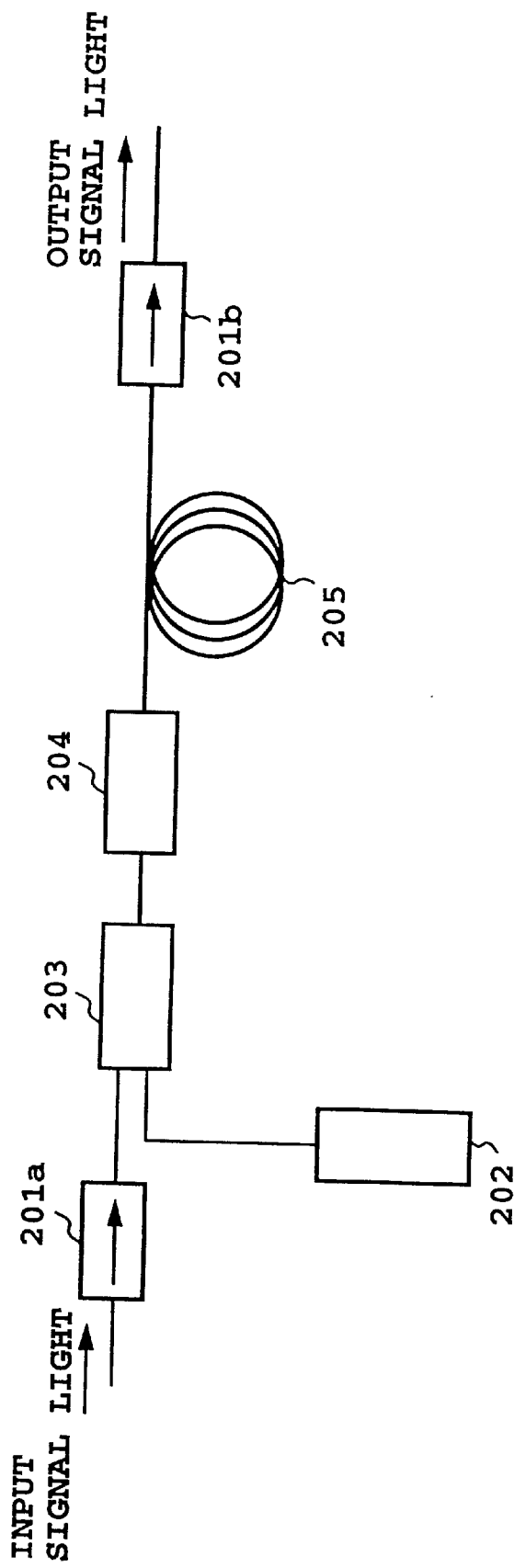
FIG. 30 is a schematic block diagram of an optical amplifier using the tellurite glass optical fiber as the amplification medium as one of the preferred embodiment of the present invention.

FIG. 30 illustrates an optical amplifier as one of the preferred embodiments of the present invention. In the figure, an optical signal enters from the left side and exits to the right side of the optical amplifier. The input signal light passes through an optical isolator 201a and then combined with an excitation light from an excitation light source through an optical coupler 203. Then, the combined signal light is introduced into an optical fiber 205 for optical amplification after passing through a dispersion medium 204. The signal light amplified by the optical fiber 205 is then outputted through an optical isolator 1b.

In the optical amplifier of the present embodiment, a semiconductor laser having an oscillation wavelength of 1.48 μm is used as an excitation light source 203 and a signal wavelength of 1.55 μm is used. In addition, a tellurite optical fiber of 10 m in length is used as an optical fiber for optical amplification. The tellurite optical fiber is characterized by an erbium-doping concentration of 200 ppm in its core, a cut-off wavelength of 1.3 μm, and a core/clad relative refractive index difference of 1.4%. A value of chromatic dispersion is −1.3 ps/nm. Furthermore, a single-mode silica-based optical fiber of 1.3 μm zero dispersion (so-called a standard single-mode optical fiber) having a chromatic dispersion value of 17 ps/km/nm at 1.55 μm is used as a dispersion medium. A length of the fiber is 76 m.

A chromatic dispersion of all of the dispersion medium 204 and the amplification optical fiber 205 is measured and resulted in 0.1 ps/nm or less.

An amplification of a high-speed optical signal of 40 Gbit/sec at a wavelength of 1.55 μm is performed using the optical amplifier obtained by the above procedure. In this case, we could not observe any distortion of pulse wavelength caused by the chromatic dispersion. Therefore, we find that the optical amplifier of the present embodiment can be used in a booster amp, an in-line amplifier, or a pre-amplifier without decreasing the qualities of communications. For the comparison, on the other hand, an amplification of a high-speed pulse of 40 Gbit/s at 1.55 μm wavelength is performed without inserting the dispersion medium 204. As a consequence of the amplification, pulse-waveform distortions are observed. It means that it is very difficult to apply this configuration to a high-speed communication system.

In the present embodiment, the dispersion medium 204 is placed between an optical coupler 203 and Er-doped tellurite optical fiber 205 but not limited to such an arrangement. The dispersion medium 204 may be placed in front of the optical isolator 1a, between the optical isolator 1a and the optical coupler 203, between the amplification medium and the optical isolator 201b, or at the back of the optical isolator 201b. In this embodiment, furthermore, a standard single-mode optical fiber is used but not limited to. It is also possible to use any optical fibers that have a chromatic dispersion of the tellurite optical fiber 205 and an oppositely signed value of chromatic dispersion. For the dispersion medium 204, a chirped fiber grating (K. O. Hill, CLEO/PACIFC RIM SHORT COURSE '97 "Photosensitivity and bragg Gratings in Optical Waveguide") may be used instead of the optical fiber.

In the above description, by the way, the dispersion medium 204 is placed in front of or at the back of the amplification optical fiber 205 but not limited to. It is also possible to adopt another arrangement of the dispersion medium 204. That is, if an optical fiber is used as the dispersion medium 204, the optical fiber can be divided into two portions in which one is arranged on an appropriate position in front of the amplification optical fiber 205 and the other is arranged on an appropriate position at the back of the fiber 205. Also, a plurality of optical fibers having different characteristics can be arranged on appropriate positions.

(Embodiment 34)

In this embodiment, an amplification is a tellurite optical fiber (15 m in length) doped with 500 ppm of Pr (praseodymium) having a cut-off wavelength of 1.0 μm and Δn=1.4% and an amplification optical fiber 205 in FIG. 30. An excitation light source 202 is a Nd (neodium)-doped YLF laser. For a dispersion medium 204, a chirped fiber grating is used. At this time, a chromatic dispersion of the tellurite optical fiber at 1.31 μm is 3.15 ps/nm. Hence, a chromatic dispersion value of the grating is adjusted to 3.15 ps/nm and then an amplification of high-speed signal at 1.31 μm wavelength is performed using an amplifier of such a configuration. As a result, pulse-waveform distortions are not observed in spite of performing an amplification of high-speed pulse of 40 Gbit/s at 1.3 μm wavelength. It means that it is possible to apply this configuration to a high-speed communication system. In the case of an optical amplifier which is constructed without using the dispersion medium 204, pulse-waveform distortions are occurred if an amplification of high-speed pulse is performed, resulting in the difficulty in an amplification for the high-speed communication system.

(Embodiment 35)

In this embodiment, $TeO_2$—$ZnO$—$M_2O$—$Bi_2O_3$ glass composition (where M is one or more alkali elements) is used as a preform of an amplification optical fiber 205. That is, a core of the fiber is made of the glass composition plus Er, Pr, and Tm as additives for 1.48 μm or 1.65 μm band amplification, and also a clad of the fiber is made of the glass composition plus Nd as an additive for 1.06 μm or 1.33 μm band amplification.

An amplification of high-speed pulse is performed by an optical amplifier using a silica-based fiber or a chirped-fiber gratings as the dispersion medium 204 and compensating chromatic dispersions at an amplification wavelength of each earth rare element. As a result, waveform distortions of optical pulse that occurred when the dispersion medium 204 is absent are prevented. Consequently, we confirmed that it could be used in the high-speed optical communication system.

(Embodiment 36)

In this embodiment, $TeO_2$—$ZnO$—$Na_2O$—$Bi_2O_3$ glass composition is used as a preform of an amplification optical fiber 205. A content of each ingredient in the composition is 55 mole %≦$TeO_2$≦90 mole %, 0 mole %≦$ZnO$≦25 mole %, 0 mole %≦$Li_2O$≦25 mole %, 0 mole %<$Bi_2O_3$≦20 mole %. A core of the fiber is made of the glass composition plus Er, Pr, Tm, or Nd as an additive for 1.48 μm or 1.65 μm band amplification, and also a clad of the fiber is made of the glass composition plus Nd as an additive for 1.06 μm or 1.33 μm band amplification.

An amplification of high-speed pulse is performed by an optical amplifier using a silica-based fiber or a chirped-fiber grating as the dispersion medium 204 and compensating chromatic dispersions at an amplification wavelength of each earth rare element. As a result, waveform distortions of optical pulse that occurred when the dispersion medium 204 is absent are prevented. Consequently, we confirmed that it could be used in the high-speed optical communication system.

(Embodiment 37)

An amplification optical fiber 205 is constructed using a glass composition of $TeO_2$—$ZnO$—$M_2O$—$Bi_2O_3$ (where M is one or more alkali elements) as a preform. In the composition, a content of each ingredient is 55 mole % $\leq TeO_2 \leq$ 90 mole %, 0 mole % $\leq ZnO \leq$ 25 mole %, 0 mole % $\leq Li_2O \leq$ 25 mole %, 0 mole % $< Bi_2O_3 \leq$ 20 mole %. A core of the fiber is made of the glass composition plus Er, Pr, Tm, or Nd as an additive for 1.48 μm or 1.65 μm band amplification, and also a clad of the fiber is made of the glass composition plus Nd as an additive for 1.06 μm or 1.33 μm band amplification.

An amplification of high-speed pulse is performed by an optical amplifier using a silica-based fiber or a chirped-fiber gratings the dispersion medium 204 and compensating chromatic dispersions at an amplification wavelength of each earth rare element. As a result, waveform distortions of optical pulse that occurred when the dispersion medium 204 is absent are prevented. Consequently, we confirmed that it could be used in the high-speed optical communication system.

In addition, an optical amplifier that uses an amplification optical fiber 205 comprising a glass composition of $TeO_2$—$ZnO$—$M_2O$—$Bi_2O_3$—$Al_2O_3$ (where M is one or more alkali elements) showed the same effects.

(Embodiment 38)

Raman amplification is performed using a single-mode tellurite optical fiber (a cut-off wavelength of 1.3 μm, Δn=1.4%, and a length of 1 km). In this embodiment, the glass composition of Embodiment 26 is used as a preform of an amplification optical fiber except that an additive such as a rare earth element or a transition metal element is not used in the present embodiment. An optical amplification at 1.5 μm band is performed by pumping a wavelength of 1.48 μm.

A chromatic dispersion observed in the single-mode tellurite optical fiber at a signal wavelength is −130 ps/nm. In this case, a dispersion medium 204 is a standard single-mode silica optical fiber.

The dispersion medium 204 is placed at the back of the single-mode tellurite optical fiber (the amplification optical fiber) 205 and then an optical amplification is performed. In a case where 7.6 km of the standard single-mode silica optical fiber is used, we could prevent a waveform distortion of the optical pulse at 1.5 μm band (which could be considered as a result of chromatic dispersion of the single-mode tellurite optical fiber).

(Embodiment 39)

In this embodiment, an optical amplification procedure is performed at each of 1.5 μm band, 1.5 μm band, and 1 μm band by means of an amplification optical fiber 205 which is constructed by adding Cr, Ni, or Ti into a core of the tellurite glass optical fiber made of the composition of Embodiment 36 or 37. In a case where an amplification of high-speed optical pulse is performed by connecting a standard single-mode silica optical fiber as a dispersion medium 204 at the back of the amplification optical fiber 205, the optical amplification could be attained without causing a waveform distortion.

By the way, each of the embodiments described above is for an optical waveguide. We could also obtained the same effects recognized in the above Embodiments when a flat-type optical waveguide is used as an optical waveguide.

(Embodiment 40)

In this Embodiment, a tellurite glass composition of $TeO_2$—$ZnO$—$M_2O$—$Bi_2O_3$ (where M is one or more alkali elements) is used as a preform for preparing an amplification medium. The amplification medium is prepared using a flat-type optical waveguide having a core doped with Er instead of the optical fiber 205 of FIG. 30. For a dispersion medium 204, a chromatic dispersion of that optical waveguide is corrected using a dispersion medium 204 such as an optical fiber or a Bragg grating. As a result, an optical amplification at 1.5 μm band is accomplished so as to lessen the likelihood of the dispersion of optical pulse waveforms due to the chromatic dispersion characteristics of the tellurite fiber.

Next, we carried out the following Embodiments 40 to 44 for the scale-up of an amplification bandwidth of the conventional tellurite EDFA, that is, shifting from 1.53 μm band to a shorter band and from 1.56 μm band to a longer band.

For that purpose, an erbium-doped tellurite optical fiber of a predetermined length is used as at least one coupled optical fiber. In addition, a shorter erbium-doped tellurite optical fiber (or a smaller product of erbium concentration and fiber length) or an erbium-doped optical fiber that contains a different glass composition is placed in front of or at the back of the tellurite optical fiber. The different glass composition may be a fluoride glass composition such as erbium-doped $ZrF_4$ based glass or $InF_3$ based fluoride glass), a silica glass composition, a fluorophosphate glass composition, a phosphate glass composition, or a chalcogenide glass composition.

Using the optical amplifier constructed as described above, therefore, a novel EDFA that acts at a broad bandwidth with a low noise compared with that of the conventional tellurite EDFA.

(Embodiment 41)

Figure 31:
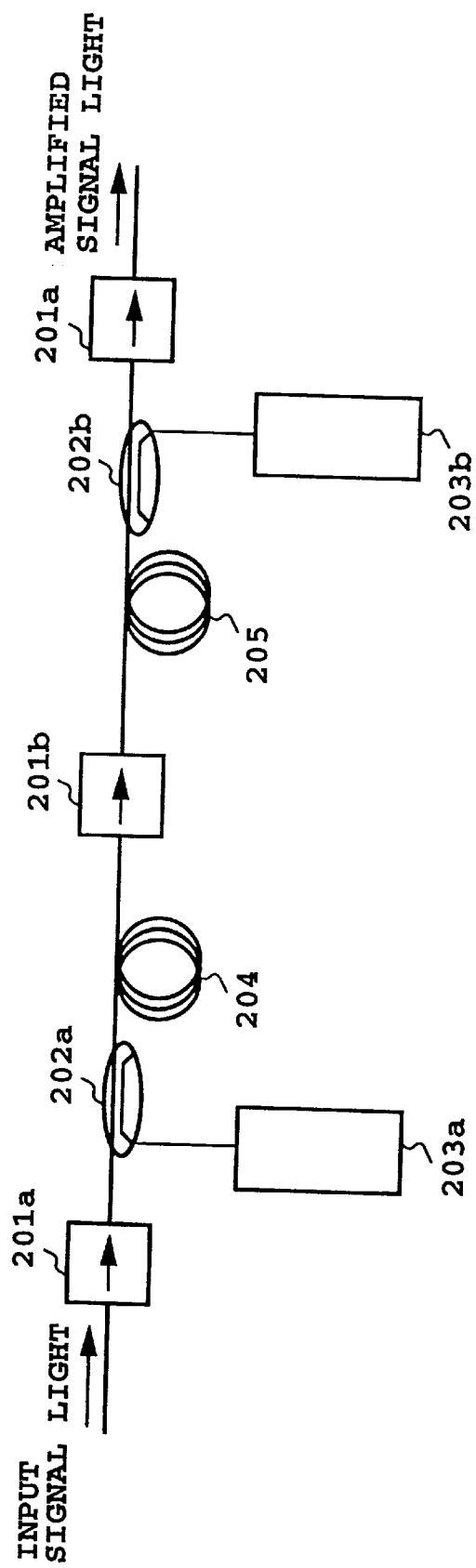
FIG. 31 is a schematic block diagram of an optical amplifier using the tellurite glass optical fiber as the amplification medium as one of the preferred embodiment of the present invention.

FIG. 31 is a block diagram that illustrates an optical amplifier as one of preferred embodiments of the present invention. In the figure, reference numerals 201a, 201b, and 201c denotes optical isolators, 202a and 202b denotes an optical coupler for introducing excitation light into the fibers, 203a and 203b are excitation light sources, and 204 and 205 are optical fibers for the amplification.

In this embodiment, the optical fiber 204 is an aluminum-added silica-based optical fiber doped with 1,000 ppm of erbium (2.5 m in length, 1.2 μm cut-off wavelength, and 2,500 m·ppm in product of content and length). The excitation light source 203a is a semiconductor laser with an oscillation wavelength of 1.48 μm.

In a case that an amount of excitation light from the source 203a is 70 mW and an amount of excitation light from the source 203b is 150 mW, a gain of 20 dB or more and a noise figure of 5 dB or less are obtained at a bandwidth of 85 nm in the region of 1,525 μm to 1,610 μm.

The EDFA of the present embodiment attains the ability to act in such a bandwidth without causing any significant noise, which is impossible for the conventional EDFA.

In this embodiment, an operating bandwidth is extended as a result that the low-noise band is extended toward the side of shorter wavelengths. The reason is simple: the tellurite optical fiber that performs an optical amplification after amplifying at wavelengths of 1.525 μm to 1.54 μm with a high gain and a low-noise by the amplification optical fiber (the product of erbium-content and fiber-length) is small) which is arranged in front of the tellurite optical fiber.

Referring again FIG. 31, we will describe one of modified configurations of this embodiment.

In this modified embodiment, the optical fiber 204 is an silica-based optical fiber doped with 1,000 ppm of erbium (1.2 m in length, 1.2 μm cut-off wavelength, and 12,000 m·ppm in product of content and length. The product is larger than that of the erbium-doped tellurite fiber). The excitation light source 203a is a semiconductor laser with an oscillation wavelength of 1.48 μm.

In a case that an amount of excitation light from the source 203a is 70 mW and an amount of excitation light from the source 203b is 150 mW, a gain of 20 dB or more and a noise figure of 5 dB or less are obtained at a bandwidth of 75 nm in the region of 1,535 μm to 1,610 μm.

The EDFA of the present modified embodiment also attains the ability to act in such a bandwidth without causing any significant noise, which is impossible for the conventional EDFA.

(Embodiment 42)

In this embodiment, the optical fiber 204 is a $ZrF_4$-contained fluoride optical fiber doped with 100 ppm of erbium (3.5 m in length, 1.2 μm cut-off wavelength, and 2,500 m·ppm in product of erbium-content and fiber-length). The excitation light source 203 is a semiconductor laser with an oscillation wavelength of 1.48 μm. The amplification optical fiber 205 is a tellurite optical fiber that contains the above tellurite glass composition of $TeO_2$—$ZnO$—$Li_2O$—$Bi_2O_3$ ($55 \leq TeO_2 \leq 90$, $0 \leq ZnO \leq 25$, $0 \leq Li_2O \leq 25$, $0 < Bi_2O_3 \leq 20$, unit: mole %) as a preform. The tellurite optical fiber (12 m in length) is prepared from that composition doped with 500 ppm of erbium and has a cut-off wavelength of 1.3 μm (the product of erbium-content and fiber-length is 6,000 m·ppm). In addition, the excitation light source 203b is a semiconductor laser with an oscillation wavelength of 1.48 μm.

In a case that an amount of excitation light from the source 203a is 70 mW and an amount of excitation light from the source 203b is 150 mW, a gain of 20 dB or more and a noise figure of 5 dB or less are observed at a bandwidth of 85 nm in the region of 1,525 μm to 1,610 μm. In a case that the amplification fiber is not used, a noise figure of more than 5 dB is observed at a wavelength under 1.54 μm and a noise figure of 10 dB or more is observed at a wavelength of 1.525 μm. In addition, a gain of 20 dB or more is only observed at a bandwidth of 80 nm in the region of 1.53 μm to 1.61 μm.

(Embodiment 43)

In this embodiment, the optical fibers 204, 205 are the same tellurite glass optical fibers except their lengths, that is, the fiber 204 is 3 m in length, and the fiber 205 is 12 m in length. Each of these fibers 4, 5 is prepared using the above glass composition: $TeO_2$—$ZnO$—$Li_2O$—$Bi_2O_3$ ($55 \leq TeO_2 \leq 90$, $0 \leq ZnO \leq 25$, $0 \leq Li_2O \leq 25$, $0 < Bi_2O_3 \leq 20$, unit: mole %) as a preform and doped with 500 ppm of erbium. In addition, a cut-off wavelength of 1.3 μm of the fiber is 1.3 m. The light source 3b is a semiconductor laser with an oscillation wavelength of 1.48 μm.

In a case that an amount of excitation light from the source 203a is 100 mW and an amount of excitation light from the source 203b is 150 mW, a gain of 20 dB or more and a noise figure of 5 dB or less are observed at a bandwidth of 85 nm in the region of 1.525 μm to 1.610 μm. In a case that the amplification fiber is not used, a noise figure of more than 5 dB is observed at a wavelength under 1.54 μm and a noise figure of 10 dB or more is observed at a wavelength of 1.525 μm. In addition, a gain of 20 dB or more is only observed at a bandwidth of 80 nm in the region of 1.53 μm to 1.61 μm.

In Embodiments 41, 42, and 43, the amplification optical fibers 204, 205 are used for the procedures of forward excitation and backward excitation but not limited to. Another excitation procedure such as a bidirectional excitation may be applied instead of those procedures.

(Embodiment 44)

In this embodiment, the amplification optical fiber 204 is the same one as that of Embodiments 41 to 43. The amplification optical fiber 205 is a tellurite optical fiber (14 m in length) doped with 500 ppm of erbium. In this embodiment, just as in the case of Embodiments 40 to 42, the EDFA using the amplification optical fiber 204 allows the scale-up of low-noise amplification bandwidth compared with that of the EDFA which does not use the fiber 204.

(Embodiment 45)

In this Embodiment, the amplification optical fiber 204 is one of an erbium-doped fluoride phosphate optical fiber, a phosphate optical fiber and a chalcogenide optical fiber. In a case that the product of Er-concentration and fiber-length of the optical fiber 204 is less than that of the tellurite glass (i.e., the amplification optical fiber 205), the scale-up of low-noise amplification bandwidth is observed. It means that a raw material of the fiber 204 is of little importance to the effects of the present invention but the product of Er-concentration and fiber-length is importance thereto.

In Embodiments 41 to 45, two optical fibers which are different with each other with respect to the product of Er-content and fiber-length are used as amplification media but not limited to that numbers. It is also possible to 3 or more optical fibers are used as the amplification media. The optical fiber having the minimum product may be placed in any place except the rear, preferably it may be placed in the front.

In the following description, we will disclose a structure for reliably splicing two different optical fibers (i.e., a non-silica-based optical fiber and a silica-based optical fiber or two different non-silica based optical fibers having different core refractive indexes) with a low-loss and low-reflection.

Figure 32:
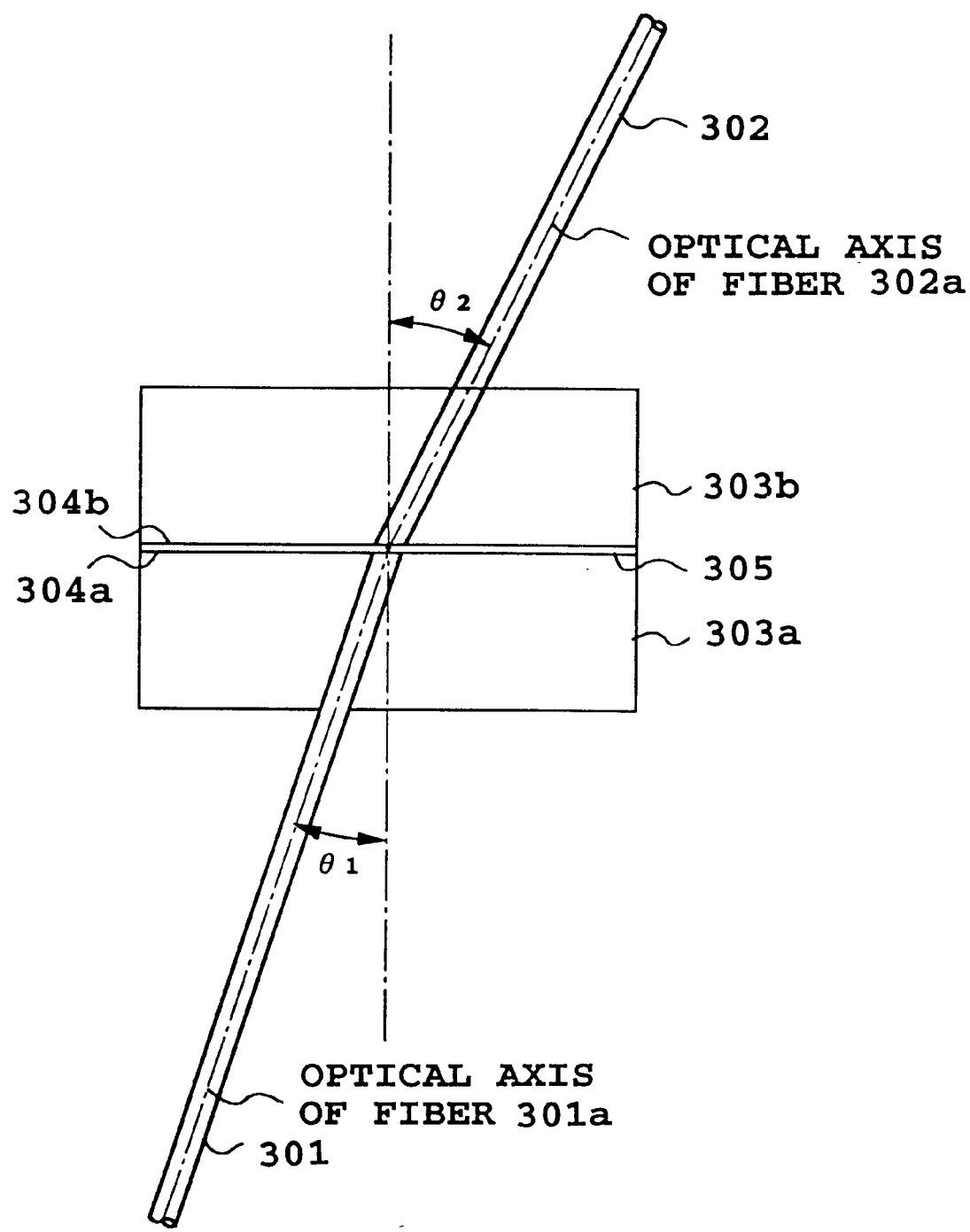
FIG. 32 is a schematic diagram of the splicing structure between the non-silica-based optical fiber and the silica-based optical fiber in accordance with the present invention.

FIG. 32 is a schematic diagram of a spliced portion between a non-silica-based optical fiber and a silica-based optical fiber. In the figure, reference numeral 301 denotes the non-silica-based optical fiber, 302 denotes the silica-based optical fiber, 303a denotes a housing for holding an end portion of the non-silica-based optical fiber, 303b denotes a housing for holding an end portion of the silica-based optical fiber, 304a denotes an end surface of the housing 303a, 303b denotes an end surface of the housing 303b, and 305 denotes an optical adhesive. The non-silica-based optical fiber 301 is held in the housing 303a at an angle of $\theta_1$ from the vertical axis of the end face 304a, and the silica-based optical fiber 302 is held in the housing 303b at an angle of $\theta_2$ from the vertical axis of the end 304b. In this case, a low-loss coupling between these fibers 301, 302 can be attained if the angles $\theta_1$, $\theta_2$ [rad] satisfy the equation (4), i.e., Snell's law.

$$\frac{\sin\theta_1}{\sin\theta_2} = \frac{n_2}{n_1} \tag{4}$$

where $n_1$ is a refractive index of the first optical fiber and $n_2$ is a refractive index of the second optical fiber.

Return losses $R_1$ and R2, expressed in decibels, on the end surfaces of non-silica-based optical fiber 301 and silica-based optical fiber 302 are expressed by the following equations (5) and (6), respectively, quoted from technical literature: H. M. Presby, et. al., "Bevelled-microlensed taper connectors for laser and fiber back-reflections", Electron. Lett., vol. 24, pp. 1162–1163, 1988.

$$R_1 \text{ (dB)} = \left| 10\log\left\{\left[\frac{(n_1 - n_{UV})}{(n_1 + n_{UV})}\right]^2\right\} + 43.4 \times \left(\frac{2\pi n_1}{\lambda} - \theta_1 \cdot \omega_1\right)^2 \right| \quad (5)$$

$$R_2 \text{ (dB)} = \left| 10\log\left\{\left[\frac{(n_2 - n_{UV})}{(n_2 + n_{UV})}\right]^2\right\} + 43.4 \times \left(\frac{2\pi n_2}{\lambda} - \theta_2 \cdot \omega_2\right)^2 \right| \quad (6)$$

wherein $n_{uv}$ is a refractive index, $\lambda$ is a signal wavelength (wavelength to be used), $\omega_1$ is a mode field diameter of the non-silica-based optical fiber 301, and $\omega_2$ is a mode field diameter of the silica-based optical fiber 302.

Therefore, a low-reflection coupling beyond all expected return losses can be attained by adjusting the angles $\theta_1$ and $\theta_2$ by the equations (5) and (6). An angle $\theta_1$ required for attaining a desired return loss $R_1$ for the non-silica-based optical fiber 301 (such as Zr-fluoride fiber: core refractive index=1.55, In-fluoride fiber: core refractive index=1.65, chalcogenide fiber (glass composition As—S): core refractive index=2.4, or tellurite glass: core refractive index=2.1) can be calculated by the following equation (7) as a modification of the equation (5). Also, an angle $\theta_2$ required for attaining a desired return loss $R_2$ for the silica-based optical fiber 302 can be calculated by the following equation (8) as a modification of the equation (6).

$$\theta_1 \geq \sqrt{\frac{R_1 - \left|10\log\left(\frac{n_1 - n_{UV}}{n_1 + n_{UV}}\right)^2\right|}{43.4 \times \left(\frac{2\pi n_1 \cdot \omega_1}{\lambda}\right)^2}} \quad (7)$$

$$\theta_2 \geq \sqrt{\frac{R_2 - \left|10\log\left(\frac{n_2 - n_{UV}}{n_2 + n_{UV}}\right)^2\right|}{43.4 \times \left(\frac{2\pi n_2 \cdot \omega_2}{\lambda}\right)^2}} \quad (8)$$

In a case where a refractive index $n_{UV}$ of the optical adhesive 305 is 1.5, a signal wavelengths $\lambda$ is 1.3 μm, a spot size (radius) $\omega_1$ of the non-silica-based optical fiber 301 is 5 μm, and a spot size (radius) $\omega_2$ of the silica-based optical fiber 302 is 5 μm, the angles $\theta_1$ and $\theta_2$ for realizing $R_1$=40 dB, 50 dB, and 60 dB and $R_2$=40 dB, 50 dB, and 60 dB are listed in Table 1, where the angle $\theta_2$ for realizing $R_2$=40 dB, 50 dB, and 60 dB is defined as zero because the optical adhesive used in this embodiment has the same refractive index as that of the silica-based optical fiber 302. As a result, for Embodiment, the low-loss splicing between the tellurite optical fiber and the silica-based optical fiber with a return loss of 50 dB can be attained if the angle $\theta_1$ is 3.2 [deg] and the angle $\theta_2$ is 4.5 [deg] ($\theta_2$ is calculated from the equation (4)).

TABLE 1

| Fiber types | Core refractive index | Angle [deg] that satisfy the following return loss | | |
| --- | --- | --- | --- | --- |
| | | Return loss: 40 dB | Return loss: 50 dB | Return loss: 60 dB |
| Zr-fluoride optical fiber | ~1.55 (max) | 1.6 | 2.9 | 3.7 |
| In-fluoride optical fiber | ~1.65 (max) | 2.6 | 3.4 | 4 |
| Charcogenide optical fiber (As—S system) | ~2.4 | 2.5 | 2.9 | 3.2 |
| Tellurite glass optical fiber | ~2.1 | 2.7 | 3.2 | 3.6 |
| Silica-based optical fiber | ~1.5 | 0 | 0 | 0 |

Accordingly, the structure for splicing between two optical fibers in accordance with the present invention is characterized by the following facts:
1) an optical axis of the non-silica-based optical fiber and an optical axis are not on of the silica-based optical fiber satisfies Snell's law not on the same straight line;
2) there is no need to use a dielectric film for preventing the reflection, which is required in the prior art; and
3) an inclination angle of an optical axis of the non-silica-based optical fiber from the normal to a splicing end surface of its housing and that of the silica-based optical fiber from the normal to a splicing end surface of its housing is different from each other, constructing to the conventional one.

Figure 33:
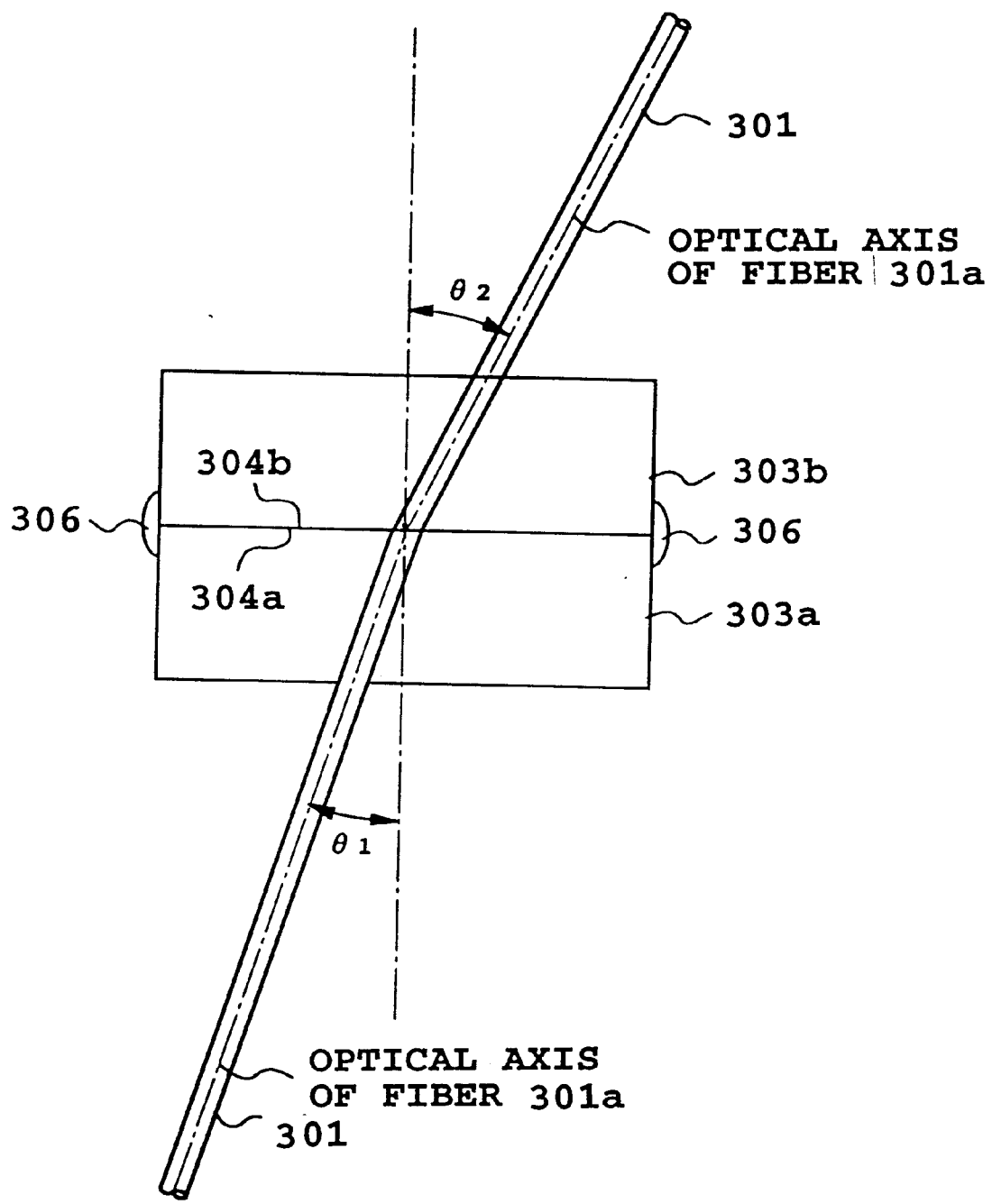
FIG. 33 is a schematic diagram of the splicing structure between the non-silica-based optical fiber and the silica-based optical fiber in accordance with the present invention.

In this embodiment, the splicing of the fibers 301, 302 are accomplished through the splicing end surfaces 304a, 304b of the housings 303a, 303b by the optical adhesive 305 but not limited to such an indirect contact. It is also possible to directly contact between these end surfaces 304a, 404b by fixing the both sides of the spliced portion by an adhesive 306 (hereinafter, this kind of adhesion will be referred as a grip-fixing) as shown in FIG. 33. In this case, furthermore, the angle $\theta_1$ required for realizing the return loss $R_1$=40 dB, 50 dB, and 60 dB for the non-silica-based optical fiber 301.

In the above description, the splicing between the non-silica-based optical fiber and the silica-based optical fiber with low fiber-loss and low reflection is explained. According to the present invention, however, a splicing between two of non-silica-based optical fibers of different glasses, for example a chalcogenide glass optical fiber and In-fluoride optical fiber, can be effectively realized.

(Embodiment 46)

Figure 34:
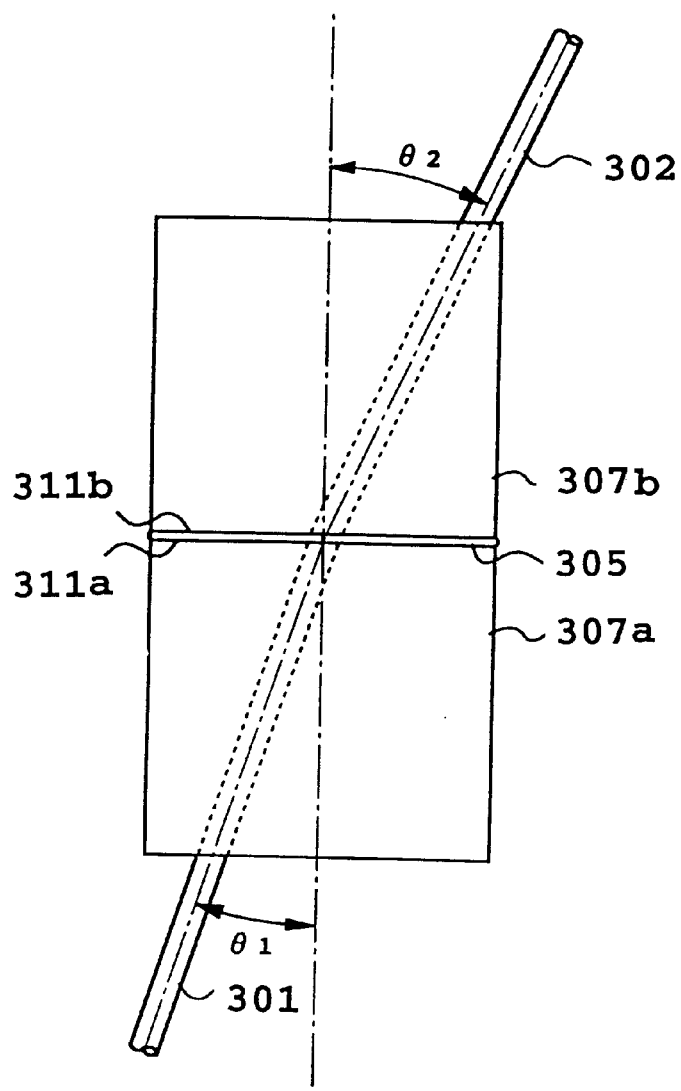
FIG. 34 is a schematic diagram of the splicing structure between the non-silica-based optical fiber and the silica-based optical fiber in accordance with the present invention.
Figure 35:
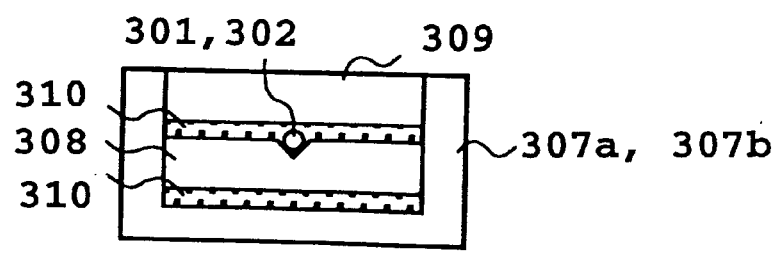
FIG. 35 is cross sectional view of the splicing structure shown in FIG. 34.

FIGS. 34 and 35 illustrate spliced portions of two different optical fibers, where FIG. 34 is a top view of the spliced portions and FIG. 35 is a cross sectional view of the spliced portions. In these figures, reference numeral 301 denotes an erbium-doped tellurite optical fiber (a glass composition of TeO$_2$—ZnO—Na$_2$O—Bi$_2$O$_3$, a core refractive index of 2.1, a mode-field radius of 5 μm, Er-content of 4,000 ppm, a fiber-covering material of UV resin), 302 denotes a silica-based optical fiber (a core refractive index of 1.5, a mode-field radius of 5 μm, and a fiber-covering material of UV resin), and 307a and 307b denote housings having V-shaped grooves for holding end portions of optical fibers 301 and 302, respectively. The fibers 301, 302 are independently set in prescribed positions by a V-grooved substrate 308 and then fixed on the housings 307a, 308b by means of a fiber-fixing plate 309 and an adhesive 310, respectively. In this embodiment, the basic materials of housings 307a, 307b, V-grooved substrate 308, and fiber-fixing plate 309 are Pyrex glasses. Furthermore, reference numerals 311a, 311b are a connecting end surfaces of the housings 307a, 307b, 305 denotes an optical adhesive (in this embodiment, an epoxy-based UV adhesive with a refractive index of 1.5 is used).

The tellurite optical fiber 301 and the silica-based optical fiber 302 are held at angles of θ$_1$=18 [deg] and θ$_2$=25 [deg] to vertical axes on the splicing end surfaces 311a, 311b. Consequently, the Er-doped tellurite optical fiber 301 and the silica-based optical fiber 302 can be spliced at a splicing-loss of 0.2 dB. In this case, however, the splicing-loss is measured at a wavelength of 1.3 μm where there is no absorption of Er-ions of Er-doped optical fiber 301. Then, a return-loss at a wavelength of 1.3 μm is measured using the commercially available return-loss measuring devise. The return-loss measured from the side of silica-based optical fiber 302 is greater than 60 dB which is beyond the margin of measuring limits, resulting in an excellent performance. If angles of the Er-doped tellurite optical fiber 301 and the silica-based optical fiber 302 to vertical axes of the splicing end surface 311a, 311b are selected from {θ$_1$=8 [deg],θ$_2$=11.2 [deg]} and {θ$_1$=14 [deg],θ$_2$=20 [deg]}, the splicing-loss between the Er-doped optical fiber and the silica-based optical fiber is 0.2 dB (measured at a wavelength of 1.3 μm) and return-losses measured from the Er-doped optical fiber 301 and the silica-based optical fiber 302 are greater than 60 dB which is beyond the margin of measuring limits.

Strictly speaking, as easily recognized from the values of θ$_1$ and θ$_2$, a value of sin θ$_1$/sin θ$_2$ is not always equal to a value of n$_2$/n$_1$ because of the effects of an equalizing refractive index of the fiber's core. In this case, by the way, a value of sin θ$_1$/sin θ$_2$ may be in the region of n$_2$/n$_1$ with errors of plus or minus 10%. If angles of the Er-doped tellurite optical fiber 301 and the silica-based optical fiber 302 to vertical axes of the splicing end surface 311a, 311b are selected from {θ$_1$=5 [deg],θ$_2$=7 [deg]}, the splicing-loss between the Er-doped optical fiber and the silica-based optical fiber is 0.2 dB (measured at a wavelength of 1.3 μm) and return-losses measured from the silica-based optical fiber is 60 dB or more, while the measurement from the side of Er-doped optical fiber 301 is 55 dB. As a result, we find that an angle of 8° or over to a vertical axis on the splicing end surface is required for the tellurite optical fiber to realize the splicing between the Er-doped optical fiber and the silica-based option with low fiber-loss and low reflection in both directions (return loss of 60 dB or over) whether or not sin θ$_1$/sin θ$_2$ is in the above region with respect to a value of n$_2$/n$_1$.

By the way, an optical adhesive 305 having a refractive index of 1.55 effects as the same way as that of using the optical adhesive without using the optical adhesive of 1.5.

(Embodiment 47)

Figure 36:
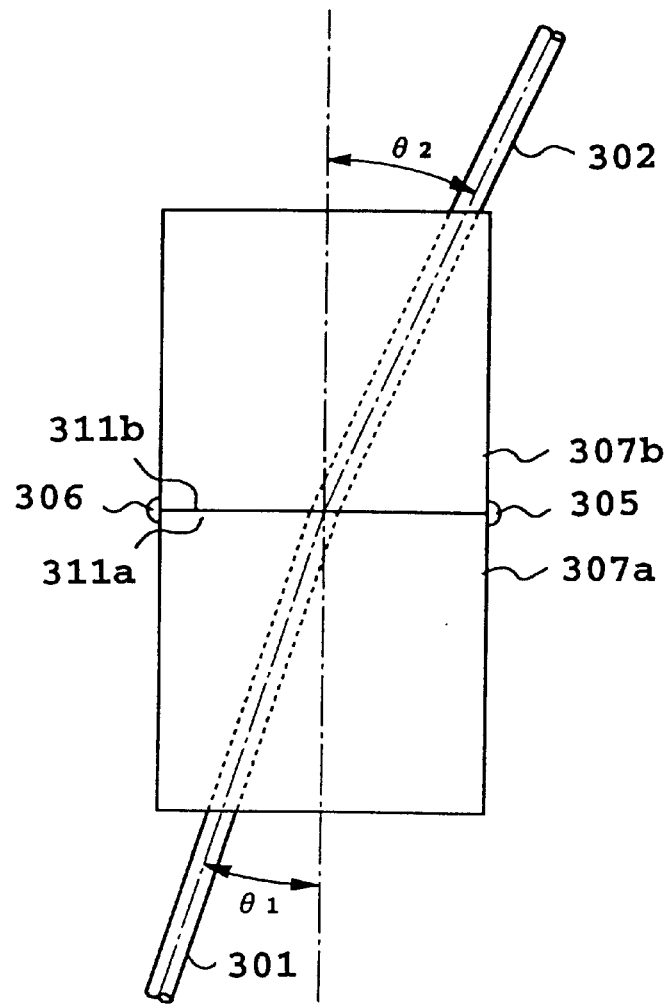
FIG. 36 is a schematic diagram of the splicing structure between the non-silica-based optical fiber and the silica-based optical fiber in accordance with the present invention.
Figure 37:
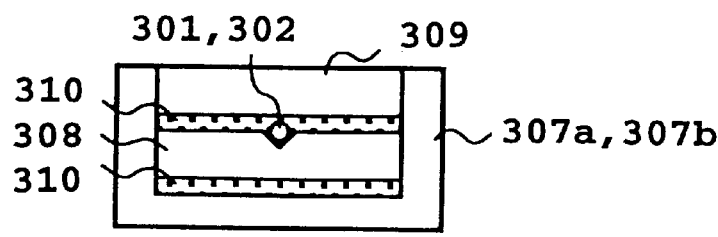
FIG. 37 is cross sectional view of the splicing structure shown in FIG. 36.

The present embodiments will be described in detail with reference to FIGS. 36 to 37, where FIG. 36 is a top view of the spliced portions, and FIG. 37 is a cross sectional view of the spliced portions. In the figures, reference numeral 301 denotes an erbium-doped tellurite optical fiber (a glass composition of TeO$_2$—ZnO—Na$_2$O—Bi$_2$O$_3$, a core refractive index of 2.1, a mode-field radius of 5 μm, Er-content of 4,000 ppm, and a fiber-covering of UV-resin), and 2 denotes a silica-based optical fiber (a core refractive index of 1.5 or less, a mode-field radius of 5 μm, and a fiber-covering of UV-resin). End portions of the optical fibers 301 and 302 are held in the housings 307a and 307b, respectively, as the same way as that of Embodiment 45 except that the slicing end 311a and 311b are directly connected together completely without using any optical adhesive. Subsequently, the housings 311a, 311b are fixed together by applying the adhesive from the both sides of slicing portions. The Er-doped tellurite optical fiber 301 and the silica-based optical fiber 302 are inclined at angles θ$_1$=18 [deg] and θ$_2$=25 [deg] to the vertical axes on the splicing end surfaces 313a, 313b, respectively. Furthermore, a splicing loss between the Er-doped tellurite optical fiber 301 and the silica-based optical fiber 302 are 0.2 dB (measuring wavelength of 1.3 μm). Return losses measured from the side of Er-doped tellurite optical fiber 301 and the silica-based optical fiber 302 are 60 dB or more, respectively. As in the same way as Embodiment 46, it is experimentally cleared that the Er-doped fiber should be inclined 8° from a vertical axis on the splicing end surface of the fiber to splice the Er-doped tellurite glass and silica-based optical fiber with low fiber-loss (return loss of 60 dB or more).

(Embodiments 48, 49)

Figure 38:
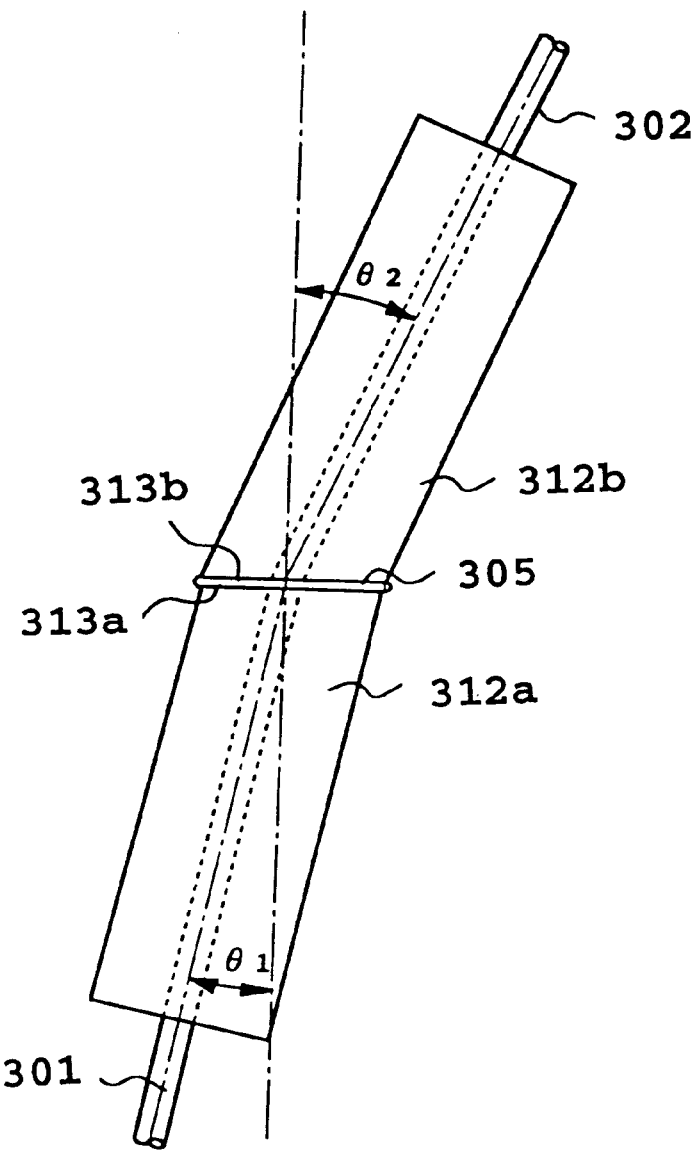
FIG. 38 is a schematic diagram of the splicing structure between the non-silica-based optical fiber and the silica-based optical fiber in accordance with the present invention.
Figure 39:
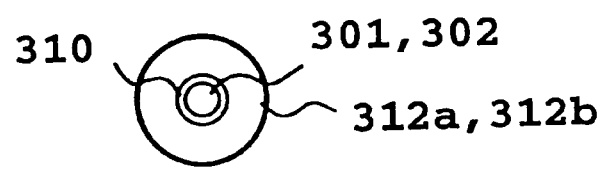
FIG. 39 is cross sectional view of the splicing structure shown in FIG. 38.
Figure 40:
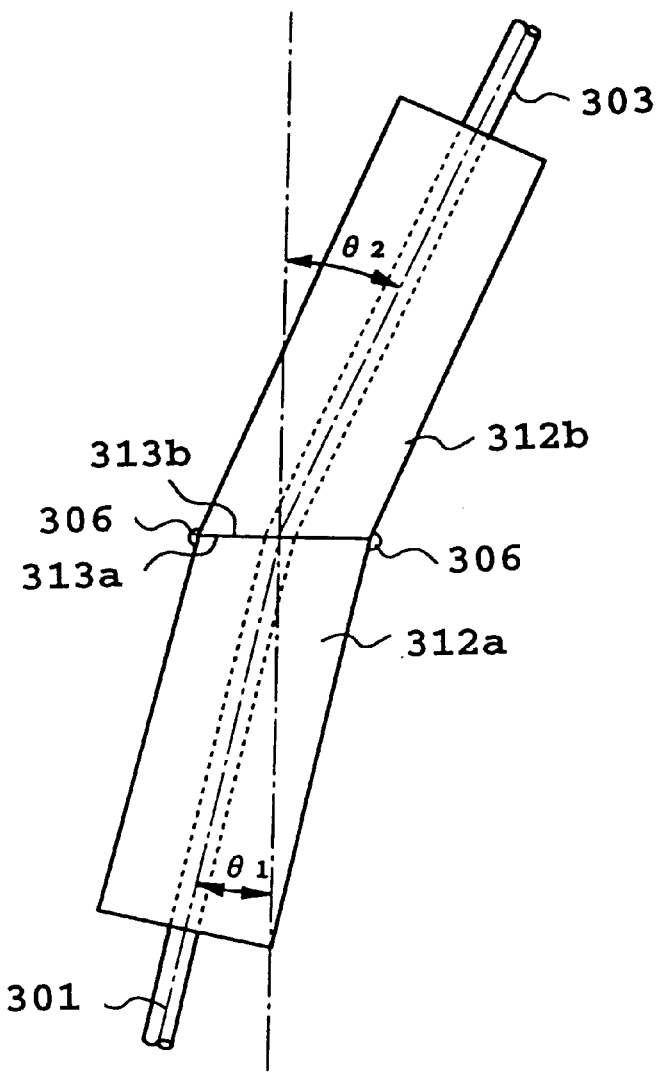
FIG. 40 is a schematic diagram of the splicing structure between the non-silica-based optical fiber and the silica-based optical fiber in accordance with the present invention.
Figure 41:
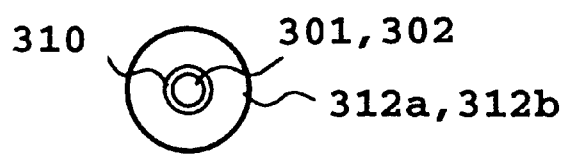
FIG. 41 is cross sectional view of the splicing structure shown in FIG. 40.

The present embodiments will be described in detail with reference to FIGS. 38 to 41, where FIG. 38 and FIG. 40 are top views of the spliced portions and FIG. 39 and FIG. 41 are cross sectional views of the spliced portions. In the figures, reference numeral 301 denotes an erbium-doped tellurite optical fiber (a glass composition of TeO$_2$—ZnO—Na$_2$O—Bi$_2$O$_3$, a core refractive index of 2.1, a mode-field radius of 5 μm, Er-content of 4,000 ppm, a fiber-covering is UV-resin). In these embodiments, furthermore, housings for holding the optical fibers are glass ferrules 312a, 312b, and splicing end surfaces 713a, 713b are formed by diagonally grinding glass ferrules 312a, 312b.

An erbium-doped tellurite optical fiber 301 and the silica-based optical fiber 302 are fixed on the glass ferrules 312a, 312b, respectively. In the case of Embodiment 48 shown in FIGS. 38 and 39, the splicing end surfaces 312a, 312b are connected together through an optical adhesive 305 (refractive indexes of 1.5 and 1.55 are applied). In the case of Embodiment 49 shown in FIGS. 40 and 41, the splicing end surface 313a, 313b are directly connected together. The splicing end portions 313a, 313b of the Er-doped tellurite optical fiber 301 and the silica-based optical fiber 302 are inclined at angles θ$_1$=12 [deg] and θ$_2$=17 [deg] to the vertical axis on the splicing end surfaces 313a, 313b, respectively. Furthermore, a splicing loss between the Er-doped tellurite optical fiber 301 and the silica-based optical fiber 302 is 0.2 dB (measuring wavelength of 1.3 μm). Return losses measured from the side of Er-doped tellurite optical fiber 301 and the silica-based optical fiber 302 are 60 dB or more, respectively. In Embodiment 48, refractive indexes of the optical adhesive is 1.5 and 1.55 are used, but the same results are obtained. As in the same way as Embodiment 46 and 47, it is experimentally cleared that the Er-doped fiber should be inclined 8° from a vertical axis on the splicing end surface of the fiber to splice the Er-doped tellurite glass and silica-based optical fiber with low fiber-loss (return loss of 60 dB or more).

Figure 42:
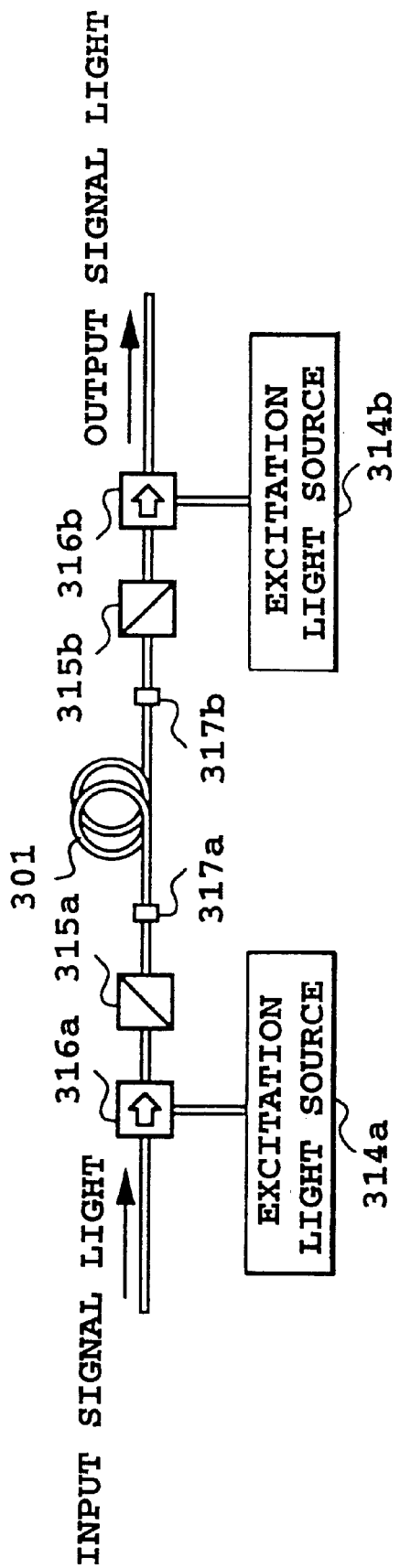
FIG. 42 is a schematic block diagram of an optical amplifier that uses the splicing structure between the non-silica-based optical fiber and the silica-based optical fiber in accordance with the present invention.

As shown in FIG. 42, furthermore, an optical amplifier is constructed using one of the splicing methods described in Embodiments 46 to 49. The optical amplifier comprises an erbium-doped tellurite optical fiber 301 (a glass composition of $TeO_2$—$ZnO$—$Na_2O$—$Bi_2O_3$, a core refractive index of 2.1, a mode-field radius of 5 μm, Er-content of 4,000 ppm, a fiber-covering is UV-resin) and silica-based optical fibers which are spliced to respective ends of the tellurite fiber. In the figure, reference numeral 314a and 314b are semiconductor lasers (an oscillation wavelength of 1.48 μm and an output power of 200 mW) as excitation light sources for generating pump light to be provided to the Er-doped tellurite, 315a and 315b are optical multiplexers for multiplexing the pump light generated from the excitation light sources 314a, 314b with signal light, and 316a and 316b is an optical isolator for preventing an oscillation of the optical amplifier. Furthermore, reference numeral 317a and 317b is a splicing portions of the present invention on which all of the methods shown in Embodiment 46 (a refractive index of the optical adhesive is 1.55), Embodiment 47, Embodiment 48 (a refractive index of the optical adhesive is 1.55), and Embodiment 49. In the splicing portion of Embodiments 46 and 47, the Er-doped tellurite optical fiber 301 and the silica-based optical fiber 302 are inclined at angles $\theta_1=14$ [deg] and $\theta_2=20$ [deg] to the vertical axis on the splicing end surfaces 313a, 313b, respectively. In the splicing portion of Embodiments 48 and 49, the Er-doped tellurite optical fiber 301 and the silica-based optical fiber 302 are inclined at angles $\theta_1=12$ [deg] and $\theta_2=17$ [deg] to the vertical axis on the splicing end surfaces 313a, 313b, respectively.

Figure 43:
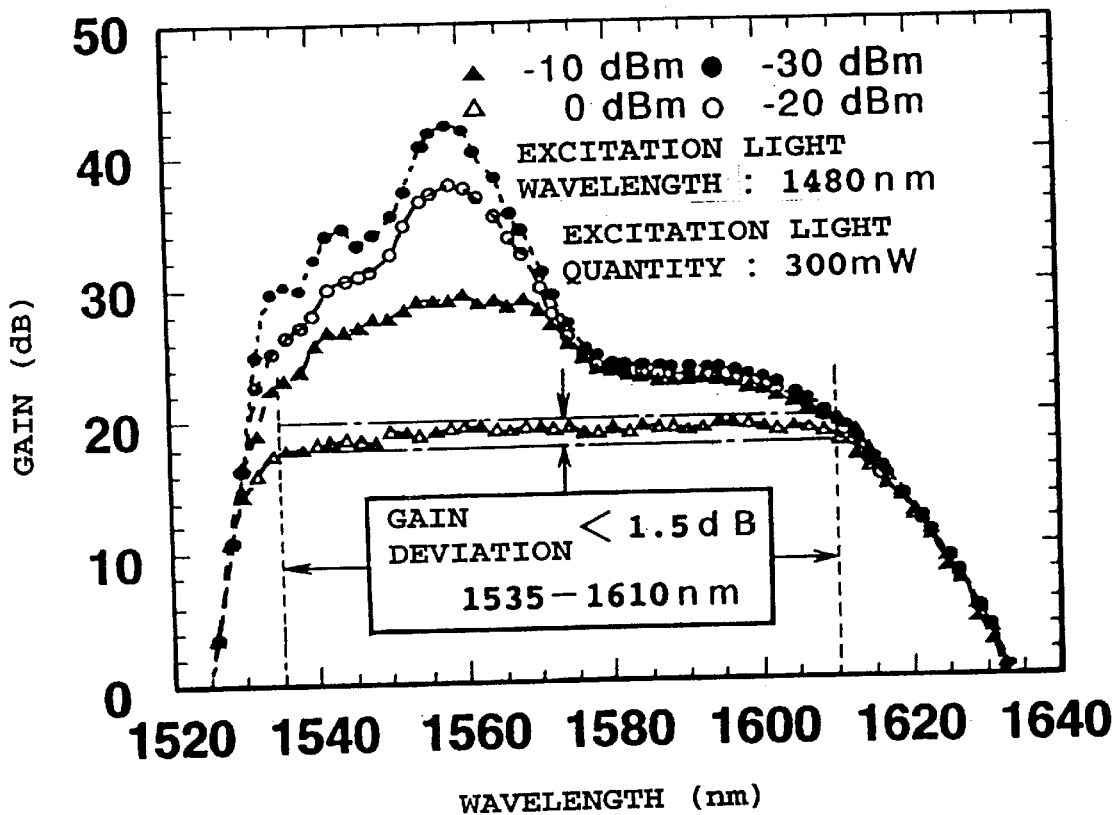
FIG. 43 is a graphical representation of the amplification characteristics of the optical amplifier in accordance with the present invention.

Consequently, the optical amplifier realizes a signal gain of 40 dB or more without generating a ghost. In FIG. 43, the characteristics of optical amplification of the optical amplifier is illustrated as one of the embodiments of the present invention. The present embodiment uses the splicing method of Embodiment 46.

(Embodiment 50)

Various kind of non-silica-based optical fibers are spliced with a silica-based optical fiber in accordance with the present invention, which are listed in Tables 2 and 3.

The non-silica-based optical fiber may be selected from the following fibers:
1. tellurite glass optical fiber (in Table 2, indicated as non-silica-based optical fiber A)
   glass composition: $TeO_2$—$ZnO$—$Na_2O$—$Bi_2O_3$ core refractive index: 2.1
2. Zn-based fluoride optical fiber (in Table 2, indicated as non-silica-based optical fiber B)
   glass composition: $ZrF_4$—$BaF_2$—$LaF_3$—$YF_3$—$AlF_3$—$LiF$—$NaF$
   core refractive index: 1.55
   mode-field radius: 4 μm
   fiber-covering: UV-resin
3. In-based fluoride optical fiber (in Table 3, indicated as non-silica-based optical fiber C)
   glass composition: $InF_3$—$GaF_3$—$ZnF_2$—$PbF_2$—$BaF_2$—$SrF_2$—$YF_3$—$NaF$
   core refractive index: 1.65
   mode-field radius: 4.5 μm
   fiber-covering: UV-resin
4. chalcogenide glass optical fiber (in Table 3, indicated as a non-silica-based optical fiber D)
   glass composition: As—S
   core refractive index: 2.4
   mode-field radius: 3 μm
   fiber-covering: UV resin Each of the non-silica-based optical fibers A, B, C, and D is prepared with or without one or more rare-earth elements selected from the group of:

Er (1,000 ppm), Pr (500 ppm), Tm (2,000 ppm), Ho (1,000 ppm), Yb (500 ppm), Tb (2,000 ppm), Nd (1,000 ppm), and Eu (2,000 ppm).

In addition, the silica-based optical fibers to be spliced have a core refractive index of 1.5 and the same mode-field radius as that of the respective non-silica-based optical fibers. The method of splicing the fibers is selected from Embodiments 45 to 48. If the splicing form of Embodiment 44 or 45 is formed, a refractive index of the optical adhesive 305 to be applied between the splicing end surfaces 313a, 313b is 1.5. By the way, the slicing-loss and return-loss have no relation to the presence or the kind of a rare-earth element in the glass composition.

TABLE 2

| Non-silica-based optical fiber | Splicing form | θ1 | θ2 | Splicing-loss (measuring wavelength 1.2 μm) | Return loss (dB) Non-silica-based optical fiber | Silica-based optical fiber |
|---|---|---|---|---|---|---|
| A | Embodiment 46 | 8 | 11.2 | 0.3 | 60 dB or more | 60 dB or more |
|   | Embodiment 47 | 10 | 14 | 0.2 | 60 dB or more | 60 dB or more |
|   | Embodiment 48 | 12 | 17 | 0.1 | 60 dB or more | 60 dB or more |
|   | Embodiment 49 | 10 | 14 | 0.2 | 60 dB or more | 60 dB or more |
|   | Embodiment 47 | 12 | 17 | 0.2 | 60 dB or more | 60 dB or more |
| B | Embodiment 46 | 4 | 4.1 | 0.2 | 60 dB or more | 60 dB or more |
|   | Embodiment 47 | 4 | 4.1 | 0.2 | 60 dB or more | 60 dB or more |
|   | Embodiment 48 | 4 | 4.1 | 0.1 | 60 dB or more | 60 dB or more |
|   | Embodiment 49 | 4 | 4.1 | 0.2 | 60 dB or more | 60 dB or more |
|   | Embodiment 46 | 6 | 6.2 | 0.2 | 60 dB or more | 60 dB or more |

TABLE 3

| Non-silica-based optical fiber | Splicing form | θ1 | θ2 | Splicing-loss (measuring wavelength 1.2 μm) | Return loss (dB) Non-silica-based optical fiber | Silica-based optical fiber |
|---|---|---|---|---|---|---|
| C | Embodiment 46 | 5 | 5.5 | 0.2 | 60 dB or more | 60 dB or more |
|   | Embodiment 47 | 5 | 5.5 | 0.3 | 60 dB or more | 60 dB or more |
|   | Embodiment 48 | 5 | 5.5 | 0.2 | 60 dB or more | 60 dB or more |
|   | Embodiment 49 | 5 | 5.5 | 0.2 | 60 dB or more | 60 dB or more |
|   | Embodiment 46 | 10 | 11 | 0.2 | 60 dB or more | 60 dB or more |
| D | Embodiment 46 | 9 | 14.5 | 0.2 | 60 dB or more | 60 dB or more |
|   | Embodiment 46 | 15 | 24.5 | 0.2 | 60 dB or more | 60 dB or more |
|   | Embodiment 47 | 9 | 14.5 | 0.1 | 60 dB or more | 60 dB or more |
|   | Embodiment 48 | 9 | 14.5 | 0.2 | 60 dB or more | 60 dB or more |
|   | Embodiment 49 | 9 | 14.5 | 0.2 | 60 dB or more | 60 dB or more |
|   | Embodiment 49 | 10 | 16.1 | 0.2 | 60 dB or more | 60 dB or more |

As listed in Table 2 and Table 3, the non-silica based optical fiber can be spliced with a low-loss and a low-reflection if the slicing method of the present invention is used. In these tables, examples of low-reflection (return loss is 60 dB or more) are shown. However, a return loss of 60 dB or more in both directions cannot be attained on condition that $\theta_1 < 3$ [deg] for the Zr-based fluoride optical fiber, $\theta_1 < 4$ [deg] for the In-based fluoride optical fiber, or $\theta_1 < 8$ [deg] for a chalcogenide glass optical fiber. Therefore, $\theta_1$ should be larger than those values for realizing a return loss of 60 dB or more in both directions.

An optical amplifier having a signal gain of 30 dB or more is constructed as an optical fiber amplifier operating at 1.3 μm band using the above Pr-doped In-based fluoride optical fiber (in Table 3, indicated as non-silica-based optical fiber D). In this case, the slicing form of Embodiment 47 is applied under the condition that $\theta_1$ is 5 [deg], $\theta_2$ is 5.5 [deg], a pump light source is a ND-YLF laser with 1.047 μm oscillation. In addition, there is no ghost observed.

By the way, the above embodiments are for the splicing between the non-silica-based optical fiber and the silica-based optical fiber. According to the present invention, it is also possible to connect two different non-silica-optical fibers. We list some of the connections between the non-silica-optical fibers in Table 4 in which four different non-silica-based optical fibers A, B, C, and D of Embodiment 4 are used. A refractive index and a splicing angle of each of the fibers are in the range defined above. As a result, low fiber-loss and low reflection characteristics of the non-silica-based optical fibers are attained by the way of the present invention.

According to the present invention, the performance of wavelength multiplexing transmission systems and optical CATV systems can be improved by a combination of the characteristics of optical amplification media, and optical amplifiers and laser devices using the optical amplification media. Thus, the present invention has advantages of contributing the economical and technical improvements of service using those systems.

Furthermore, a broadband amplifier allows a dramatic increase in transmission volume if it is used in a wavelength multiplexing transmission system and contributes a reduction in costs of data communication. Also, a reduction in costs of optical CATV can be attained if the optical amplifier having characteristics of low gain tilt is used so as to allow distribution and relay of high-quality images by wavelength multiplexing.

Practical applications of the optical amplification medium in the laser device contributes to a reduction of cost of in various kind of wavelength multiplexing transmission and an improvement in optical instrumentation.

(Embodiment 51)

Figure 44:
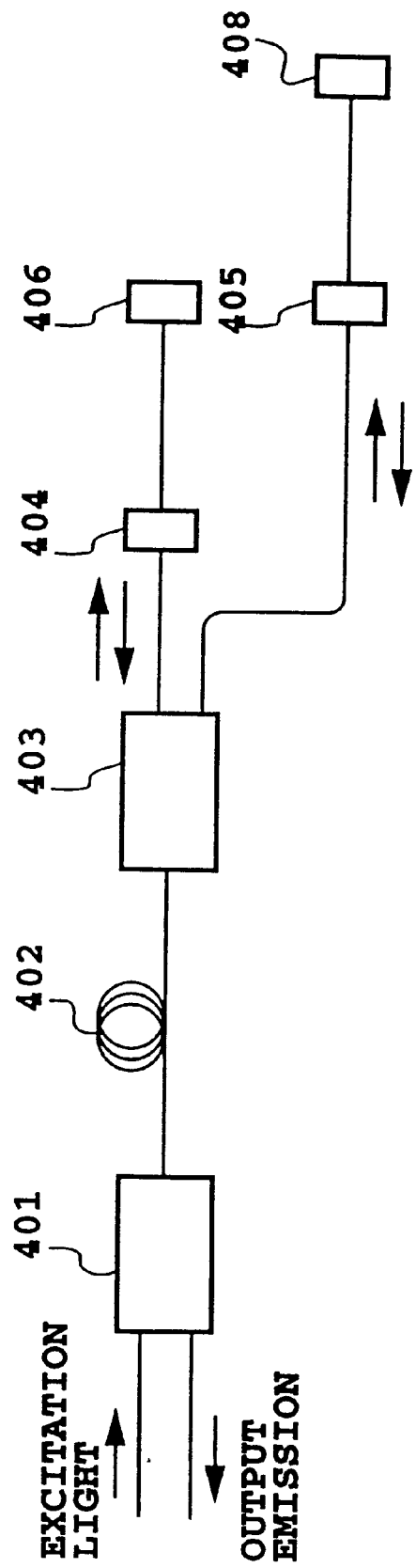
FIG. 44 is a schematic block diagram of the ASE light source as one of the preferred embodiments of the present invention.
Figure 45:
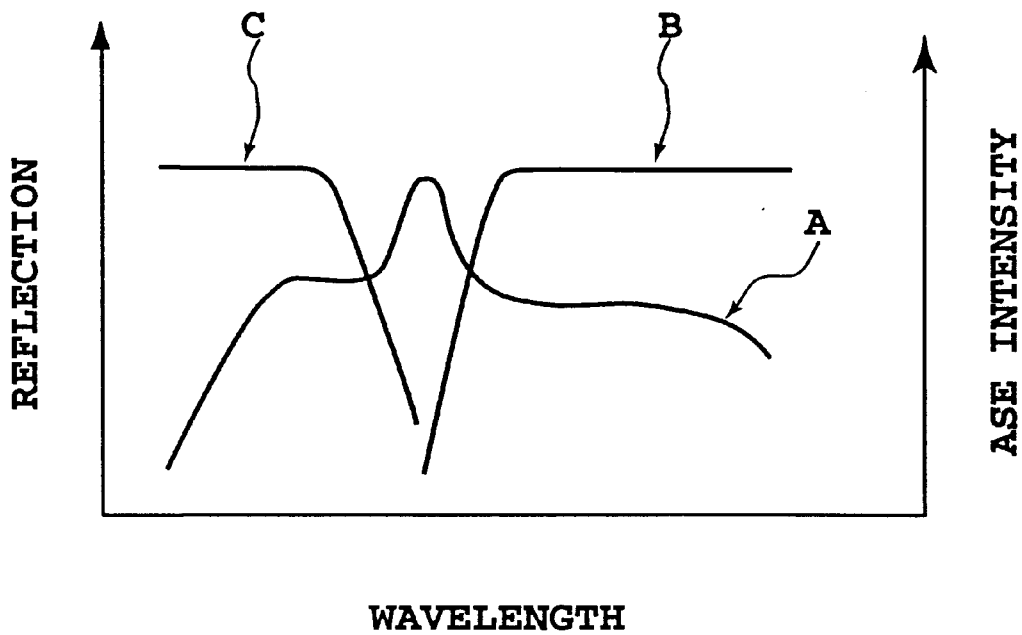
FIG. 45 is a graphical representation of the relationship between the reflection of mirror and the intensity of the ASE spectrum of FIG. 44.
Figure 46:
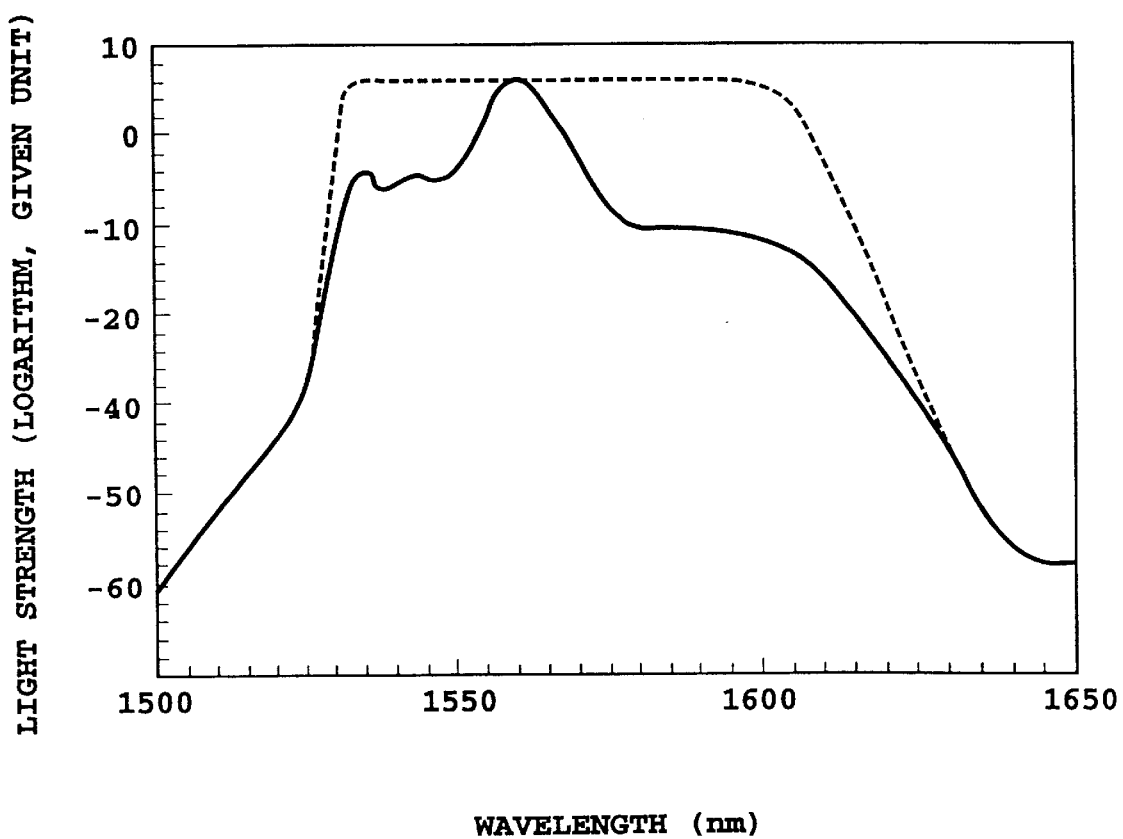
FIG. 46 is a spectrum diagram of ASE.

Referring now to FIGS. 44 to 46, we will describe an erbium-doped tellurite optical fiber or optical waveguide to be used as a light source of amplified spontaneous emission (ASE) in the present embodiment. FIG. 44 is a schematic block diagram of the ASE light source as one of the preferred embodiments of the present invention, FIG. 45 is a graphical representation of the relationship between the wavelength and the reflection of reflectors 406, 408 and the ASE spectrum of the fiber or optical waveguide of FIG. 44, and FIG. 46 is a spectrum diagram of ASE.

TABLE 4

| Non-silica-based optical fiber 1 | 2 | Splicing form | θ1 | θ2 | Splicing-loss (measuring wavelength 1.2 μm) | Return loss (dB) Non-silica-based optical fiber 1 | Silica-based optical fiber 2 |
|---|---|---|---|---|---|---|---|
| A | B | Embodiment 46 | 8 | 10.9 | 0.2 | 60 dB or more | 60 dB or more |
|   | C | Embodiment 47 | 9 | 11.5 | 0.2 | 60 dB or more | 60 dB or more |
|   | D | Embodiment 48 | 15 | 13.1 | 0.3 | 60 dB or more | 60 dB or more |
| B | C | Embodiment 46 | 8 | 7.5 | 0.2 | 60 dB or more | 60 dB or more |
|   | D | Embodiment 47 | 25 | 15.6 | 0.3 | 60 dB or more | 60 dB or more |
| C | D | Embodiment 46 | 24 | 16.2 | 0.2 | 60 dB or more | 60 dB or more |

In general, a spectrum of amplified spontaneous emission (ASE) is observed when the Er-doped tellurite optical fiber is pumped. In this case, a spectrum of ASE can be represented by a solid line in FIG. 46. Thus, it is possible to use the ASE as a light source of 1.5 to 1.6 μm without any modification. For extending the boundaries of the applications, the wavelength-dependency of the spectrum should be eliminated so as to become flat.

In this embodiment, therefore, an ASE light source is constructed as shown in FIG. 44. In the figure, reference numeral 401 denotes an optical coupler for coupling or dividing pump light at a wavelength of 1.48 μm with another wavelength of 1.5 μm or more; 402 denotes an erbium-doped tellurite optical fiber which is prepared using a glass composition of $TeO_2$—$ZnO$—$M_2O$—$Bi_2O_3$ (M is at least one alkali element) or $TeO_2$—$ZnO$—$M_2O$—$Bi_2O_3$—$Al_2O_3$ (M is at least one alkali element) under the condition that an erbium content in a core of the fiber is 2,000 ppm, a fiber-length is 4 m, a cut-off wavelength is 1.3 μm, and Δn is 1.5%; 403 denotes an optical coupler that considers 1.56 μm as a center wavelength for coupling or dividing light at longer and shorter wavelengths, 404 and 405 denote optical attenuators, and 406 and 408 denote reflectors.

The Er-doped tellurite optical fiber 402 generates ASE that includes light at a wavelength of over 1.56 μm. The light passes through an optical attenuator 404 and then the light is reflected on the reflector 406. Subsequently, the reflected light propagates in a reverse direction and enters into the optical fiber 402 where it is amplified. Then the amplified light is emitted from one end of the optical coupler 401. Light at a wavelength of shorter than 1,56 μm is reflected on the reflector 408 after passing through the optical attenuator 405. Furthermore, the light propagates in a reverse direction and passes through the optical fiber 402 again. The amplified light is reflected on a reflector 408 and then emitted from one end of the optical coupler.

If a reflectivity of the reflector is adjusted as shown in FIG. 45, that is, a reflectivity of the light (a line B for the reflector 406 and a line C for the reflector 408 in FIG. 45) is minimized at a wavelength in proximity to a peak of the ASE and increased with distance from the peak, a spectrum of ASE unmodified by the reflector is obtained as indicated by a line A in FIG. 45. As shown in FIG. 46, therefore, we obtains the ASE spectrum (a dushed line in FIG. 46) which indicates that light intensity has a small dependence on wavelengths from 1.53 μm to 1.60 μm. At this time, furthermore, attenuation of the optical attenuators 404, 405 are optimized. As a result, the ASE spectrum which indicates that light intensity has a small dependence on wavelengths is obtained when an optical waveguide is used as an amplification medium.

(Embodiment 52)

Figure 47:
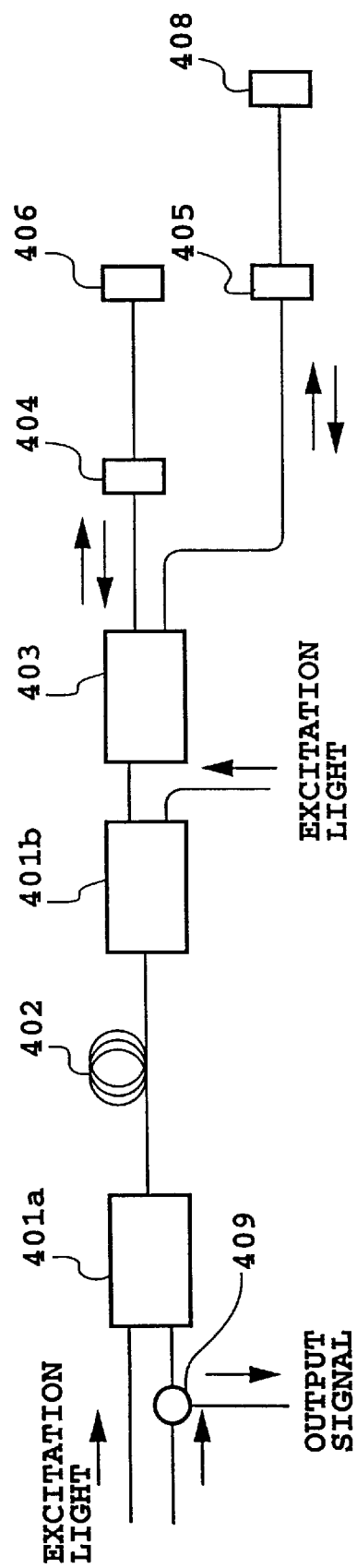
FIG. 47 is a schematic block diagram of the fiber amplifier as one of the preferred embodiments of the present invention.

In this embodiment, we conduct evaluations of the optical amplification characteristic of an amplifier shown in FIG. 47. The amplifier of this embodiment is based on the configuration shown in FIG. 44. That is, an optical circulator 409 is connected to a signal input terminal of the optical amplifier 401a, and also a pumping optical coupler 401b is arranged at the back of the Er-doped tellurite optical fiber 402. An optical amplification is performed under the condition that pump light is at a wavelength of 0.98 μm or 1.48 μm, for example 0.98 μm light incident from the front side, 1.48 μm light incident from the back side, or 1.48 μm light incident from both sides. As a result, a gain spectrum indicating that the gain has a small dependency on wavelengths from 1.53 μm and 1.60 μm. At this time, attenuation of optical attenuator 404, 405 are optimized.

Conventionally, for obtaining a flattened spectrum of gains that shows an extremely high dependency on wavelength, a gain peak observed at 1.53 μm to 1.57 μm becomes flat on a gain peak at wavelengths of 1.53 μm to 1.57 μm by a filter such as a fiber-bragg-grating that courses any loss for the purpose of cutting or leveling the spectrum. However, this method has the problems of a decrease in the quantum efficiency of the optical amplifier and unifying the flatten gains into a small value (In FIG. 43, the gain values are at around 1.58 μm). In this embodiment, however, a decrease in the quantum efficiency is not in existence, the gains are standardized into a higher level but not into a lower level.

For the reflectors 406, 408, by the way, dielectric multiple layers, fiber-bragg-grating, or the like can be used. An amplification optical fiber may be selected not only from the Er-doped tellurite optical fibers but also from silica-based optical fibers and fluoride optical fibers. The effects of gain-flattening is also observed when one of these fibers is used.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. An optical fiber splicing structure for contacting a splicing end surface of a first housing in which an end of a first optical fiber is held and a splicing end surface of a second housing in which an end of a second optical fiber is held in a state of co-axial centering on an optical axis of the first optical fiber and an optical axis of the second optical fiber, wherein at least one of the first optical fiber and the second optical fiber is a non-silica-based optical fiber, wherein optical axes of the first and second optical fibers are held in the first and second housings, respectively, at angles $\theta_1$ and $\theta_2$ ($\theta_1 \neq \theta_2$) from a vertical axis of a boundary surface between the splicing end surfaces, and a relationship between the angles $\theta_1$ and $\theta_2$ satisfies Snell's law represented by an equation (4) at the time of splicing the first and second optical fibers:

$$\frac{\sin\theta_1}{\sin\theta_2} = \frac{n_2}{n_1} \qquad (4)$$

where $n_1$ is a refractive index of the first optical fiber and $n_2$ is a refractive index of the second optical fiber.

2. The optical fiber splicing structure as claimed in claim 1, wherein each of the first and second optical fibers is a non-silica-based optical fiber.

3. The optical fiber splicing structure as claimed in claim 1, wherein each of the first and second optical fibers is a non-silica-based optical fiber selected from the group consisting of Zr-based or In-based fluoride optical fibers, chalcogenide optical fibers, and tellurite glass optical fibers.

4. The optical fiber splicing structure as claimed in claim 1, wherein each of the first and second optical fibers is a non-silica-based optical fiber doped with rare-earth element.

5. An optical fiber splicing structure as claimed in claim 1, wherein the first optical fiber is a tellurite glass optical fiber, wherein the second optical fiber is a silica-based optical fiber, and wherein the angle $\theta_1$ is at least 8 degrees.

6. The optical fiber splicing structure as claimed in claim 1, wherein the first optical fiber is a Zr-based fluoride optical glass fiber, wherein the second optical fiber is a silica-based optical fiber, and wherein the angle $\theta_1$ is at least 3 degree.

7. The optical fiber splicing structure as claimed in claim 1, wherein the first optical fiber is an In-based fluoride optical glass fiber, wherein the second optical fiber is a silica-based optical fiber, and wherein the angle $\theta_1$ is at least 4 degrees.

8. The optical fiber splicing structure as claimed in claim 1, wherein the first optical fiber is a chalcogenide optical glass fiber, wherein the second optical fiber is a silica-based optical fiber, and wherein the angle $\theta_1$ is at least 8 degrees.

9. The optical fiber splicing structure as claimed in one of claims 1–8, wherein the splicing end surface of the first optical fiber is connected to the splicing end surface of the second optical fiber through an optical adhesive at the time of splicing the first and second optical fibers.

10. The optical fiber splicing structure as claimed in one of claims 1–8, wherein the splicing end surface of the first optical fiber and the splicing end surface of the second optical fiber are kept in absolute contact with each other at the time of splicing the first and second optical fibers.

* * * * *